US011258531B2

(12) United States Patent
Harrang et al.

(10) Patent No.: US 11,258,531 B2
(45) Date of Patent: Feb. 22, 2022

(54) SYSTEM AND METHOD FOR PEAK FLOW DETECTION IN A COMMUNICATION NETWORK

(71) Applicant: Opanga Networks, Inc., Seattle, WA (US)

(72) Inventors: Jeffrey Paul Harrang, Seattle, WA (US); John M. Burnette, Seattle, WA (US); David B. Gibbons, Seattle, WA (US); Ben Hadorn, Seattle, WA (US)

(73) Assignee: Opanga Networks, Inc., Seattle, WA (US)

( * ) Notice: Subject to any disclaimer, the term of this patent is extended or adjusted under 35 U.S.C. 154(b) by 141 days.

(21) Appl. No.: 16/553,048

(22) Filed: Aug. 27, 2019

(65) Prior Publication Data
US 2020/0014486 A1 Jan. 9, 2020

Related U.S. Application Data

(63) Continuation-in-part of application No. 16/358,595, filed on Mar. 19, 2019, now Pat. No. 10,834,002.
(Continued)

(51) Int. Cl.
*H04L 1/00* (2006.01)
*H04L 1/16* (2006.01)
(Continued)

(52) U.S. Cl.
CPC ......... *H04L 1/0002* (2013.01); *H04B 17/309* (2015.01); *H04L 1/0038* (2013.01);
(Continued)

(58) Field of Classification Search
None
See application file for complete search history.

(56) References Cited

U.S. PATENT DOCUMENTS

| 650,243 A | 5/1900 | Hart |
| 5,706,281 A | 1/1998 | Hashimoto et al. |
| (Continued) | | |

FOREIGN PATENT DOCUMENTS

| DE | 19831169 | 1/2000 |
| DE | 10208094 | 9/2003 |
| (Continued) | | |

OTHER PUBLICATIONS

European Search Report and Written Opinion for European Application No. 16759533.9 dated Sep. 14, 2018.
(Continued)

*Primary Examiner* — Davoud A Zand

(57) ABSTRACT

A method includes determining a delivery performance of a data flow being transmitted from a first network equipment to a second network equipment over a network; determining whether the network is congested based on the determined delivery performance of the data flow being transmitted to the second network equipment; and pacing delivery of the data flow to the second network equipment by reducing a rate at which the data flow is delivered to the second network equipment when the network is determined to be congested.

19 Claims, 36 Drawing Sheets

Related U.S. Application Data which is a continuation of application No. 15/060,486, filed on Mar. 3, 2016, now Pat. No. 10,270,700, which is a continuation-in-part of application No. 14/743,944, filed on Jun. 18, 2015, now Pat. No. 10,396,913, which is a continuation of application No. 12/904,003, filed on Oct. 13, 2010, now Pat. No. 9,065,595, which is a continuation-in-part of application No. 12/167,158, filed on Jul. 2, 2008, now Pat. No. 8,719,399, which is a continuation-in-part of application No. 11/278,809, filed on Apr. 5, 2006, now Pat. No. 7,500,010.

(60) Provisional application No. 62/277,320, filed on Jan. 11, 2016, provisional application No. 62/207,529, filed on Aug. 20, 2015, provisional application No. 62/127,753, filed on Mar. 3, 2015, provisional application No. 60/668,864, filed on Apr. 7, 2005.

(51) Int. Cl.

| | |
|---|---|
| *H04L 12/801* | (2013.01) |
| *H04L 12/825* | (2013.01) |
| *H04B 17/309* | (2015.01) |
| *H04L 29/06* | (2006.01) |
| *H04L 29/08* | (2006.01) |
| *H04L 12/26* | (2006.01) |
| *H04W 24/10* | (2009.01) |
| *H04W 28/06* | (2009.01) |
| *H04L 47/12* | (2022.01) |
| *H04L 47/19* | (2022.01) |
| *H04L 47/25* | (2022.01) |
| *H04L 65/612* | (2022.01) |
| *H04L 67/06* | (2022.01) |
| *H04L 43/16* | (2022.01) |
| *H04L 69/22* | (2022.01) |

(52) U.S. Cl.
CPC ............ *H04L 1/1671* (2013.01); *H04L 43/16* (2013.01); *H04L 47/12* (2013.01); *H04L 47/19* (2013.01); *H04L 47/25* (2013.01); *H04L 65/4084* (2013.01); *H04L 67/06* (2013.01); *H04L 63/0428* (2013.01); *H04L 69/22* (2013.01); *H04W 24/10* (2013.01); *H04W 28/065* (2013.01)

(56) References Cited

U.S. PATENT DOCUMENTS

| | | | |
|---|---|---|---|
| 5,706,428 | A | 1/1998 | Boer et al. |
| 5,726,978 | A | 3/1998 | Frodigh et al. |
| 5,974,460 | A | 10/1999 | Maddalozzo et al. |
| 6,038,224 | A | 3/2000 | Kim et al. |
| 6,052,734 | A | 4/2000 | Ito |
| 6,311,065 | B1 | 10/2001 | Ushiki et al. |
| 6,327,677 | B1 | 12/2001 | Garg et al. |
| 6,339,785 | B1 | 1/2002 | Feigenbaum |
| 6,377,805 | B1 | 4/2002 | Anvekar et al. |
| 6,453,346 | B1 | 9/2002 | Garg et al. |
| 6,493,875 | B1 | 12/2002 | Earries |
| 6,512,885 | B1 | 1/2003 | Shen et al. |
| 6,529,476 | B1 | 3/2003 | Magnussen |
| 6,560,243 | B1 | 5/2003 | Mogul |
| 6,567,415 | B1 | 5/2003 | Elwalid et al. |
| 6,622,172 | B1 | 9/2003 | Tam |
| 6,651,105 | B1 | 11/2003 | Bhagwat et al. |
| 6,807,429 | B2 | 10/2004 | Subrahmanya |
| 6,845,398 | B1 | 1/2005 | Galensky et al. |
| 6,910,078 | B1 | 6/2005 | Ramen et al. |
| 6,947,388 | B1 | 9/2005 | Wagner |
| 7,058,723 | B2 | 6/2006 | Wilson |
| 7,076,695 | B2 | 7/2006 | Mcgee et al. |
| 7,085,576 | B2 | 8/2006 | Ranganathan |
| 7,103,906 | B1 | 9/2006 | Katz et al. |
| 7,240,099 | B2 | 7/2007 | Miyazaki et al. |
| 7,349,337 | B1 | 3/2008 | Mahdavi |
| 7,451,205 | B2 | 11/2008 | Chueng et al. |
| 7,454,527 | B2 | 11/2008 | Zhang et al. |
| 7,496,675 | B2 | 2/2009 | Obata et al. |
| 7,512,066 | B2 | 3/2009 | Santos et al. |
| 7,519,030 | B2 | 4/2009 | Cimini et al. |
| 7,533,158 | B2 | 5/2009 | Grannan et al. |
| 7,536,626 | B2 | 5/2009 | Sutivong et al. |
| 7,539,752 | B1 | 5/2009 | Chakravarti et al. |
| 7,543,052 | B1 | 6/2009 | Klein |
| 7,568,045 | B1 | 7/2009 | Agrawai |
| 7,577,908 | B2 | 8/2009 | Frazier et al. |
| 7,594,260 | B2 | 9/2009 | Porras et al. |
| 7,617,312 | B2 | 11/2009 | Tummalapalli |
| 7,643,461 | B2 | 1/2010 | Choi et al. |
| 7,650,111 | B2 | 1/2010 | Dennisson et al. |
| 7,650,376 | B1 | 1/2010 | Blumenau |
| 7,688,733 | B1 | 3/2010 | Mirza |
| 7,698,416 | B2 | 4/2010 | Potti et al. |
| 7,715,479 | B2* | 5/2010 | Lu ............................ H04N 19/44 375/240.16 |
| 7,765,324 | B2 | 7/2010 | Imiya |
| 2002/0021465 | A1 | 2/2002 | Moore |
| 2002/0081971 | A1 | 6/2002 | Travistino |
| 2002/0089945 | A1* | 7/2002 | Belcea .................. H04W 52/50 370/321 |
| 2002/0116555 | A1 | 8/2002 | Sommers et al. |
| 2002/0158910 | A1 | 10/2002 | Senda |
| 2002/0159396 | A1 | 10/2002 | Carlson et al. |
| 2003/0014496 | A1 | 1/2003 | Spencer et al. |
| 2003/0028890 | A1 | 2/2003 | Swart et al. |
| 2003/0084182 | A1 | 5/2003 | Mahiddini et al. |
| 2003/0099201 | A1 | 5/2003 | Hu et al. |
| 2003/0145100 | A1 | 7/2003 | Marchetto et al. |
| 2003/0154272 | A1* | 8/2003 | Dillon ..................... H04L 47/11 709/223 |
| 2003/0174677 | A1 | 9/2003 | Mantha |
| 2003/0204769 | A1 | 10/2003 | Coughlin |
| 2003/0221008 | A1 | 11/2003 | England et al. |
| 2004/0002362 | A1 | 1/2004 | Chuah et al. |
| 2004/0003105 | A1 | 1/2004 | Berzosa et al. |
| 2004/0015445 | A1 | 1/2004 | Heaven et al. |
| 2004/0017788 | A1 | 1/2004 | Shmuell |
| 2004/0042398 | A1 | 3/2004 | Peieg et al. |
| 2004/0066746 | A1 | 4/2004 | Matsunaga |
| 2004/0117459 | A1 | 6/2004 | Fry |
| 2004/0122969 | A1 | 6/2004 | Ameigeiras et al. |
| 2004/0136379 | A1* | 7/2004 | Liao ....................... H04L 47/30 370/395.21 |
| 2004/0143652 | A1 | 7/2004 | Grannan et al. |
| 2004/0168052 | A1 | 8/2004 | Clisham et al. |
| 2004/0218583 | A1 | 11/2004 | Porter et al. |
| 2005/0058138 | A1 | 3/2005 | Burcher et al. |
| 2005/0091395 | A1 | 4/2005 | Harris et al. |
| 2005/0091398 | A1 | 4/2005 | Roberts et al. |
| 2005/0128995 | A1 | 6/2005 | Ott et al. |
| 2005/0132049 | A1 | 6/2005 | Inoue et al. |
| 2005/0165948 | A1 | 7/2005 | Hatime |
| 2005/0169184 | A1 | 8/2005 | Murgetroyd et al. |
| 2005/0193069 | A1 | 9/2005 | Brown et al. |
| 2005/0198680 | A1 | 9/2005 | Baran et al. |
| 2005/0239412 | A1 | 10/2005 | Kelz |
| 2005/0256926 | A1 | 11/2005 | Muhonen et al. |
| 2005/0281270 | A1 | 12/2005 | Kossi et al. |
| 2005/0281277 | A1 | 12/2005 | Killian |
| 2005/0282500 | A1 | 12/2005 | Wang et al. |
| 2005/0289630 | A1 | 12/2005 | Andrews |
| 2006/0019885 | A1 | 1/2006 | Aghvami et al. |
| 2006/0026298 | A1 | 2/2006 | Nagaraj |
| 2006/0150055 | A1 | 7/2006 | Quinard et al. |
| 2006/0176824 | A1 | 8/2006 | Laver et al. |
| 2006/0268336 | A1 | 11/2006 | Sakalliwa et al. |
| 2006/0277277 | A1 | 12/2006 | Landschaft et al. |
| 2006/0282858 | A1 | 12/2006 | Errico et al. |
| 2007/0025301 | A1 | 2/2007 | Petersson et al. |

(56) References Cited

U.S. PATENT DOCUMENTS

| | | |
|---|---|---|
| 2007/0066297 A1 | 3/2007 | Jeidari-Bateni |
| 2007/0086347 A1 | 4/2007 | Reynolds |
| 2007/0115814 A1* | 5/2007 | Gerla ............... H04L 47/25 370/230 |
| 2007/0142067 A1 | 6/2007 | Cheng et al. |
| 2007/0165732 A1 | 7/2007 | Geriach |
| 2007/0211674 A1 | 9/2007 | Ragnar Karlberg et al. |
| 2007/0239695 A1 | 10/2007 | Chakra et al. |
| 2008/0025151 A1 | 2/2008 | Karaoguz et al. |
| 2008/0126919 A1 | 5/2008 | Uskali et al. |
| 2008/0161951 A1 | 7/2008 | Morris |
| 2008/0162403 A1 | 7/2008 | Sundaresan |
| 2008/0165693 A1 | 7/2008 | Castro et al. |
| 2008/0195745 A1 | 8/2008 | Bowra et al. |
| 2008/0205291 A1 | 8/2008 | Li et al. |
| 2008/0208963 A1 | 8/2008 | Eyal et al. |
| 2008/0212509 A1 | 9/2008 | Kim et al. |
| 2008/0215873 A1 | 9/2008 | Bobrow |
| 2008/0256272 A1 | 10/2008 | Kampmann et al. |
| 2008/0319833 A1 | 12/2008 | Svendsen |
| 2009/0100489 A1 | 4/2009 | Conradt et al. |
| 2009/0164624 A1 | 6/2009 | Metcalf et al. |
| 2009/0164646 A1 | 6/2009 | Christian et al. |
| 2009/0327512 A1 | 12/2009 | Chapweske |
| 2010/0198943 A1 | 8/2010 | Harrang et al. |
| 2012/0131222 A1 | 5/2012 | Curtis et al. |
| 2014/0112150 A1 | 4/2014 | Ko et al. |
| 2014/0233421 A1 | 8/2014 | Matthews |
| 2014/0237118 A1 | 8/2014 | Matthews |
| 2014/0269301 A1* | 9/2014 | Rungta ............... H04L 47/115 370/235 |
| 2014/0269319 A1 | 9/2014 | Decusatis et al. |
| 2014/0313909 A1 | 10/2014 | Doherty et al. |
| 2015/0023168 A1 | 1/2015 | Kotecha et al. |
| 2015/0149631 A1* | 5/2015 | Lissack ............... H04L 43/16 709/226 |
| 2015/0326479 A1* | 11/2015 | Goodson ............ H04L 12/2854 370/236 |
| 2015/0350083 A1* | 12/2015 | Goodson ............... H04L 47/783 370/236 |

FOREIGN PATENT DOCUMENTS

| | | |
|---|---|---|
| EP | 15672110 | 10/2005 |
| EP | 1622385 A1 | 1/2006 |
| EP | 1841172 | 10/2007 |
| JP | 07336375 | 12/1995 |
| JP | 10124412 | 5/1998 |
| JP | 2002237841 A | 8/2002 |
| JP | 2005184494 A | 7/2005 |
| JP | 2005258912 | 9/2005 |
| JP | 2008104018 A | 5/2008 |
| JP | 2009027303 A | 2/2009 |
| JP | 2010193334 A | 9/2010 |
| KR | 2002-0017926 | 3/2002 |
| KR | 102002-0017926 | 3/2002 |
| KR | 2004-0028401 | 4/2004 |
| KR | 102004-0028401 | 4/2004 |
| KR | 100438697 | 7/2004 |
| KR | 100645742 | 11/2006 |
| KR | 10-2007-0013600 | 1/2007 |
| KR | 102007-0011811 | 1/2007 |
| KR | 100693023 B1 | 3/2007 |
| KR | 20070053884 | 5/2007 |
| KR | 10-2007-0117197 | 12/2007 |
| KR | 100807264 B1 | 2/2008 |
| KR | 10-2008-0039324 | 5/2008 |
| WO | WO 9320637 | 10/1993 |
| WO | WO 2002/047414 | 6/2002 |
| WO | WO 2004/114639 | 12/2004 |
| WO | WO 2005/120122 | 12/2005 |
| WO | WO 2006/099545 | 9/2006 |

OTHER PUBLICATIONS

International Search Report and Written Opinion for PCT/US2016/020774, filed Mar. 3, 2016.

Rie Hayashi et al., "QoS Control Mechanism Based on Real-Time Measurement of Elephant Flows", IEICE Trans. Commun., Aug. 2007, pp. 2081-2089, vol. E90-B, No. 8, The Institute of Electronics, Information and Communication Engineers.

* cited by examiner

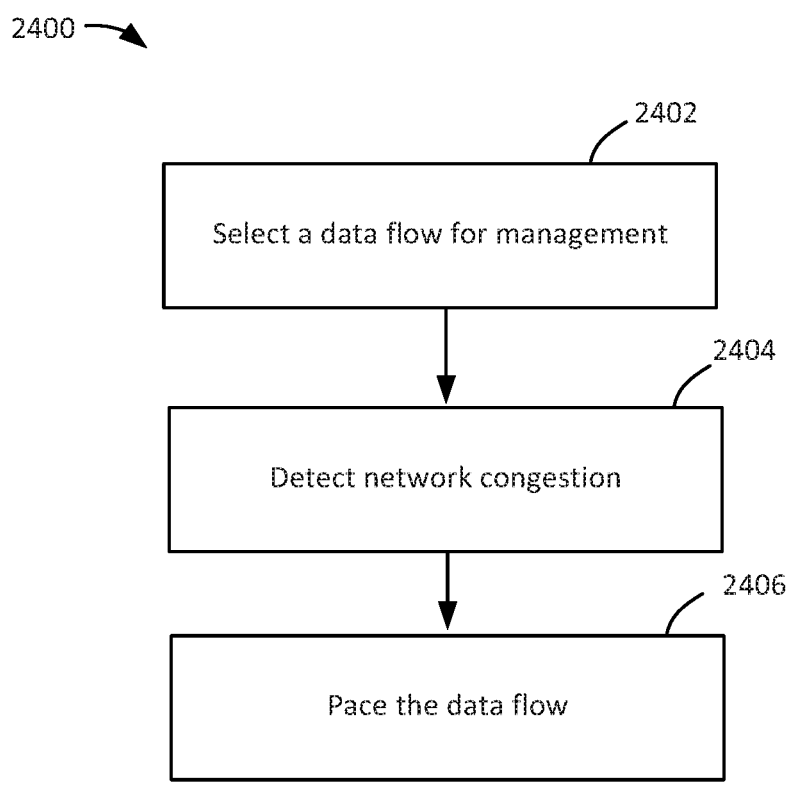

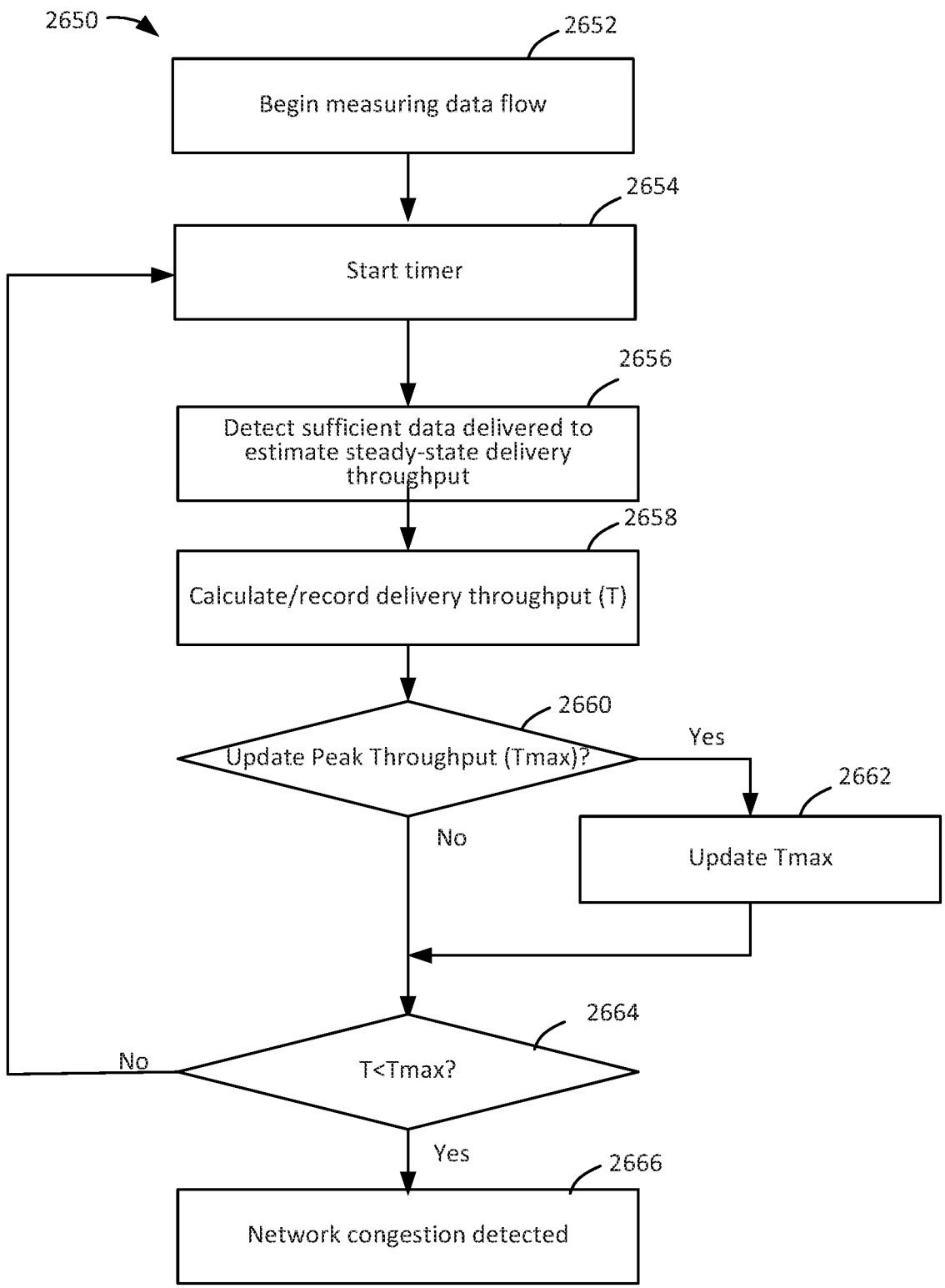

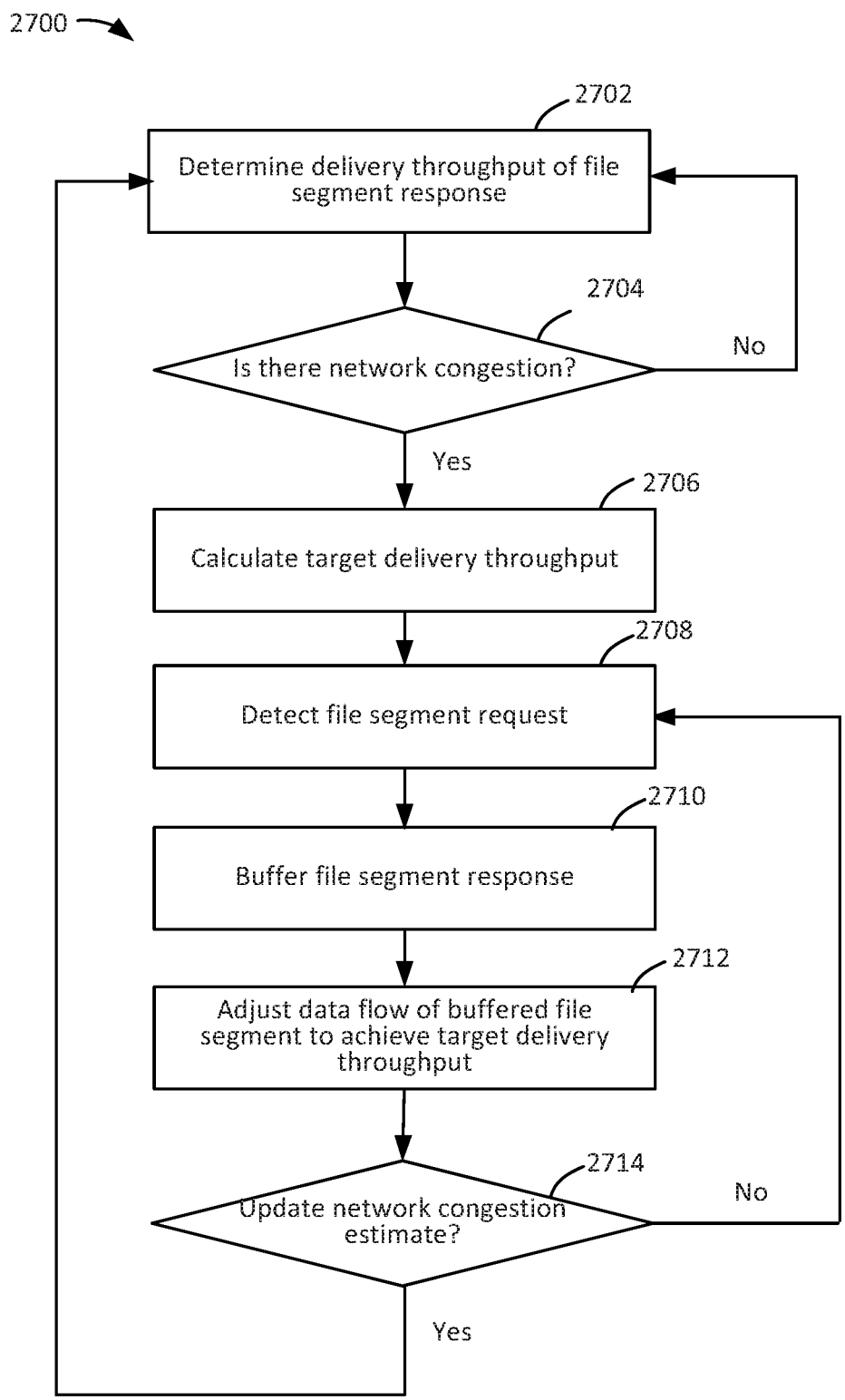

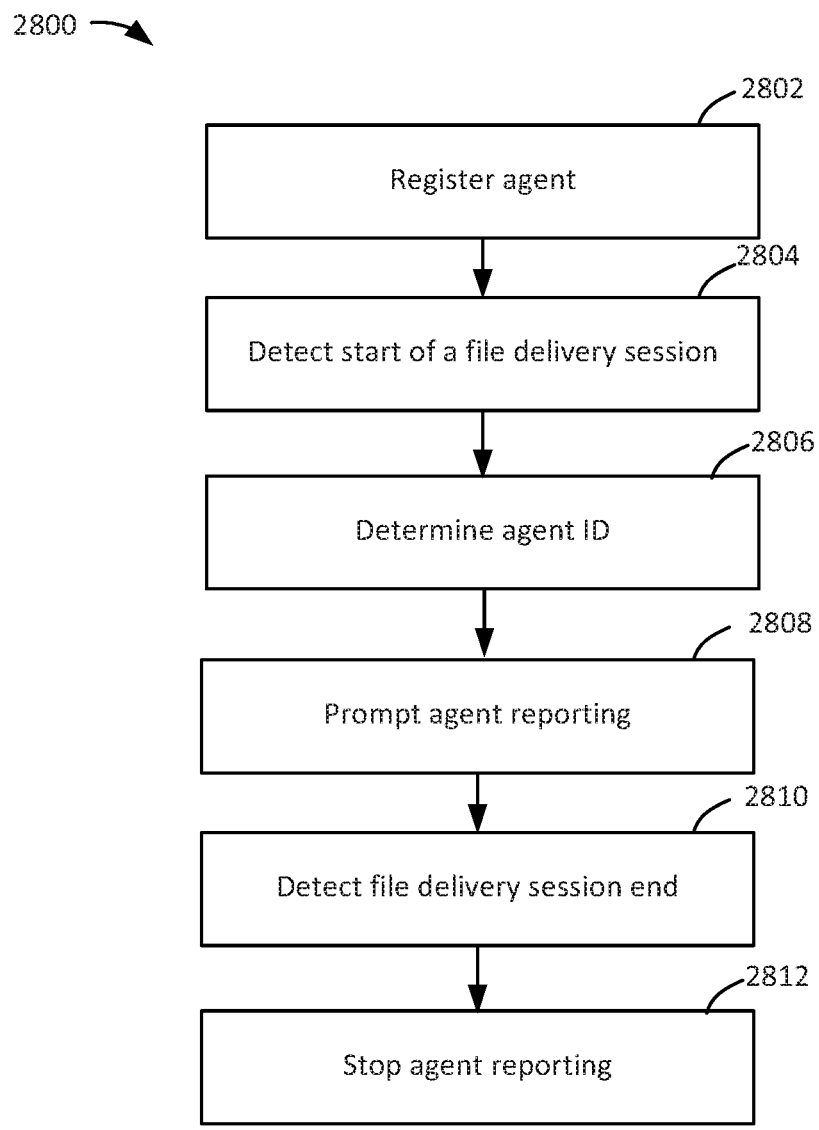

SYSTEM AND METHOD FOR PEAK FLOW DETECTION IN A COMMUNICATION NETWORK

CROSS-REFERENCES TO RELATED APPLICATIONS

This application is a continuation-in-part of U.S. patent application Ser. No. 14/743,944 filed on Jun. 18, 2015, now issued as U.S. Pat. No. 10,396,913, which is a continuation of U.S. patent application Ser. No. 12/904,003 filed on Oct. 13, 2010, now U.S. Pat. No. 9,065,595, which is a continuation-in-part of U.S. application Ser. No. 12/167,158 filed on Jul. 2, 2008, now U.S. Pat. No. 8,719,399, which is a continuation-in-part of U.S. patent application Ser. No. 11/278,809 filed Apr. 5, 2006, now U.S. Pat. No. 7,500,010, which claims the benefit of U.S. Provisional Application No. 60/668,864 filed on Apr. 7, 2005.

This application is also a continuation-in-part of U.S. application Ser. No. 16/358,595 filed Mar. 19, 2019, which is a continuation of U.S. application Ser. No. 15/060,486 filed Mar. 3, 2016, which claims priority to and the benefit of U.S. Provisional Application No. 62/127,753 filed on Mar. 3, 2015, now U.S. Pat. No. 10,270,700, which claims the benefit of U.S. Provisional Application No. 62/277,320 filed Jan. 11, 2016, U.S. Provisional Application No. 62/207,529 filed on Aug. 20, 2015, and U.S. Provisional Application No. 62/127,753 filed on Mar. 3, 2015, the entire respective contents of which are incorporated herein by reference.

BACKGROUND

The present invention is generally related to computer networks, and more particularly related file transmission over such networks.

Networks such as the Internet and wide area networks (WANs) have significant amounts of installed equipment to furnish such services as file transfer services. Based upon capacity of the installed equipment certain sized files can be transmitted efficiently over these networks using conventional transmission methods without sizable impact upon the networks.

Other desired scenarios involving file transfer services have been largely avoided by conventional file transfer methods due to massive sizes of files to be transmitted and/or distribution demands, such as with large scale multicasting of significantly sized files. Examples of such massive file sizes can include large format high-resolution audio-video or electronic game files. Transmissions of massive sized files using conventional methods for networks such as the Internet or WANs including but not limited to wired (Digital Subscriber Line (DSL), cable, powerline), fiber, wireless, satellite, and cellular types, given their current equipment base, could cause significant impact upon these networks, especially if done on a frequent basis, so do not appear to be practical or possibly even feasible. Conventional solutions have focused upon expanding network transmission capacities to meet peak traffic demands. Unfortunately, these conventional solutions require huge expenditure of resources and funds so for the most part remain as questionable options.

SUMMARY

In some embodiments, a method includes selecting a data flow for management, the data flow being transmitted from a first network equipment to a second network equipment, determining, at a third network equipment, a delivery performance of the data flow being transmitted to the second network equipment; detecting network congestion based on the determined delivery performance of the data flow being transmitted to the second network equipment, and pacing, at the third network device and based on the detected network congestion, delivery of the data flow to the second network equipment by reducing a rate at which the data flow is delivered to the second network equipment.

In some embodiments, a transport manager system includes one or more processors, a network interface, a queue, and a storage communicatively coupled with each other, the storage storing computer executable instructions that, when executed by the one or more processors, cause the transport manager system to: determine a delivery performance of a data flow being transmitted from a first network equipment to a second network equipment, detect network congestion based on the determined delivery performance of the data flow, and pace, based on the detected network congestion, delivery of the data flow being transmitted to the second network equipment by reducing a rate at which the data flow is delivered to the second network equipment.

In some embodiments, a system includes one or more processors, a network interface, a queue, a flow detector logic unit configured to select a data flow for management, the data flow being transmitted from a first network equipment to a second network equipment, and a flow manager logic unit configured to: determine a delivery performance of the data flow being transmitted to the second network equipment, detect network congestion based on the determined delivery performance of the data flow being transmitted to the second network equipment, and pace, based on the detected network congestion, delivery of the data flow to the second network equipment by reducing a rate at which the data flow is delivered to the second network equipment.

BRIEF DESCRIPTION OF THE DRAWINGS

FIG. 27 is a high-level logic flow diagram of a process according to an embodiment.

FIG. 29B is a high-level logic flow diagram of a process for determining delivery throughput of a selected data flow and determining whether there is network congestion according to an embodiment.

FIG. 30A is a high-level logic flow diagram of a process for managing the delivery throughput of a data flow according to an embodiment.

FIG. 31 is a high-level logic flow diagram of a process for interacting with an agent according to an embodiment.

DETAILED DESCRIPTION OF THE INVENTION

Figure 1:
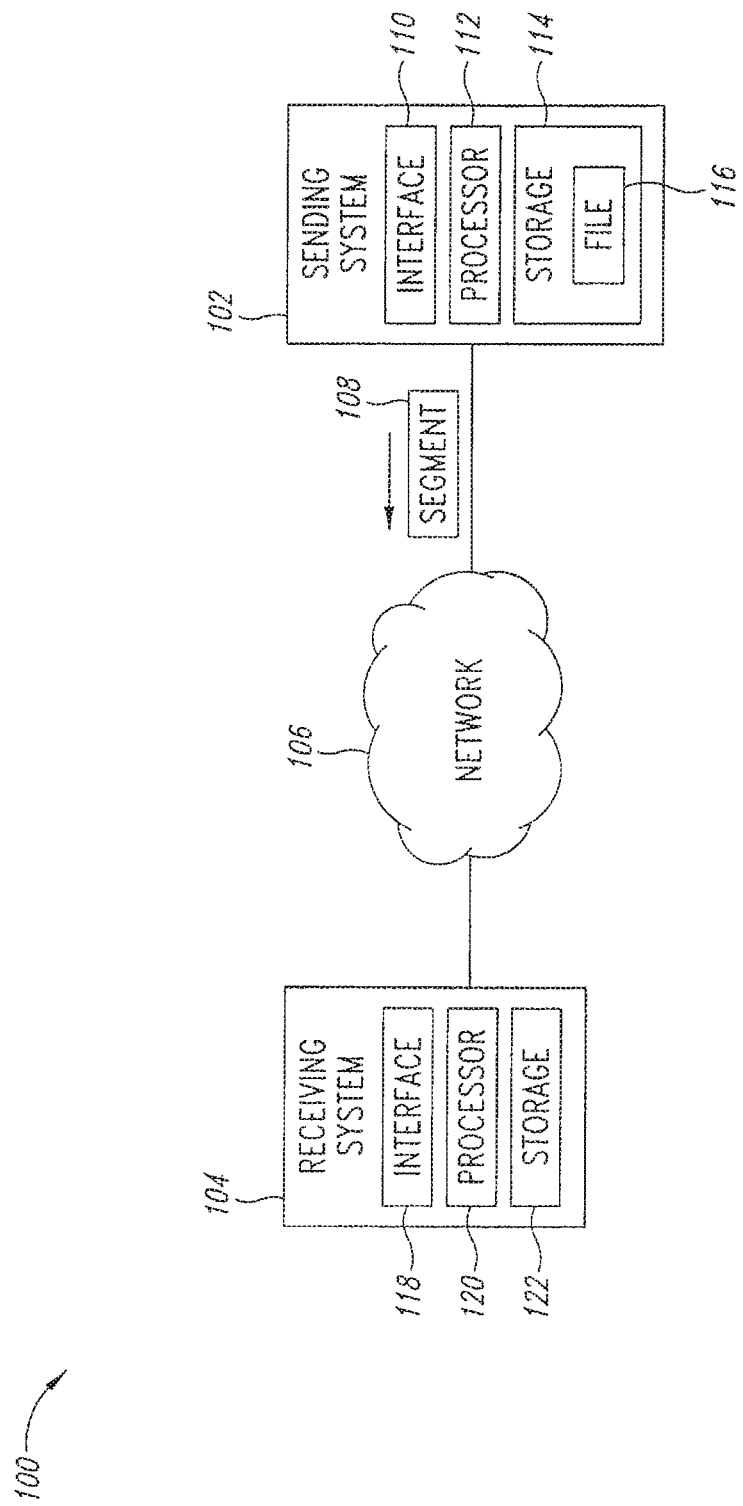
FIG. 1 is a schematic generally representing an exemplary implementation of an adaptive file delivery system.

Peak Flow Detection in a Communication Network

As discussed herein, an adaptive file delivery system and method transmits a data file, such as an audio-video file, over a network or collection of networks in segments wherein each segment is transmitted during a different time period. Each time period has a transmission portion to transmit its associated file segment and a wait portion in which no further interaction with the network occurs regarding the transmitted segment. In some implementations, the duration of the transmission portion of each time period is sufficient to reach a steady-state throughput condition, which allows the traffic load status of the network or networks to be determined from rate measurements of file segment transmissions. The duration of the wait portion of each time period is at least long enough to provide an effective rate of file segment transmission that accommodates network traffic load variations while causing the entire file to be delivered in a predetermined delivery deadline.

In general, networks having large user populations experience regular peak congestion periods with somewhat daily, weekly, and yearly periodicity. Designing networks to weather these peak periods is the domain of traffic engineering. Network designers must focus on peak congestion in order to build out the network resources to handle the load adequately during these exceptional periods of operation. Unfortunately, this necessarily means there are large gaps in time when the networks are underutilized.

Furthermore, with data applications, there is a tradeoff between how much available bandwidth is required between source and destination, and how long it takes to deliver the information. For many applications there is the expectation of real-time or near-real-time latency between the request and delivery of the information. For instance, when a personal computer (PC) user enters a web address, there is the expectation that the page will be retrieved in a few seconds or less. Similarly, for a large email transfer, once the request is made, the network is expected to complete the operation at the peak rate the network is able to deliver. However, for non-real-time applications where the delivery deadline is hours or days away, the data transfer rate can be drastically reduced.

The adaptive file delivery system and method provides selective scheduling of the delivery of massive files, such as large format high resolution audio-video and other media files, during periods of minimum network activity. By extending delivery times, efficient transport of large amounts of information can be accomplished with little or no impact on the existing networks connecting the sender and receiver. The adaptive file delivery system supports massive file transfer while smoothing network peaks created when large number of users are actively online at once. The adaptive file delivery system and method can also be scalable depending upon delivery requirements.

The adaptive file delivery system contributes in reducing network impacts of transferring massive files, in responding quickly to congestion caused by other network traffic, in adjusting transfer rates to maintain delivery deadlines, and in scaling to large numbers of receiving systems and sending systems without impacting worst-case network model scenarios.

An adaptive file delivery system 100 is shown in FIG. 1 to include a sending system 102 and a receiving system 104 both communicatively linked to a network 106. The sending system 102 could be comprised of a computer system or a plurality of collocated or distributed computer systems such as a servers, databases, storage units, routers, switches, firewalls, or other such devices, connected via fiber, wireline, wireless means to the network 106. The receiving system 104 could be collocated with a DVR, PC, network storage unit, client work station, television set top box, modem, gateway, or other such devices such as a personal data assistant (PDA), portable audio-video player, cellular communication device such as a cell phone or in a dedicated hardware unit. The receiving system 104 could be connected via fiber, wireline, wireless means to the network 106. The network 106 could include one or more network components from the Internet or other networks, such as WANs, including but not limited to wired (DSL, cable, powerline), fiber, wireless, satellite, and cellular type networks. The network 106 could include other such network components such as but not limited to modems, routers, bridges, gateways, network interfaces, cabled transmissions, wireless transmissions, local area networks (LANs), access networks, provider networks, and peer-to-peer arrangements. The sending system 102 is shown in FIG. 1 as sending a file segment 108 over the network 106 to the receiving system 104. The sending system 102 includes an interface 110 to access the network 106, a processor 112, and storage 114 containing a file 116 to be transmitted over the network to the receiving system 104 and containing one or more modules with instruction to implement adaptive file delivery methods. The receiving system 104 includes an interface 118 to access the network 106, a processor 120, and storage 122 to store copies of portions of the file 116 received from the sending system 102 and to store one or more modules to implement instructions regarding adaptive file delivery methods. It is understood that the receiving system 104 could be located at an end user's location or be located at some intermediary network location e.g. to serve as a caching mode for distributing content geographically closer to a plurality of end users.

The file segment 108 is a copy of a portion of the file 116. The sending system 102 sends a copy of the file 116 to the receiving system 104 by breaking up the file copy into a plurality of segments such as including the segment 108 shown in FIG. 1. The plurality of segments is sent over the network 106 one at a time until the receiving system 104 has received an entire copy of the file 116. Each segment is sent at a different one of a plurality of time periods.

The time periods each have a transmission portion in which one of the file segments is transmitted and a wait portion in which none of the file segments are transmitted. The wait portions can effectively space out the transmission portions so that the file segments are transmitted over a period of time that is significantly larger than if the segments were transmitted as a continuous stream of segments. The transmission portions of the time periods are spaced out to significantly lessen detrimental impact upon traffic load of the network 106 involved with transmission of massive files. Based upon approaches further described below, larger sized file segments and/or a larger number of the file segments are transmitted when traffic load on the network 106 is relatively light than when traffic load on the network is relatively heavy. By at least partially utilizing periods of light network traffic, massive files can be transmitted with reduced detrimental impact upon traffic load of the network 106.

In some implementations, a user of the receiving system 104 uses a graphical user interface to request of the sending system 102 a file with an associated delivery deadline and priority among a plurality of similar file requests for separate content files. Through the request, the sending system 102 and receiving system 104 are informed that the receiving system has authorization to receive the requested file and are informed of the transfer configuration details. An overview of some of the events occurring with adaptive file delivery are included in the following, not necessarily in the following order: (1) the receiving system 104 requests a file, (2) the sending system 102 locates and obtains authorization for delivery of the requested file and in some implementations obtains a digital rights management (DRM) license, (3) the adaptive file delivery module or modules of the sending system obtains transfer details such as delivery deadline, client profile including client LAN idle-schedule, provider network 106 idle-schedule, file size, and so forth, (4) the adaptive file delivery module or modules of the receiving system obtains transfer details such as identity of the sending system, file size, and so forth, (5) sending system calculates the minimum transfer rate needed to meet the requested delivery deadline and the maximum rate allowable for transfer of segments of the file. Some implementations are based on standard client/server TCP/IP or UDP/IP interactions between the sending system 102 as server and the receiving system 104 as client.

Figure 2:
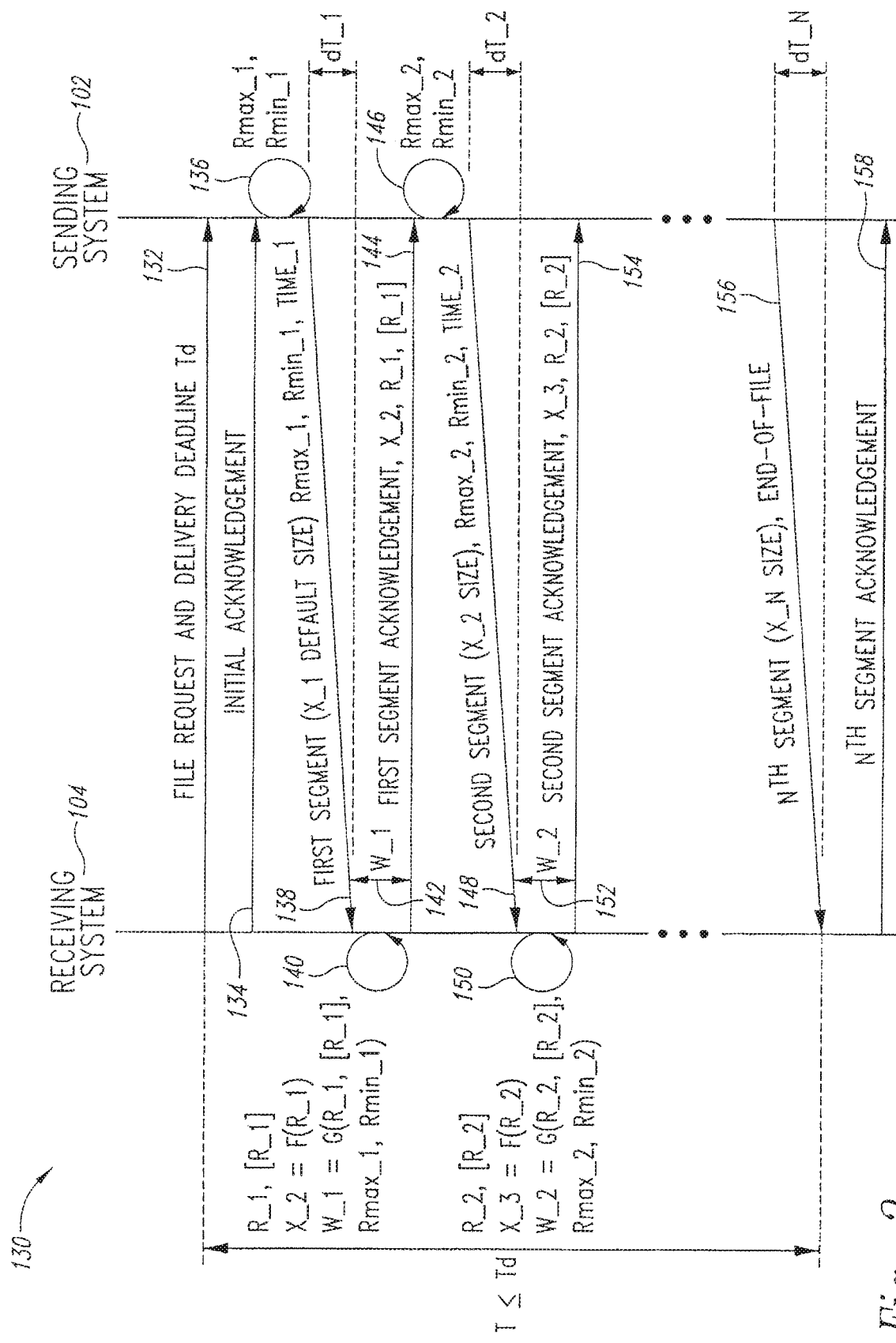
FIG. 2 is an interaction diagram depicting an exemplary implementation of methods used by the adaptive file delivery system of FIG. 1.

An exemplary adaptive file delivery method 130 is shown in FIG. 2 to include the receiving system 104 sending a file request and a delivery deadline, Td, to the sending system 102 (step 132). Although passage of time as depicted in FIG. 2 follows a downward vertical direction, the passage of time is not shown to scale in FIG. 2. Generally, only the time periods, W_j, associated with the wait portions of the transmission periods, and the time periods associated with the time periods, dT_j, associated with the segment transmission portions of the transmission periods require relatively significant amounts of time to pass. Although it may appear on FIG. 2 that other activities depicted take a relatively significant amount of time, as well, these other activities in general take relatively insignificant amounts of time and are allotted additional space along the vertical axis of FIG. 2 only for convenience in displaying the activities due to the limitations of the form of depiction rather than an intent to display these other activities as taking relatively significant periods of time.

The delivery deadline, Td, is generally a time by when a user of the receiving system 104 would desire the receiving system to have received all segments of the file 116. In some implementations, the delivery deadline, Td, may be calculated by the system 100 to be of a certain duration (e.g., a plurality of hours or days from a time the file is first requested or begun to be transmitted or from another time) and as a consequence, may effectively reduce the overall transfer rate of the file to a level even below an overall rated or experienced minimum capacity of the network 106, such as even below a capacity of the network experienced during certain congested periods or experienced during other periods of network activity. The receiving system 104 then sends to the sending system 102 an initial acknowledgment, which serves as a request for the first file segment to be sent by the sending system (step 134). Upon receiving the initial acknowledgment from the receiving system 104, the sending system 102 determines a first maximum segment transmission rate limit, Rmax_1, and a first minimum segment transmission rate limit, Rmin_1 (step 136).

In general, the minimum segment transmission rate limit, Rmin, is determined by the sending system 102 based upon two factors. The first factor is file size, Xrem, of that remaining portion of the file 116 that has yet to be sent by the sending system 102 to the receiving system 104. The second factor is the amount of remaining time available to transmit file segments from the sending system 102 to the receiving system 104 between the present time of the determination, Tnow, and the time of the delivery deadline, Td. The amount of remaining time available may be reduced by predetermined amounts of time, Tunavail, known when adaptive file delivery cannot occur above a configurable lower transfer rate threshold (that could be zero or higher) for the particular file transmission due to unavailability of the network 106 and/or the sending system 102 and/or the receiving system 102 for segment transmission.

These unavailable time periods, Tunaval, may be typically busy periods for the network 106 and/or the sending system 102. The unavailable time periods, Tunaval, can be pre-configured into the profiles of the sending system 102 and/or the receiving system 104. Alternatively, the unavailable time periods, Tunaval, can be determined by the sending system 102 and/or the receiving system 104 by examining historical data of previous transmissions including adaptive file delivery transmissions. For instance, historical data regarding the actual segment transmission rates, $R\_j$, for one or more of the jth segment transmissions of an adaptive file delivery could be examined to determine busy times for the sending system 102, and/or the receiving system 104, and/or the network 106.

For example, a user of the receiving system 104 may want to block adaptive file delivery for a particular time period during each weekday from 9:00 a.m. to 11:00 a.m. if the user's requirements for tasks for the receiving system other than adaptive file delivery necessitates maximum performance from a portion of the network 106 local to the receiving system during those times. For the blocked period, the user of the receiving system 104 could configure the profile of the receiving system to indicate whether a transfer was permitted to proceed during this blocked period at some minimal background rate, such as a rate below $Rmin\_j$. Alternatively, the user may configure the profile of the receiving system 104 to not receive any adaptive file delivery during this blocked period. If a user of the receiving system 104 does not specify a time period when the user does not want the receiving system to receive file segments, then the receiving system can learn these block out periods by monitoring use of the receiving system and one or more portions of the network 106 local to the receiving system for such things as busy periods, variation in segment transmission rates, etc. Similarly, an access network provider might want to block adaptive file delivery for particular busy hour periods during each day if the providers network was otherwise busy or near capacity with unrelated traffic. The provider might also want to limit the plurality of adaptive file delivery jobs across their network to an aggregate minimal background rate.

A prudent measure would insure that the sending system 102 would conservatively determine the value for each minimum transfer rate, $Rmin\_j$, to be larger than may be necessary to meet the requested delivery deadline, Td, if actual practice fortunately has more favorable conditions than may be conservatively anticipated. It is understood by this conservative approach that calculations of $Rmin\_j$ typically presuppose a "just in time" completion of adaptive file delivery based on the remaining file size and any anticipated idle periods.

Since the network 106 may have a surplus capacity not factored into the conservative $Rmin\_j$ determinations, the adaptive file delivery may proceed faster than an estimate based upon segment transmissions performed exclusively at an average rate of all the $Rmin\_j$ involved in the adaptive file delivery. Consequently, a number of actual transfers of various massive files may finish early. Using a conservative approach of estimating $Rmin\_j$ provides a buffer of time against unanticipated network congestion and maintains the expectation of completing the adaptive file delivery by the requested delivery deadline, Td. If, due to unexpected congestion, a transfer falls behind its minimum rate schedule, the adaptive file delivery methods automatically compensates by gradually raising the minimum transfer rate, $Rmin\_j$, after each successive jth segment transmission as the delivery deadline approaches. This gradual raising of successive minimum transfer rates, $Rmin\_j$, is a graceful way of adjusting priorities to favor late jobs over on-time or ahead-of-schedule jobs. $Rmin\_j$ is evaluated by the sending system 102, or in alternative implementations by the receiving system 104, each time a file segment is sent from sending system to the receiving system.

An exemplary equation for determination of Rmin for the jth transmission is as follows:

$$Rmin\_j = Xrem\_j/(Td - Tnow\_j - Tunaval\_j). \quad (1)$$

In some implementations, the sending system 102 can send updates to an estimated delivery time, which may be the same as, sooner than, or later than the requested delivery deadline, Td, depending whether any delaying events occur on the network 106. A practical result of keeping the receiving system 104 updated as to an estimated delivery time would be to reduce the number of inquiries by a user of the receiving system regarding this estimated delivery time.

In general, the maximum segment transmission rate limit, Rmax, is greater than the minimum segment transmission rate limit, Rmin, by an amount depending on one or more of a number of possible factors including any additional surplus transmission capacity of the sending system 102 that has not been allocated to another transmission task. Other possible factors that could be used to influence Rmax include the maximum permitted transfer rate to a user determined by their service agreement with their network provider, the actual measured rate of last segment or averaged rate of the last N segments, preconfigured access network provider profiles, etc. Thus, the maximum segment transmission rate limit, Rmax, is determined by the sending system 102 based upon three factors.

The first factor is the minimum segment transmission rate limit, Rmin, already determined. The second factor is the maximum transmission rate capacity, Rcap, of the sending system 102. Maximum transmission capacity of the sending system 102 is affected by such things as transmission bandwidth capacity of the interface 110 of the sending system.

The third factor takes into consideration not only the present task for the sending system 102 to transmit the file 116 to the receiving system 104, but also takes into consideration any other active jobs for other file transmission tasks undertaken by the sending system to transmit at least a portion of another file to the receiving system 104 or any other receiving systems during the time span in which the file 116 is to be sent. The number of these other tasks can be expressed as "Q−1" so that the number Q includes all active transmission jobs including the file 116 transmission task.

One approach assumes that any surplus transmission capacity of the sending system 102 would be allocated equally among the Q transmission tasks. By this approach, transmission surplus allocated to the file 116 transmission task would be the difference between Rcap/Q and the average of the minimum segment transmission rate limits of the Q transmission tasks, <Rmin>. The average <Rmin> can be expressed as Sum(Rmin)/Q where Sum(Rmin) represents the sum of all the various minimum segment transmission rate limits for the Q transmission tasks.

An exemplary equation for determination of maximum segment transmission rate limit, Rmax, for the jth segment transmission of file 116 transmission task is as follows:

$$Rmax\_j = Rmin\_j + Rcap/Q\_j - Sum(Rmin)j/Q\_j.$$

It is understood that Rmaxj as calculated in Equation 2 would be limited to values equal to or exceeding Rmin_j.

Equation 2 is an example of a policy that the sending system 102 might enforce but other policy decisions could equally be employed to calculate Rmax. For instance, an alternative approach would not equally share surplus bandwidth but would rather give priority to selected transmission jobs. For instance, in order to give surplus transmission capacity temporarily to particular jobs, the sending system 102 could use congestion measurements to reduce Rmax for jobs that were unable to take advantage of the maximum allocated rate.

In addition to Equation 2, it is further understood that Rmax_j could be subject to a number of additional constraints intended to further react to congestion sensed in the network 106. An additional exemplary Equation (2a) for determination of the maximum segment transfer rate limit, Rmax, for jth segment of file 116 transfer task is as follows:

$$Rmax\_j = H(R\_(j-1)) * Rmax\_j \quad (2a)$$

where Rmax_j on the right side of Equation 2a is as calculated in Equation 2 above and where R_(j-1) is the actual measured rate of the previously sent segment or zero if it is the first segment. For example $$H(R\_(j-1)) = (R\_U - 1)/R_{peak})**n, n=2,3 \quad (2b)$$

where $R_{peak}$ is the maximum allowed throughout to a given receiving system 104, e.g. enforced by the receiving system's network 106. Other functional dependencies on the measured rate R as in equation 2b and other congestion sensing metrics are possible including configured time-of-day profiles from operators of the network 106, feedback of congestion sensing agents in the network 106, and so on.

After determining the first maximum segment transmission rate limit, Rmax_1, and the first minimum segment transmission rate limit, Rmin_1 in step 136, the sending system 102 transmits a first transmission (step 138) including a first segment of the file 116, values for Rmax_1 and Rmin_1 and a time stamp indicating the time that the first transmission was sent from the sending system.

The first transmission is the transmission portion of a first time period, which also includes a wait portion as discussed further below. The file size of the first segment, X_1, is a predetermined default value. In general, a file segment is made up of a number of smaller file subsegment portions. In some implementations, a file to be transmitted to the receiving system 102 from the sending system 102, is stored in storage 114 of the sending system formatted into segments of sequentially numbered sub-segment portions of fixed size. Although in these implementations the size of the subsegment portions do not change, individual segments made up of sub-segment portions can have different sizes by containing different number of sub-segment portions. The sub-segment portions can be sized to be the smallest portion of a file that can be sent by a network having a predetermined transmission capacity typically having a smallest practical value.

Upon receipt of the first transmission from the sending system 102, the receiving system 104 performs a number of determinations (step 140) regarding (1) the actual transmission rate, R_1, of the first transmission, (2) the effective transmission rate [R_1] of the first transmission, and (3) the time duration, W_1, of the first wait portion of the total time period associated with the first transmission.

In determining the actual transmission rate of the first transmission, the receiving system 104 determines the time difference, dT_1, between completion time of the first transmission as measured by the receiving system and start time of the first transmission as indicated by the time stamp found in the first transmission received by the receiving system. This time difference, dT_1, is used by the receiving system 104 as the transmission time for the first transmission.

The receiving system 104 either measures or reads from data included with the first transmission the segment size, X_1, of the first segment sent in the first transmission. The receiving system 104 is then able to calculate an actual transmission rate, R_1, of the first transmission by the following general equation for the jth transmission:

$$R\_j = Xj/dT\_j.$$

The receiving system 104 then determines an effective transmission rate, [R_1], of the first transmission to accommodate present conditions regarding the sending system 102 and the network 106 known to the sending system. In general, the effective transmission is the file size of a segment divided by the total duration of the time period associated with the segment. This time period as discussed above includes a segment transmission portion and a wait portion. If the wait portion had a duration of zero, then the effective transmission rate would be equal to the actual transmission rate, which, if it exceeded Rmax, would most likely cause detrimental network impact for transmission of massive files or multicast transmission of significantly sized files. By selecting an effective transmission rate that is significantly smaller than the actual transmission rate and consistent with Rmax, the sending system 104 can lessen or virtually eliminate detrimental impact to the network 106 of transmission of massive files or multicast transmission of significantly sized files.

In some implementations, the network 106 could be made up of portions such as including the Internet, a regional network, and a local network serving the receiving system 104. Given the determined value of the actual transmission rate, R_1, of the first transmission and possibly given status input from other devices such as network probes or status information of the sending system 102 contained in the first transmission, the receiving system 104 selects an effective transmission rate, [R_1], for the first transmission that is appropriate to whatever status information is known to the receiving system.

By using the determined actual transmission rate, R_1, of the first transmission and possible other input, the receiving system 104 is able to react to congestion between the sending system 102 and the receiving system wherever the congestion may be located. For instance, if a portion of the network 106 local to the receiving system 104 is busy with unrelated traffic or has status unknown to the receiving system, the receiving system can select an effective transmission rate, [R_1] for the first transmission equal to the first minimum segment transmission rate limit, Rmin_1. Selection of the first minimum segment transmission rate limit will cause the least amount of impact upon the network 106 while still meeting the delivery deadline, Td.

On the other hand, if the network 106 is known by the receiving system 104 to be practically idle, the receiving system can select an effective transmission rate, [R_1], for the first transmission equal to the first maximum segment transmission rate limit, Rmax_1, which would still not detrimentally impact the network given that little if any other network traffic is present. Typically, network conditions and those of the sending system 102 may be in an intermediate condition so that if this condition is known to the receiving system 104, the receiving system would select an effective transmission rate, [R_1], for the first transmission between the first minimum segment transmission rate limit, Rmin_1, and the first maximum segment transmission rate limit, Rmax_1.

The receiving system 104 can also halt an adaptive file delivery altogether or proceed at an effective transmission rate, [R_j] for the jth transmission at a rate even below the value of minimum segment transmission rate, Rmin_j, for the jth transmission to accommodate other adaptive file deliveries or other activities on the network 106 and/or on the sending system 102 and/or the receiving system 104. For example, in some versions the receiving system could be notified by software congestion sensing agents attached to a local area network shared by the receiving system, that the local area network was becoming congested with unrelated network traffic, whereupon the receiving system could halt or reduce the effective transmission rate of the adaptive file delivery. In cases where the receiving system 104 has adjusted the effective transmission rate, [R_j] for the jth transmission below the minimum segment transmission rate, Rmin_j, for the jth transmission, the sending system 102 recalculates an incrementally larger minimum segment transmission rate, Rmin_j+1 for the j+1 th segment transmission based on the remaining file size and delivery deadline. Consequently, pacing of the segment transmissions tends to accommodate unexpected network congestion or interruptions in transmission. In other implementations, selection of the effective transmission rate for the jth transmission, [R_j] can be required to always stay between the minimum segment transmission rate limit and the maximum segment transmission rate limit for the particular transmission involved.

The receiving system 104 paces transmissions of the segments by selection of the effective transmission rates to transfer a copy of the file 116 from the sending system 102 at an adaptive rate to accommodate changing conditions with the sending system 102 and/or the receiving system 104 and/or the network 106. By using the value for the actual transmission rate, R_1, of the first transmission and possible other input, the receiving system 104 is able to make an intelligent choice for the effective transmission rate. Through these adaptive file transfer methods, the segment transmissions are used as an actual sounding system for the end-to-end downlink connection capacity from the sending system 102 to the receiving system 104. The adaptive file delivery system 100 can then react to congestion between the sending system 102 and the receiving system 104 regardless of location of the congestion.

Based upon a selection by the receiving system 104 for the effective transmission rate, [R_1], for the first transmission, the time duration, W_1, of the first wait portion of the total time period associated with the first transmission can be derived by the following general equation for the jth transmission:

$$W\_j = X_j/[R\_j] - X\_j/R\_j.$$

As part of step 140, the receiving system 104 also calculates the size of the next segment to be sent by the sending system 102, namely, the second segment having a second segment size, X_2. To do so, the receiving system 104 uses a predetermined general value, Tss for the amount of time required for the network 106 to reach a steady-state condition in transmitting a segment. For instance, in a TCP environment, Tss could be equal to approximately 5 seconds. The actual transmission rate, R_1, for the first transmission is multiplied by Tss to get X_2 by the following general equation:

$$X\_j+1 = R\_j * Tss.$$

It is also illustrated that variability in the actual transmission rates from one file sequent transfer to the next might cause undesirable oscillation in the calculation of X_(j+1). One practical method for avoiding this is to use a sliding window average of the last N samples of the actual transfer rate R.

After waiting (step 142) the time duration, W_1, of the first wait portion of the total time period associated with the first transmission, the receiving system 104 transmits (step 144) a first segment acknowledgment including the second segment size, X_2, to the sending system 102.

The sending system 102 then determines (step 146) a second minimum segment transmission rate limit, Rmin_2, using equation (1) and a second maximum segment transmission rate limit, Rmax_2 using equation (2). The sending system 102 transmits a second segment of the file 116 having the second segment size, X_2 in a second transmission (step 148). The sending system 102 also transmits values for Rmax_2 and Rmin_2 and transmits a timestamp indicating the time that the second transmission was sent from the sending system 102.

Upon receiving the second segment, the receiving system 104 calculates (step 150) the time required for the second segment transmission, dT 2, and using the value for the second segment size, X_2, determines the actual transmission rate, R_2, of the second segment from equation (3). Also in step 150 the receiving system 104 selects an effective transmission rate for the second segment [R_2] based upon known network traffic conditions as discussed above and then determines a second wait portion, W_2, for the total time period associated with the second transmission according to equation (4). The receiving system 104 then determines a third segment size, X_3, according to equation (5).

After waiting (step 152) the second wait portion, W_2, of the total time period associated with the second transmission, the receiving system 104 sends a second segment acknowledgment (step 154) including the value for the third segment size, X_3.

Subsequently, the sending system 102 sends remaining segments of the file 116 to the receiving system 104 according to the procedure discussed above until the final nth segment of the file 116 is sent in an nth segment transmission (step 156) to the receiving system optionally including an end of file indication.

The adaptive file delivery proceeds in this fashion, paced by the receiving system 104, until the adaptive file delivery is complete. In the unfortunate event that the adaptive file delivery stalls or is disrupted by a network outage, the receiving system 104 retains the state of the transfer in the storage 122, such as non-volatile memory, for resuming the adaptive file delivery at the point of interruption to minimize or prevent wasted bandwidth. The receiving system 104 detects a stalled session, for example, by maintaining a count-down timer, such as found in a module stored in the storage 122 and implemented by the processor 120.

The count-down timer can start when the receiving system 104 makes the initial request to the sending system 102.

The sending system 102 can then repeat for requests up to a given number of repetitions for adaptive file delivery each time the count-down timer expires after being reset. At each reset of the count-down timer the count-down time until expiration can be increased by a large factor, such as by an exponential factor, so that additional requests by the receiving system 104 can be spaced out accordingly. At the end of the final request by the receiving system 104 for adaptive file delivery, the receiving system can then declare the particular adaptive file delivery session to be stalled and can then attempt to connect to a second one of the sending systems 102, if available, for continuation of the adaptive file delivery. If the receiving system 104 fails to make contact with a second one of the sending systems 102, the receiving system can continue to make periodic attempts to contact one of a number of the sending systems listed as available until the delivery deadline, Td, has passed, after which the particular adaptive file delivery job is terminated by the receiving system and any portions of the file 116 that are stored in the receiving system are erased and an error is logged for notification to the receiving system user(s).

Since the nth segment is the final segment of the file 116, in some implementations, the receiving system 104 does not perform determinations regarding an actual nth segment transmission rate, $R\_n$, an effective nth segment transmission rate, $[R\_n]$, etc. but rather sends an nth segment acknowledgment (step 158) to the sending system 102 without executing a wait portion, $W\_n$, for the nth transmission.

Figure 3:
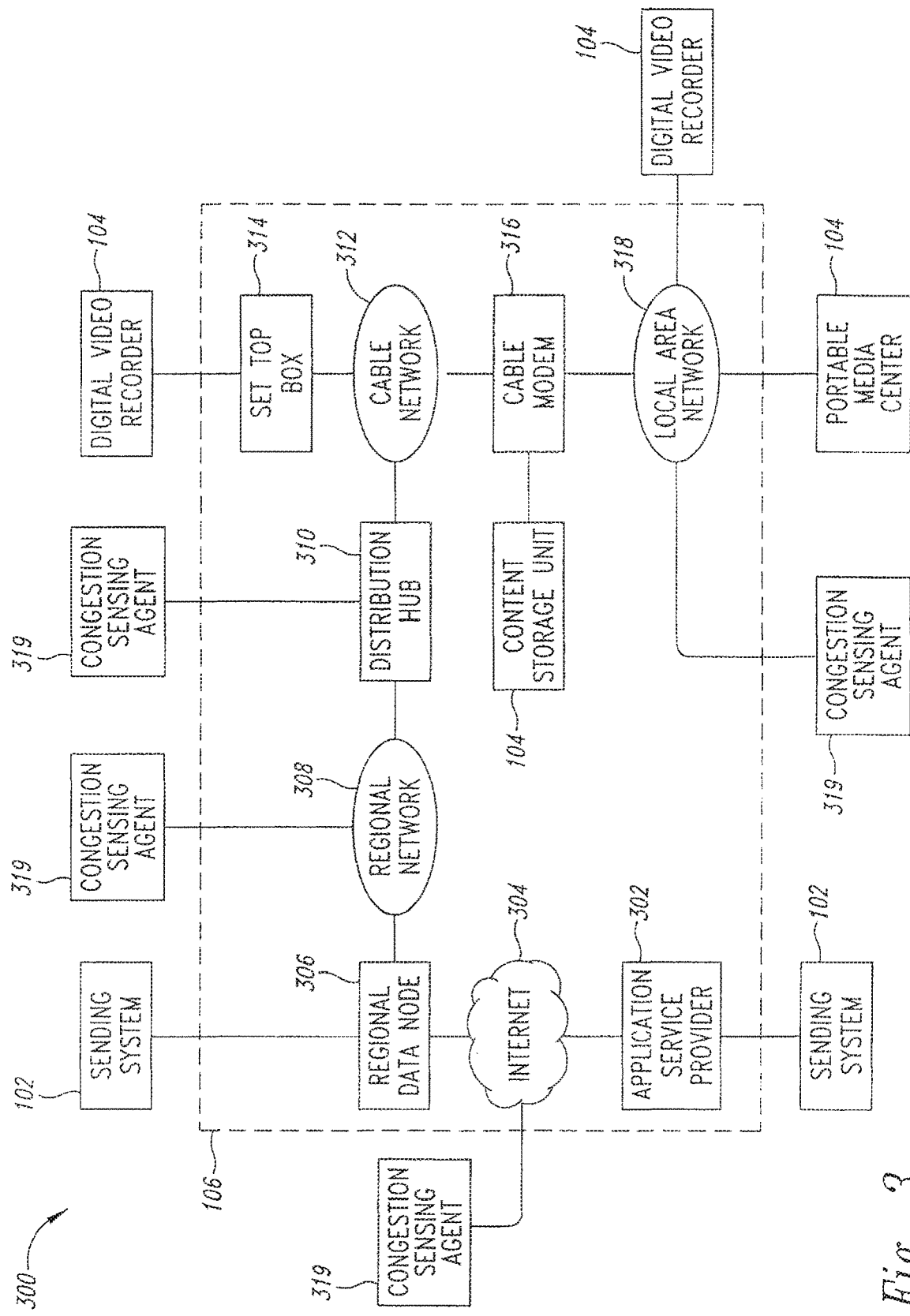
FIG. 3 is a schematic showing a first collection of exemplary implementations of the adaptive file delivery system.

A first collection 300 of exemplary implementations of the adaptive file delivery system 100 are shown in FIG. 3 as having one instance of the sending system 102 communicatively linked to an application service provider 302 that is communicatively linked to the Internet 304, which in turn is communicatively linked to a regional data node 306. Another instance of the sending system 102 is directly communicatively linked to the regional data node 306. The regional data node 306 is communicatively linked to a regional network 308, which is communicatively linked to a distribution hub 310, which is communicatively linked to a network 312 such as a hybrid fiber cable network.

An instance of the receiving system 104 as a digital video recorder is communicatively linked to the cable network 312 through a set-top box 314. Other instances of the receiving system 104 as a digital video recorder and as a portal media center are communicatively linked to the cable network 312 through a cable modem 316 and a local-area network 318. In some implementations, a congestion sensing agent 319 is communicatively linked to the local area network 318 to report to the sending system 102 or the receiving system 104 regarding network activity and network congestion on the local-area network for adjustment of when file segment transmissions occur. For example, a congestion sensing agent 319 or a plurality of similar agents communicatively linked to the local area network 318 could define a minimum throughput threshold for triggering a report of network activity not associated with an adaptive file transfer to the receiving device 104. Alternatively, the network activity report could contain a measure of the local area network 318 ingress and egress traffic activity, as seen by the congestion sensing agent 319 and reported to the receiving system 104, in order for the receiving system to determine the local area network congestion by comparing the reports with the configured or measured peak capacity of the local area network 318. It is further understood that in some versions, after exceeding a throughput threshold and triggering a report to the receiving system 104, the congestion sensing agent would not re-arm its reporting mechanism until it measured network activity below the trigger threshold by a delta to prevent an excessive of reports from being sent to the receiving system when the measured network activity was alternating just below and just above the trigger threshold.

In some versions, one or a plurality of congestion sensing agents 319 shown for example in FIG. 3 communicatively linked to the distribution hub 310 or the regional network 308 or the Internet 304 could provide measured reports of network activity or signal network congestion to the sending system 102. These congestion sensing agents would report to the sending system 102 in some versions or to the receiving system 104 in other versions to signal the network activity at specific points in the network 106.

Figure 4:
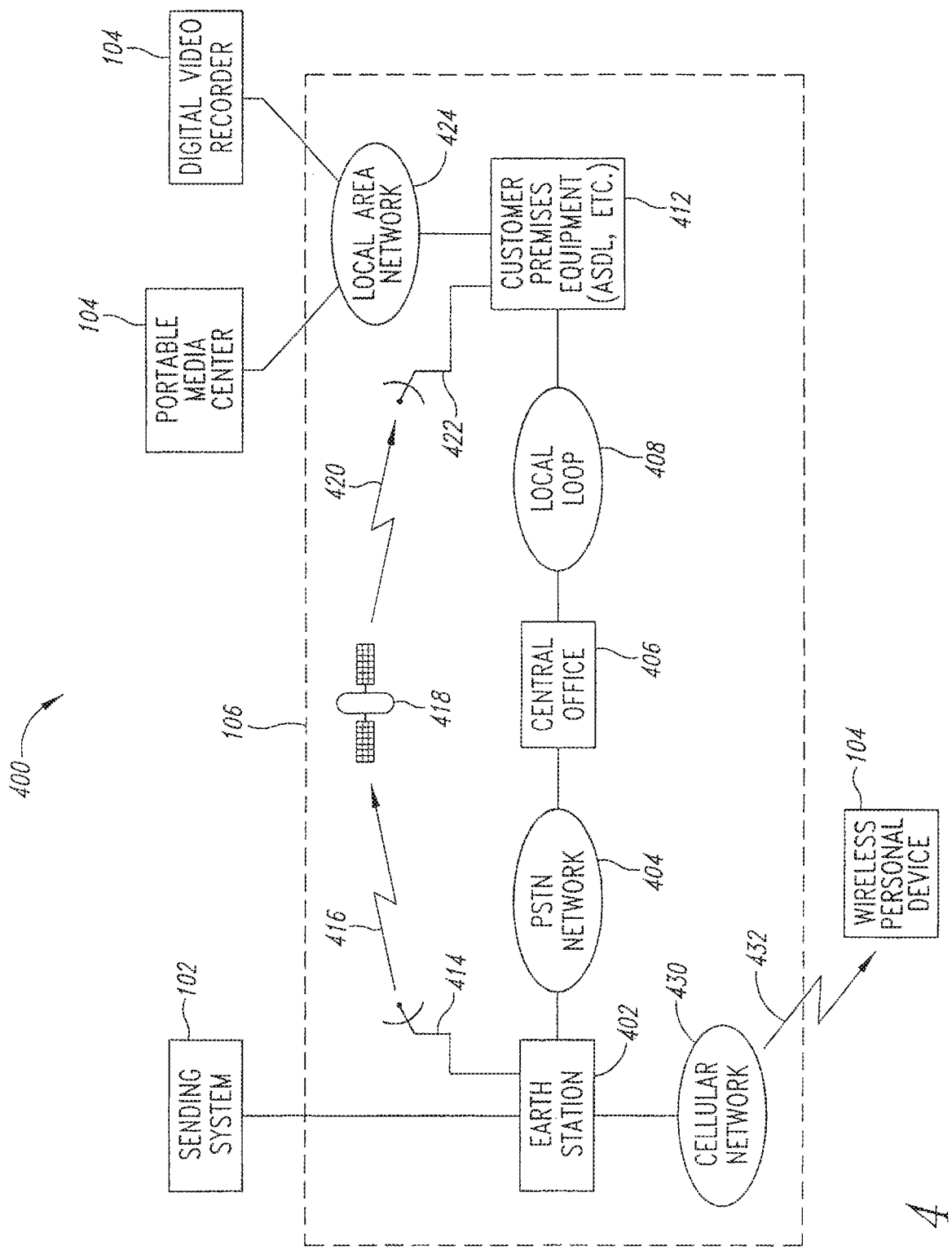
FIG. 4 is a schematic showing a second collection of exemplary implementations of the adaptive file delivery system.

A second collection 400 of exemplary implementations of the adaptive file delivery system 100 are shown in FIG. 4 as having one instance of the sending system 102 communicatively linked to an earth station 402 that is communicatively linked to a public switched telephone network (PSTN) 404 that is communicatively linked to a central office 406 that is communicatively linked to a local loop 408 that is communicatively linked, such as through a customer premises equipment, such as an asymmetric digital subscriber line (ADSL) device, 412.

The earth station 402 is also communicatively linked to a satellite sending system 414 that sends signals 416 to a satellite 418 that relays the signals 422 to a receiving station 422 that is communicatively linked to the customer premises equipment 412. Instances of the receiving system 104 as a digital video recorder and as a portable media center are communicatively linked to the customer premises equipment 412 through a local-area network 424. The earth station 402 is also communicatively linked to a cellular network 430 that sends wireless signals 432 to an instance of the receiving system 104 as a wireless personal device.

Although the receiving system 104 has been depicted in particular implementations, numerous other implementations can be used as well to receive massive files and output content of the massive files through audio output and/or video output and/or other output. Generally, approaches can implement a client/server model in which the receiving system 104 is the client and the sending system 102 is the server. However, other approaches using other models can be used.

Various implementations for the network 106 have been depicted, however, numerous other implementations can be used as well. For instance, the sending system 102 could alternatively be located in a local access network of the receiving system 104 without changing basic delivery architecture of the network 106 communicatively linking the sending system to the receiving system.

The adaptive delivery system and method is inherently highly scalable. The adaptive delivery system and method can be scaled to support large pluralities of simultaneous instances of the adaptive delivery method being executed on each one of one or more large pluralities of instances of the sending system 102. By executing large pluralities of simultaneous instances of the adaptive delivery method, each instance of the sending system 102 can send massive files to large pluralities of the receiving system 104. In general, arrays of instances of the sending system 102 can be located in separate regional facilities to support sending massive files through simultaneously executed instances of the adaptive file delivery method to large pluralities of instances of the receiving system 104. These arrays or other sorts of collections for the sending system 102 could be positioned in a central location on the network 106 or could be distributed across the network. Various components of the sending system 102 could be located in a same hardware device or could be distributed amongst various hardware devices. Also, various segments of a massive file could be distributed amongst multiple instances of the sending system 104 or multiple instances of the same massive file could be stored on multiple instances of the sending system 104 so that the overall file delivery system 100 including multiple instances of the sending system 104 can send segments of the massive file to the receiving system 102 using pathways of the network 106 according to fluctuating network traffic loads. For instance, various segments of a massive file can be sent from multiple instances of the sending system 104 to insure a reduced impact to any already congested portions of the network 106 through use of such assisting factors as updated or near real time monitoring and feedback on a segment transmission by segment transmission basis if desired. Balancing of the instances of the sending system 104 could be implemented to reduce overall bandwidth impact to the network 106 to efficiently use resources of the network. One approach to determine whether the sending system 104 is at maximum capacity is to verify whether the sending system can accommodate another file transfer job with the associated minimum transfer rate, Rmin.

Additional monitoring systems, such as involving the congestion sensing agent 319 described above or involving other congestion sensing agents or sounding agents, and methods may be used to refine determination by the receiving system 104 of the jth wait period w_j. For instance, one or more modules containing code to implement portions of the adaptive file delivery methods for the receiving system 104 could reside on a gateway device communicatively linking a portion of the network 106 local to receiving system 104 to another portion of the network closer to the sending system 102.

As an example, gateway devices hosting such monitoring systems may include a cable or DSL modem or LAN switch, router, or hub. A software agent on the gateway could monitor Internet or other local network usage. The software agent on the gateway could monitor any network traffic not associated with an adaptive file delivery transmission particular to one or more of the sending system 102 and the receiving system 104 combinations. Upon notification of local network traffic local to the receiving system 104 by the software agent, the receiving system 102 client could take appropriate action by slowing or stopping an ongoing segment transmission, as discussed above, until the portion of the local network is again reasonably accommodating to another segment transmission. Appropriate timers and lower usage limits could be in place to average usage over a period (e.g. 5 minutes and 10 kbps) so that insignificant background activity below a threshold can be ignored.

Alternatively, software agents could be installed on computer workstations on a portion of the network 106 local to the receiving system 104 that could discover and report via the local portion of the network to the receiving and/or the sending system 102 when activity on other portions of the network, such as an Internet portion, was detected by one of the workstations as being unacceptably busy for a segment transmission.

Alternatively, a device, such as a two-port Ethernet hardware/software module could be installed in-line with a gateway or broadband modem local to the receiving system 104. The device could monitor all traffic passing through it and report activity on one or more portions of the network 106, such as Internet activity, not associated with a segment transmission from the sending system 102 to the receiving system 104.

Each session of the adaptive file delivery method probes and can react to access network congestion for each file segment that is delivered by monitoring and reporting the actual transfer performance. In addition to this, a global view of capacity/congestion issues for the network 106 may optionally be augmented by software sounding agents strategically located across the access portions of the network and reporting back to the sending system 102. These sounding agents could report a local view of total aggregate bandwidth and remaining capacity. For example, in DSL networks these network activity measuring sounding agents could be located at DSL access multiplexers (DSLAMs), and for cable networks they could be located at each cable modem termination system (CMTS) and for 3G, cellular they could be located at the base stations or Access Service Node gateways. The sending system 102 could then have additional information to refine policy profiles for a particular access provider or other portion of the network 106 in order to constrain total volume of traffic sessions being delivered at any time across the network 106 or to a particular portion. For instance, this constraint could be implemented based on time-of-day or percentage of available surplus capacity of the network 106.

Figure 5:
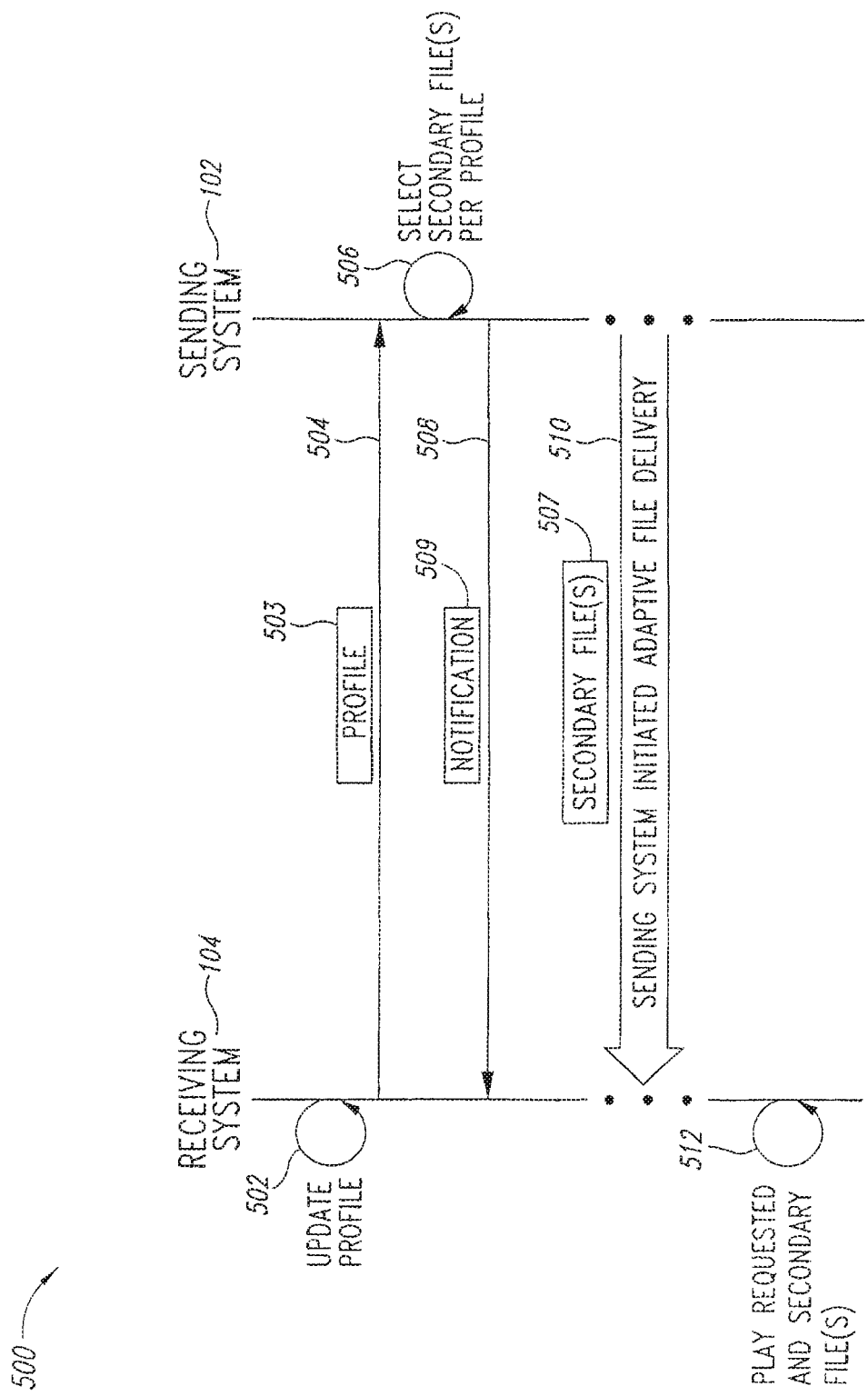
FIG. 5 is an interaction diagram depicting an implementation of the adaptive file delivery system as sending system initiated.

An implementation 500 of the adaptive file delivery system 100 is depicted in FIG. 5 with the receiving system 104 updating (step 502) a profile 503 and sending (step 504) the profile to the sending system 102. In some versions of the implementation 500, on a periodic or other continuing basis, the profile 503 can be updated and sent to the sending system 102. The profile 503 may be initially empty of pre-populated with certain data, but overtime, data in the profile is generally updated and refined according to observations of one or more users of the receiving system 104 as further described below. The sending system 102 selects (step 506) secondary files 507 in accordance with an association with the profile 503 to be sent to the receiving system 104. The association between the secondary file selection and the profile 503 can be done in any of a variety of ways depending on predetermined or otherwise obtained strategies such as advertising and/or marketing strategies.

In some versions of the implementation 500, the sending system 102 sends (step 508) a notification 509 to the receiving system 104. The notification 509 notifies the receiving system 104 that the sending system 102 will be sending the selected secondary files 507 to the receiving system through adaptive file delivery since the receiving system has not requested the secondary files. Over a time span, the sending system 102 sends the secondary files 507 to the receiving system 104 through adaptive file delivery initiated by the sending system (step 510). The sending system 102 and/or the receiving system 104 records what content of the secondary files 507 have been stored in the receiving system 104.

In some versions of the implementation 500, space on storage 122 for storage of the secondary files 507 is highly scrutinized and kept to a minimum, and outdated secondary files are readily deleted. In other implementations, deletion management may be left up to a user of the receiving system 104. The receiving system 104 then plays (step 512) the secondary files intermixed with other files that were requested and received by the receiving system.

Versions of the implementation 500 can be used for caching of the secondary files 507 as advertisements and other messages having rich media content on to the storage 122 of the receiving system 104. The cached secondary files can be later played back as inserted along with playback of requested files requested by the receiving system 104 such as files having entertainment, educational, or other content having formats of movies, music, text, games, etc. Versions of the implementation 500 can be used in financial revenue models, in addition to subscription and pay-per-view for example, that operators and content owners can use to reduce the cost of offering media to consumers and/or increase the profitability of their services. Third parties can pay funds to operators to send third party messages to users of the receiving systems 104 via the adaptive file delivery of the secondary files 507 of the implementation 500.

Advertising and other message content is sent to the receiving systems 104 through the implementation 500 using adaptive file delivery as a background transfer with or without a delivery deadline, in some versions, during periods when the receiving system is not otherwise receiving content that was requested by the receiving system. Once stored on the receiving system 104, the secondary files 507 sent through the implementation 500 can be inserted before, during, or after play of a requested file, such as a movie for example. For instance, before, during or after playback of the entertainment content, the receiving system 104 may access and play one or more of the secondary files 507, such as advertising files, by pausing playback of the requested file being played for its entertainment content. How the receiving system 104 detects opportunities to play the secondary files 507 can be done with similar approaches as with conventional broadcasting industry practices such as explicitly imbedded signals in the entertainment content resulting in fade-to-black effects or other program marker effects. Secondary file content to be played can be chosen by the receiving system 104 based upon the profile 503, but could also be random, and/or based on type of playback device, and/or time of day, and/or type of entertainment or other content being played, and/or requested file content type, and/or user logon identification and/or other criteria.

Content of the secondary files 507 may be adjusted to particular consumer data, which is stored in the profile 503 sent from the receiving system 104 to the sending system 102 before the adaptive file delivery of the secondary files 507. Data in the profile 503 can be correlated by the receiving system 104 to requested file content type, online ordering habits, and so on. When used for advertising, the secondary files 507 are stored in the receiving system 104 with the requested files. Since users of the receiving system 104 can be potential customers, adjustment of content of the secondary files 507 to match the profiles of these potential customers may help to increase effectiveness of advertisements contained in the secondary files to be more targeted toward a particular audience.

Content of the profiles 507 may include, but is not limited to, receiving system user identity, and/or purchase records such as those records involving online ordering via interactive browser interfaces. Other data can include records of entertainment content description (title, genre, etc.) date of play, compiled data from surveys of user preferences, buying habits, expressed interests, how often advertising content was played and so on. As with other implementations of the adaptive file delivery system, it is understood that the sending system 102 including the storage 114 can include one or more mass storage devices networked together but geographically separated.

An implementation 600 of the adaptive file delivery system 100 is depicted in FIGS. 6-11. The implementation 600 allows a user 602 to use an input device 604, such a computer workstation, personal data assistant (pda), cell phone, game console or other device, either located separately or part of the receiving system 104 to perform functions such as viewing, prioritizing, and manipulating delivery deadlines and delivery order of various files that are to be sent via adaptive file delivery from the sending system 102 to the receiving system. As is the case with other implementations, the sending system 102 can be one or more physical units that may be networked together but geographically separated using ordinary commercial networking equipment.

Versions of the implementation 600 have various activities that occur at different times that can be widely separated from one another such as selection, delivery, and playing of files. The users 602 can control the selection of files to be delivered, delivery deadlines, and priority and/or order for delivery through the input device 604.

The implementation 600 controls delivery and delivery status of files to be delivered by various forms of adaptive file delivery. Some aspects of system requirements and goals of the implementation 600 can be understood to a degree under analogous terms with physical postal delivery of purchased goods to consumers. On the other hand, other aspects of the implementation 600 are unique, for example, involving electronic delivery of digital content to meet a deadline. For example, one exemplary aspect of the implementation involves the reception of a content file in which reception is not a single event but distributed in time over an interval. Aspects are involved with the users 602 interacting with the implementation 600 during adaptive file delivery of files, such as media content files, with associated delivery deadlines.

Figure 6:
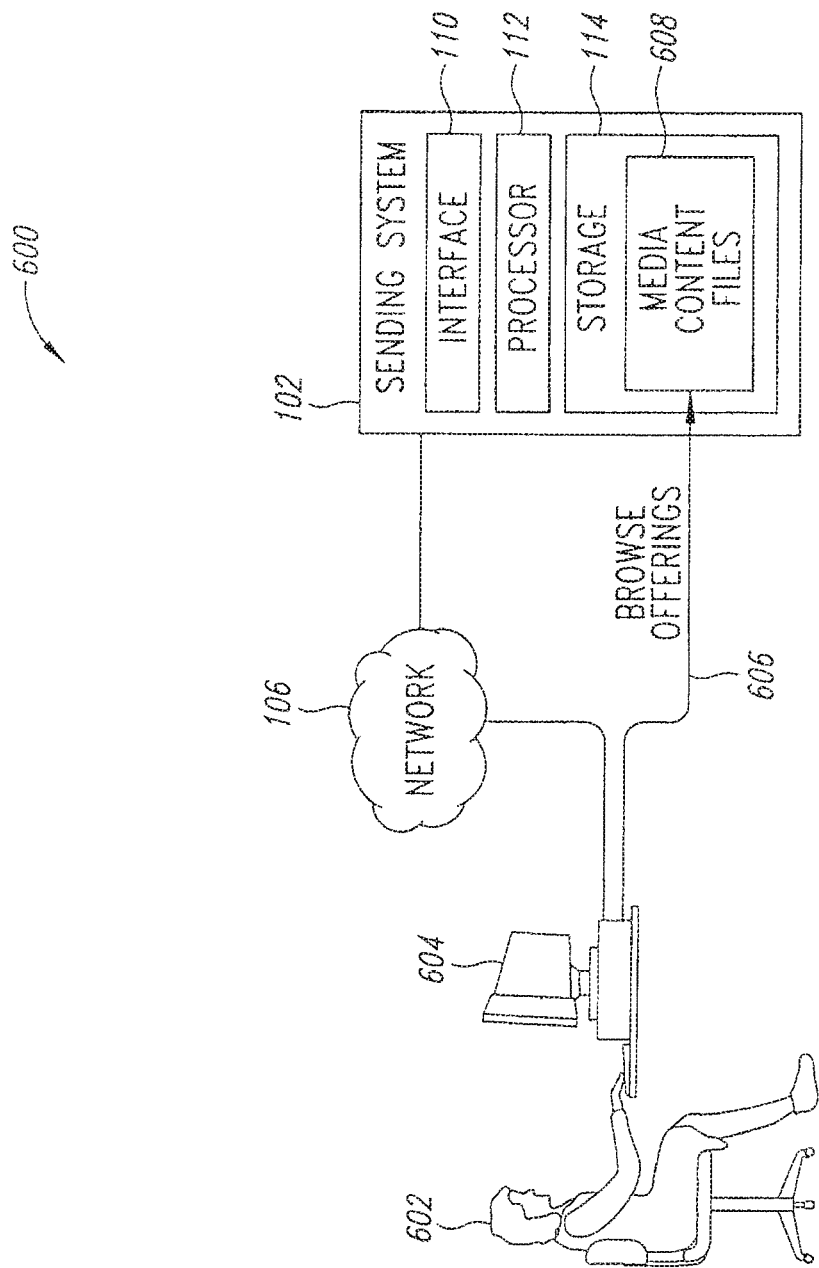
FIG. 6 is a schematic diagram depicting an implementation of the adaptive file delivery system with browsing by a user.

As depicted in FIG. 6, the user 602 is using the input device 604 that is communicatively linked through a wireless, wired, network, telephony, or other communication medium to the sending system 102. The input device 604 can be operating a form of a browser type application to assist the user 602 to browse (step 606) files, such as media content files, stored on the sending system 102 available for adaptive file delivery.

Figure 7:
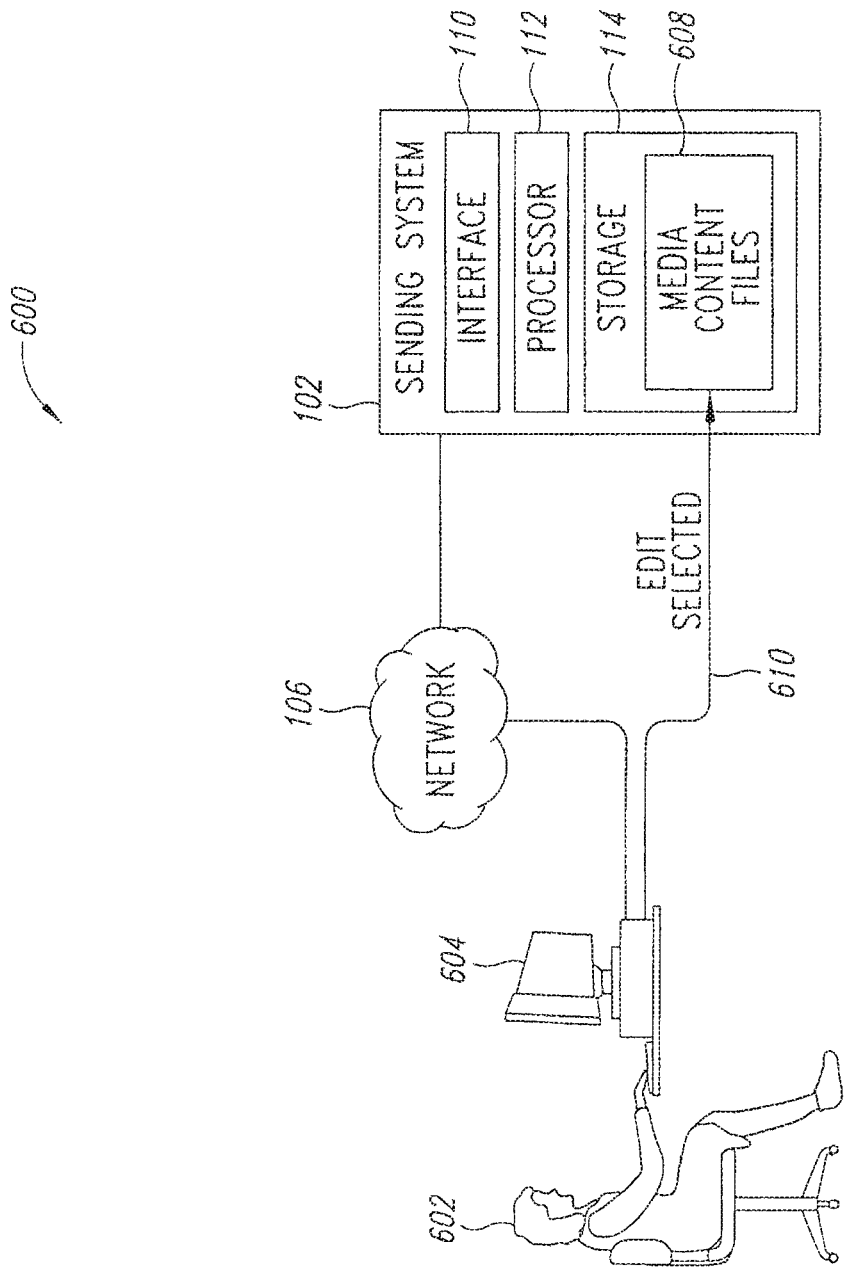
FIG. 7 is a schematic diagram of the implementation of FIG. 6 with editing by a user.

As depicted in FIG. 7, the user 602 may optionally view through the input device 604 content files already delivered to the receiving system 102 that can collectively form an existing personal media content library for the user. The user 602 may optionally choose to mark (step 610) with the input device 604 certain content files stored on the receiving system 104 for deletion so that there is sufficient storage room for new content files to be delivered to the receiving system.

Figure 8:
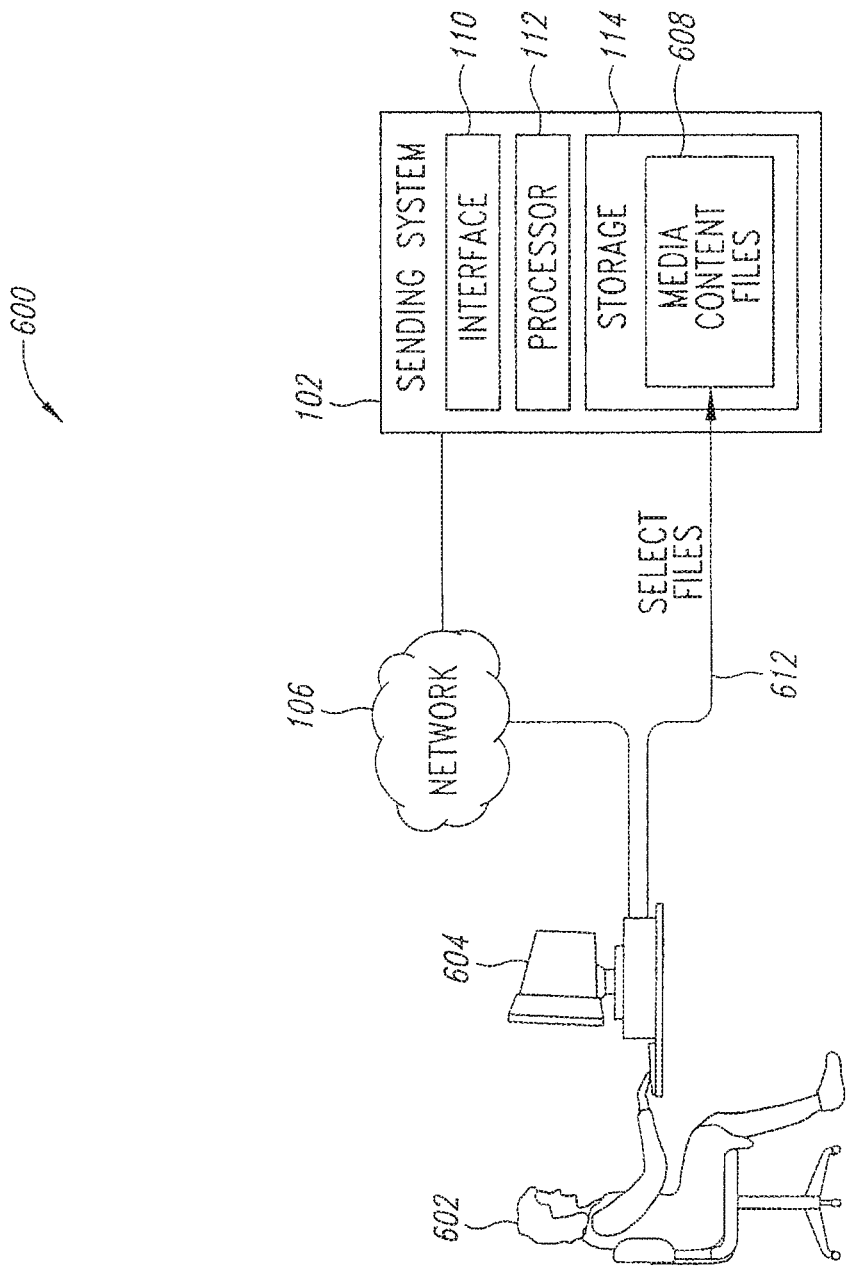
FIG. 8 is a schematic diagram of the implementation of FIG. 6 with file selection by a user.
Figure 9:
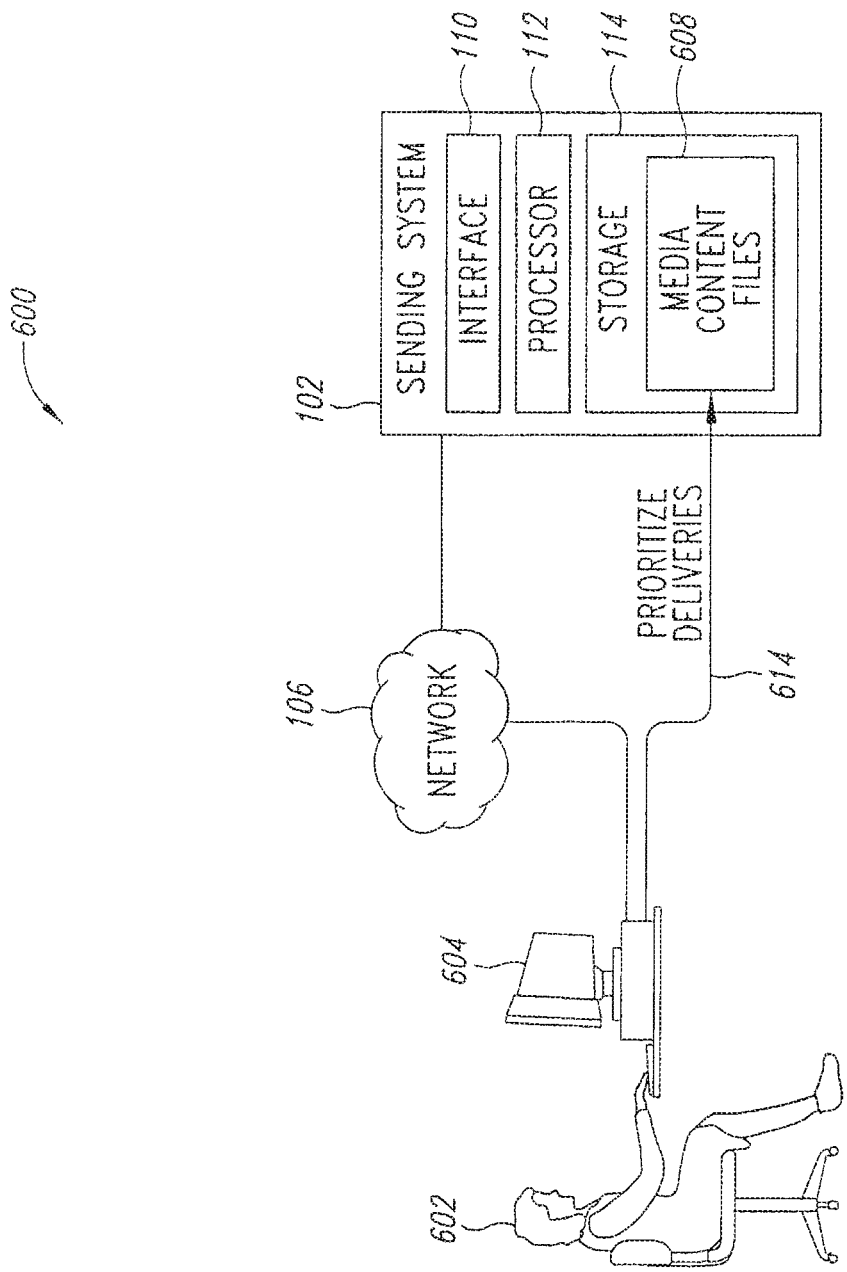
FIG. 9 is a schematic diagram of the implementation of FIG. 6 with prioritization by a user.

As depicted in FIG. 8, the user 602 by using the input device 604 can select (step 612) one or more media content files for delivery. In versions of the implementation 600 an original order of delivery of selected files is generated based upon the sequence in which the files were selected. As shown in FIG. 9, the user 602 may optionally revise priorities (step 614) of the original order of delivery of the selected media content files as desired.

Figure 10:
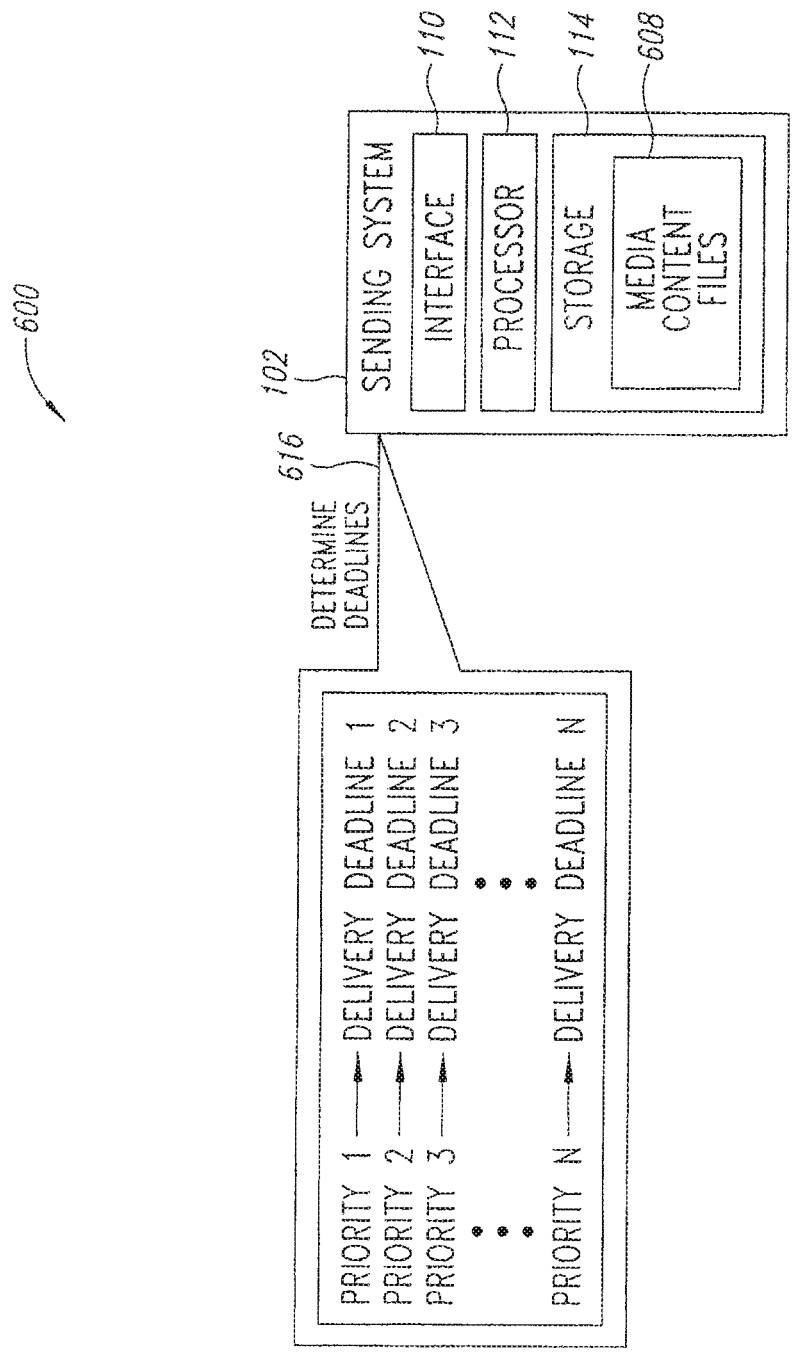
FIG. 10 is a schematic diagram of a portion of the implementation of FIG. 6 with deadline calculation.

As depicted in FIG. 10, the sending system 102 will calculate (step 616) expected delivery deadlines for the pending adaptive file deliveries. The expected delivery performance of the sending system 102 may be based on, but is not limited to, displayed and/or inputted delivery priorities, subscription profile of the user 602, stored historical network delivery performance data and current network conditions as obtained by the sending system.

In some versions, the sending system 102 may present to a user the delivery deadline calculated by the sending system from the sum of an expected delivery deadline plus some additional time delta to allow for unpredicted network slow downs and/or outages.

In other versions, the sending system 102 may allow a user to select a delivery deadline as long as the selected delivery deadline exceeds the expected delivery deadline calculated by the sending system plus some additional time delta. In these versions, the system 100 may record and bill the user according to the length of the user's chosen delivery deadline.

In some versions of the implementation 600, delivery of the highest priority file will happen earliest, followed by the next highest priority, and so on. Results of this expected delivery deadlines calculation can be presented to the user 602 through the input device 604 in graphical and/or textual fashion. In some versions of the implementation 600 the user 602 may approve of the delivery calculation results to further initiate adaptive file delivery.

Figure 11:
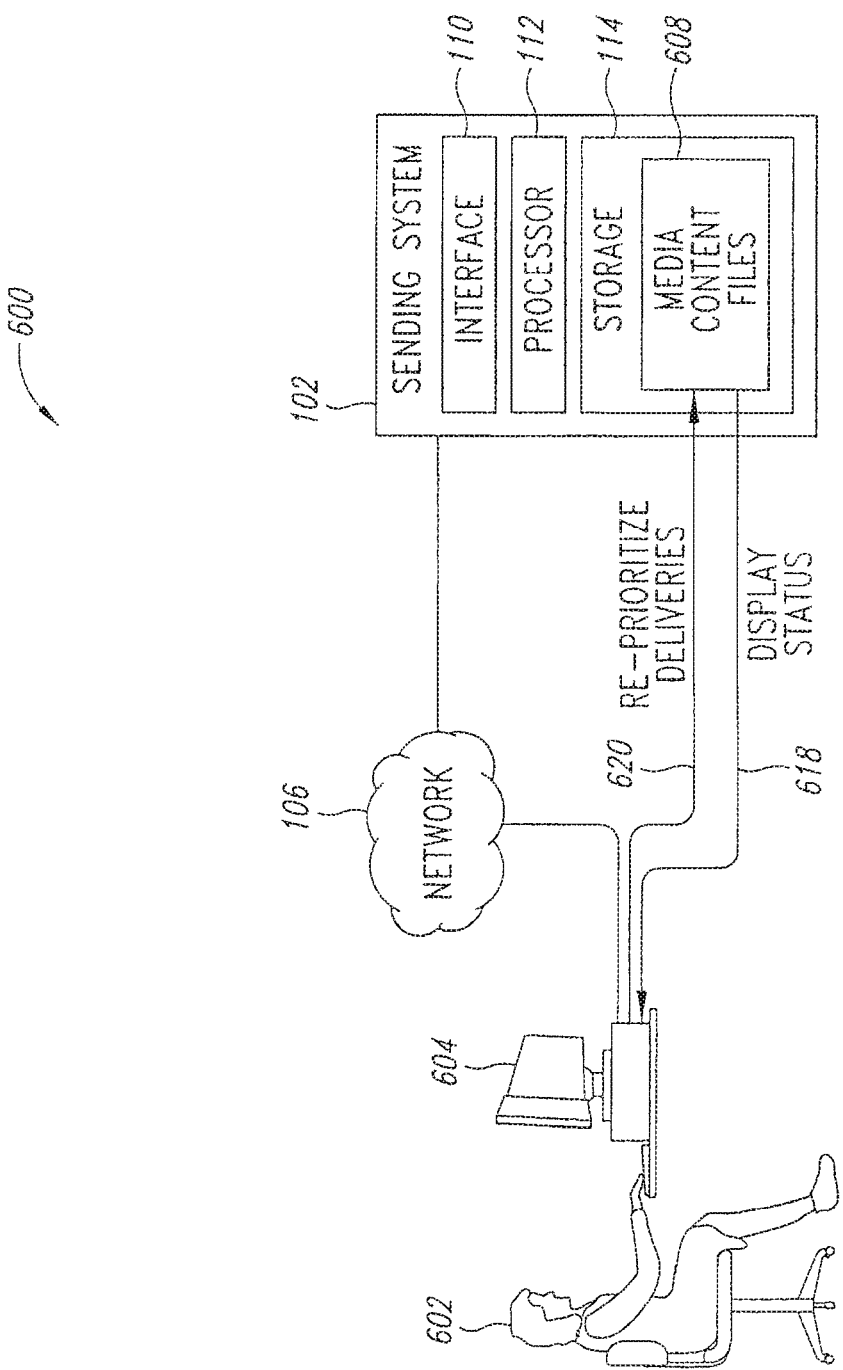
FIG. 11 is a schematic diagram of the implementation of FIG. 6 with status display and user interaction.

As depicted in FIG. 11, as adaptive file deliveries are occurring with the implementation 600, the sending system will display (step 618) through the input device 604 a delivery schedule associated with the adaptive file deliveries so that the user 602 can edit (step 620) the delivery schedule. Through editing of the displayed delivery schedule, priorities of one or more pending adaptive file deliveries can be re-prioritized or canceled.

In some versions of the implementation 600, if delivery of a file has proceeded beyond a certain pre-selected point in terms of the fraction of the delivered file, the user 602 may not be allowed to cancel the order without some service penalty. New selections of content files can be added to the delivery schedule displayed on the input device 604 and similarly be reprioritized by the user 602.

After reprioritization, the sending system 102 will again calculate (step 616) a new schedule of pending adaptive file deliveries and display (step 618) the newly calculated schedule on the input device 604 to the user 602. The sequence of editing the displayed delivery schedule, recalculation of the edited schedule, and display of the recalculated schedule can be repeated as often as desired by the user 604 given that there may be some service penalties involved, such as canceling a file that has been already partially delivered beyond a certain maximum portion.

Figure 12:
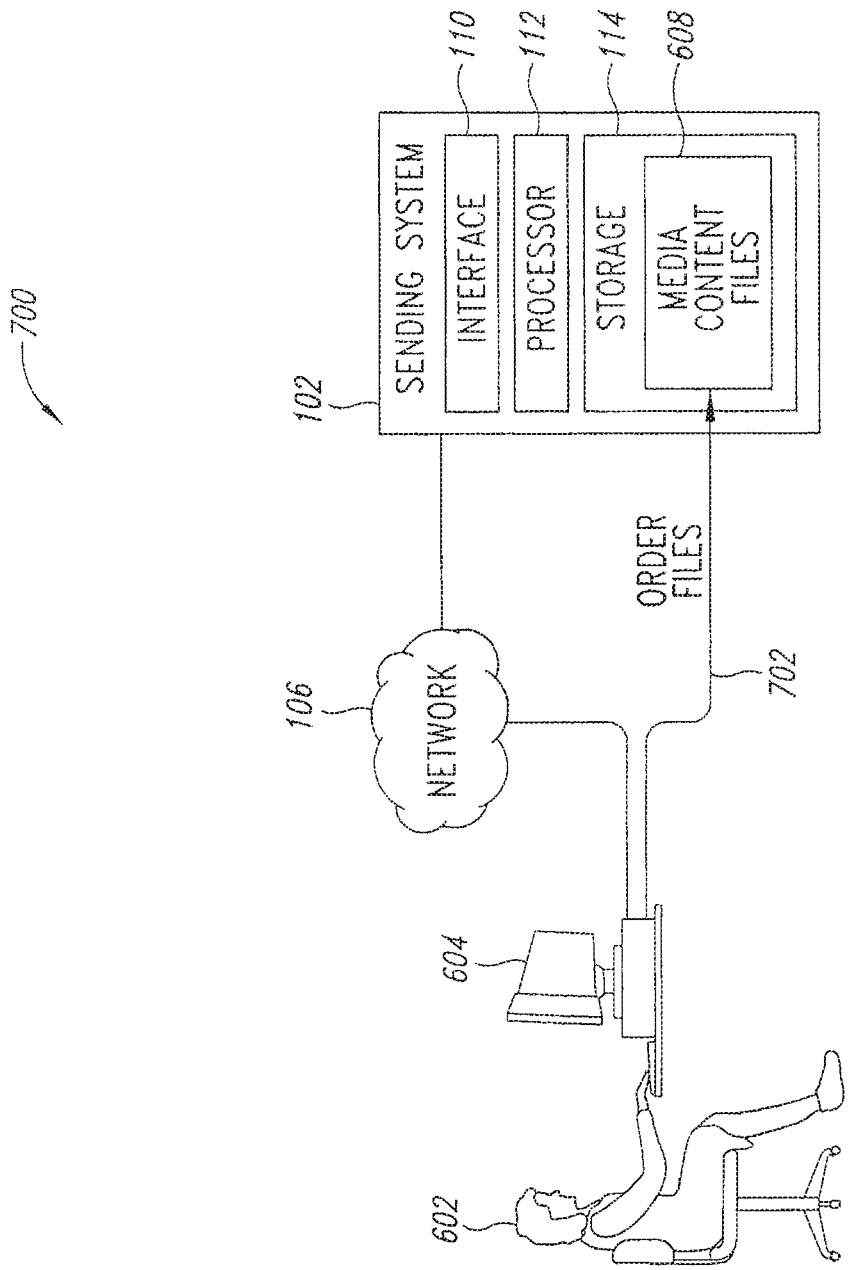
FIG. 12 is a schematic diagram of an implementation of the adaptive file delivery system with file ordering by a user.
Figure 13:
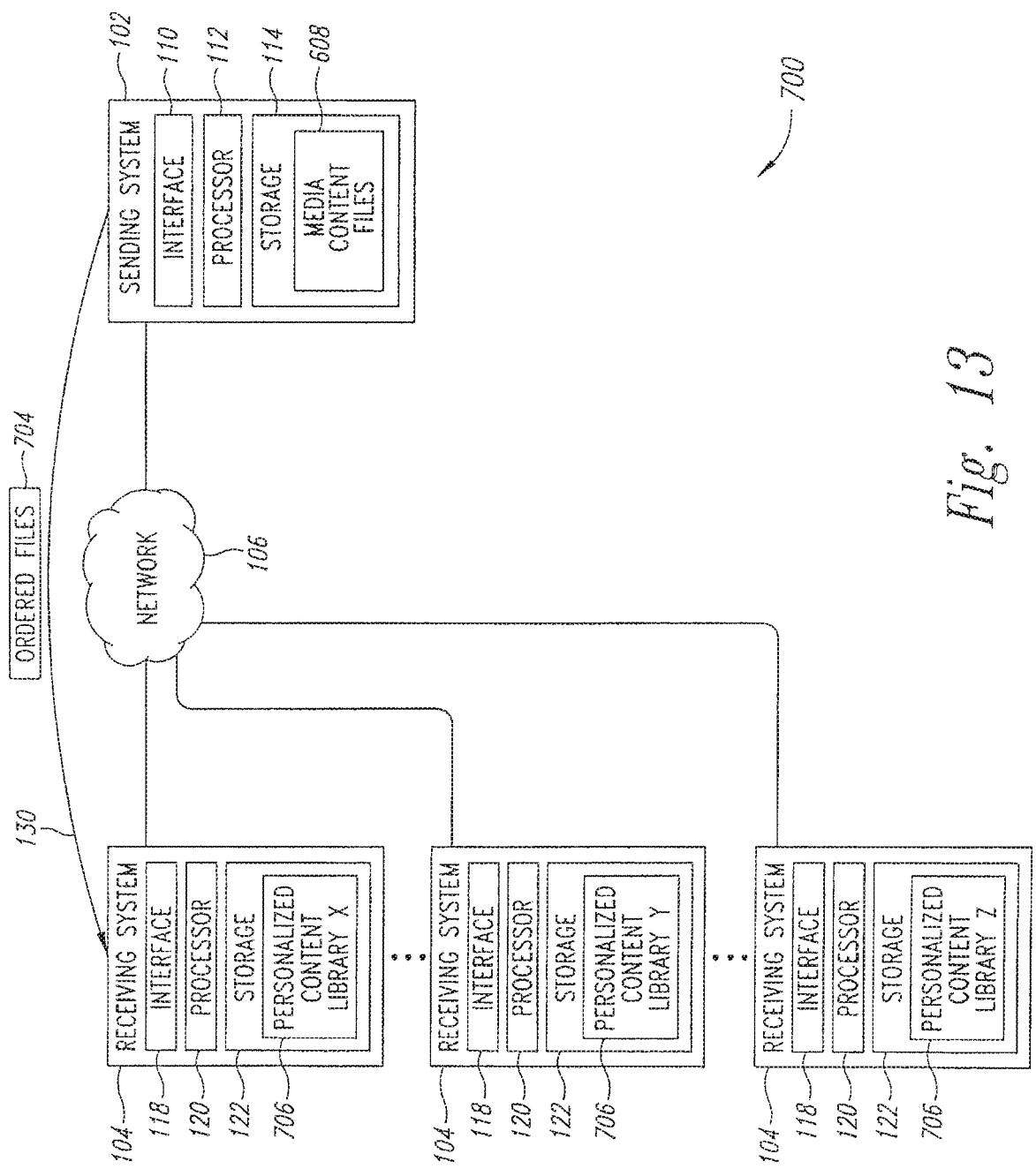
FIG. 13 is a schematic diagram of the implementation of the adaptive file delivery system of FIG. 12 with delivery of ordered files.
Figure 14:
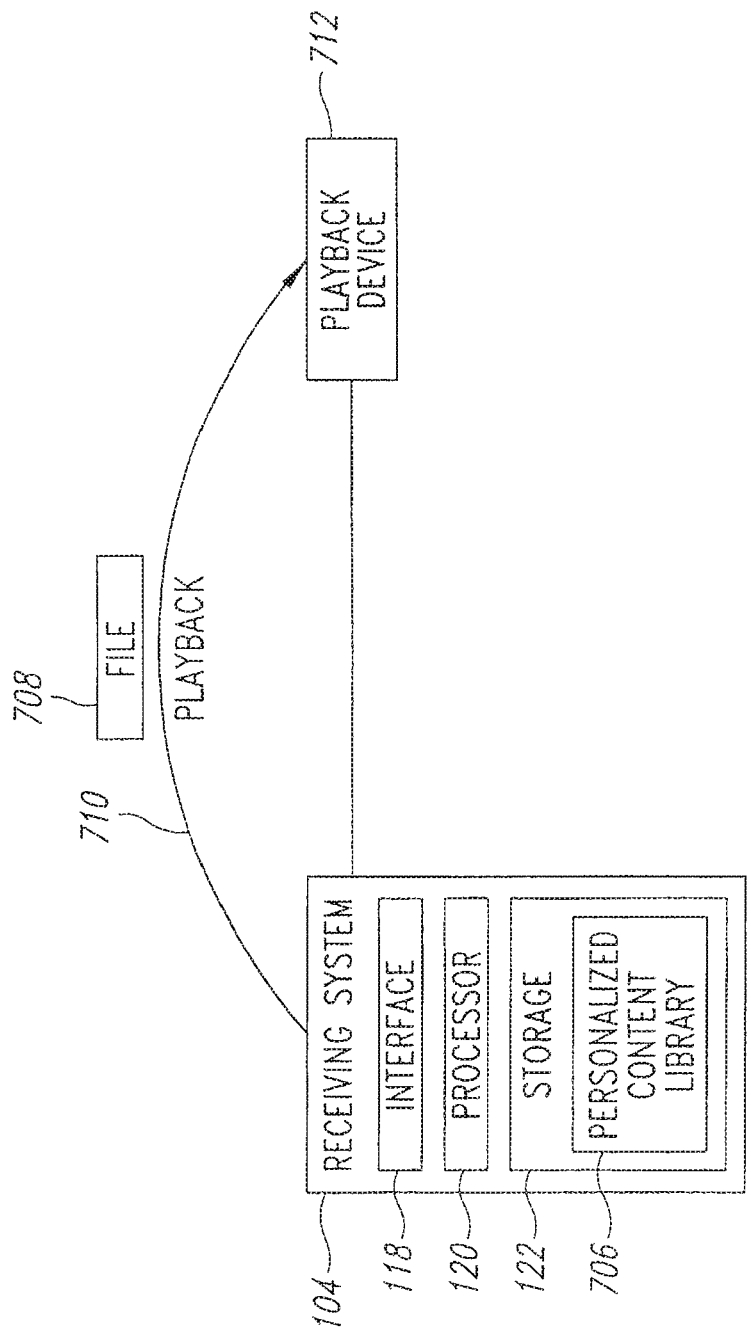
FIG. 14 is a schematic diagram of the implementation of the adaptive file delivery system of FIG. 12 showing detail of file playback.

An implementation 700 is depicted in FIGS. 12-14 to allow for a user-customized library of media content, such as a personalized content library. The personalized content library can be stored locally at the user's home or business on either the receiving system 102 or a variety of content storage units associated and/or communicatively linked to the receiving system such as mass storage enabled devices such as digital video recorders (OVRs), portable media centers (PMCs), network-attached storage units, PCs, cell phones, etc. in addition to the receiving system. The user 602 interacts with the implementation 700 in three phases: selecting media files, adaptive file delivery of the selected media files, and playback of delivered content.

As depicted in FIG. 12, the user 602 uses the input device 604 to select and order (step 702) files from the sending system 102. Ordering of files may involve a monetary transaction either at time of the order, through a subscription plan, cumulated with periodic billing, or another arrangement. File selection and ordering by the user is supported by the input device 604, which can furnish a presentation via web browser, or other presentation display of a file listing such as a media catalog. Each file selection is associated with a delivery deadline that is calculated and managed by the sending system 102.

As depicted in FIG. 13, the sending system 102 manages adaptive file deliveries of ordered files 704 the selected content files to the receiving systems 102 of various users 602 to build a personal content library 706 of media files on each of the receiving systems 104.

Alternatively, adaptive file deliveries of ordered files 704 can be made to one of the receiving systems 104 to build a single main personal content library 706. In turn, the receiving system 104 can be communicatively linked to a plurality of devices to store in smaller personal content libraries 706 and/or play the delivered files.

As depicted in FIG. 14, once the media files are delivered to the receiving system 104 to constitute the personal content library 706, a selected file 708 of the personal content library can be played (step 710) on a playback device 712 either as part of or separate from the receiving system 104. Once files are in the personal content library 706, they can be played back as desired without further interaction with the delivery network 106 or the sending system 102. Play of the files in the personal content library 706 can be thus isolated from adverse conditions experienced on the network 106 and/or sending system 102.

Versions of the implementation 700 can be used for remote ordering to allow consumers to interact with the sending system 102 as a remote online store server system via a browser to place orders for future delivery of large media files such as movies to their home content storage units (e.g. DVR) in a time frame governed by deadlines.

The ordering experience can be enhanced by the sending system 102 offering suggestions of content expected to be of interest to the consumer. For instance, a consumer can search for one or more content files for delivery and thereby be presented with a suggested list of content files based on a profile of the consumer passed to the sending system 102 by the receiving system 104. The consumer profile may be based on previously ordered content file genres, trusted friend recommendations, subscription lists of serialized features, sequels to previously selected content, purchasing habits, and so on. The consumer can also search for available content in a database of available titles using search terms that may include but are not limited to title, author, director, genre, rating, sex/violence/language content profiles, performers, language, playback format, consumer ratings, reviews ratings, and so on. The consumer can then make a selection of one or more content files for delivery within a deadline associated with each content file.

As implementation 800 of the adaptive file delivery system 100 is depicted in FIGS. 15-19 which involves separating scheduled delivery deadlines from scheduled releases dates that the delivered files can be played to assist in reducing or avoiding demand peaks for popular content. The implementation 800 allows digitized media files to be delivered electronically via adaptive file delivery to the receiving systems 104 which can include or be communicatively linked to a collection of content storage units over the network 106 as a single network or collection of networks in advance of a predetermined release date. The release date refers to a pre-scheduled date where previously unavailable content is made available for playback by a group of users.

For instance, content of files to be delivered could be new movies or episodes in an entertainment series that have not yet been generally available. The adaptive file delivery can be planned to be completed sufficiently in advance of the release date associated with the content of the delivered files to offer highly probable guarantees of file delivery before the release date. By separating distribution by adaptive file delivery from the release date, large groups of consumers may have concurrent access to media on a particular release date without requiring a large bandwidth broadcast delivery system or otherwise straining delivery networks to accommodate large peaks in demand on the release date for popular content. Once distributed, consumers can playback content on or after the release date as desired or according to some other subscription plan.

Figure 15:
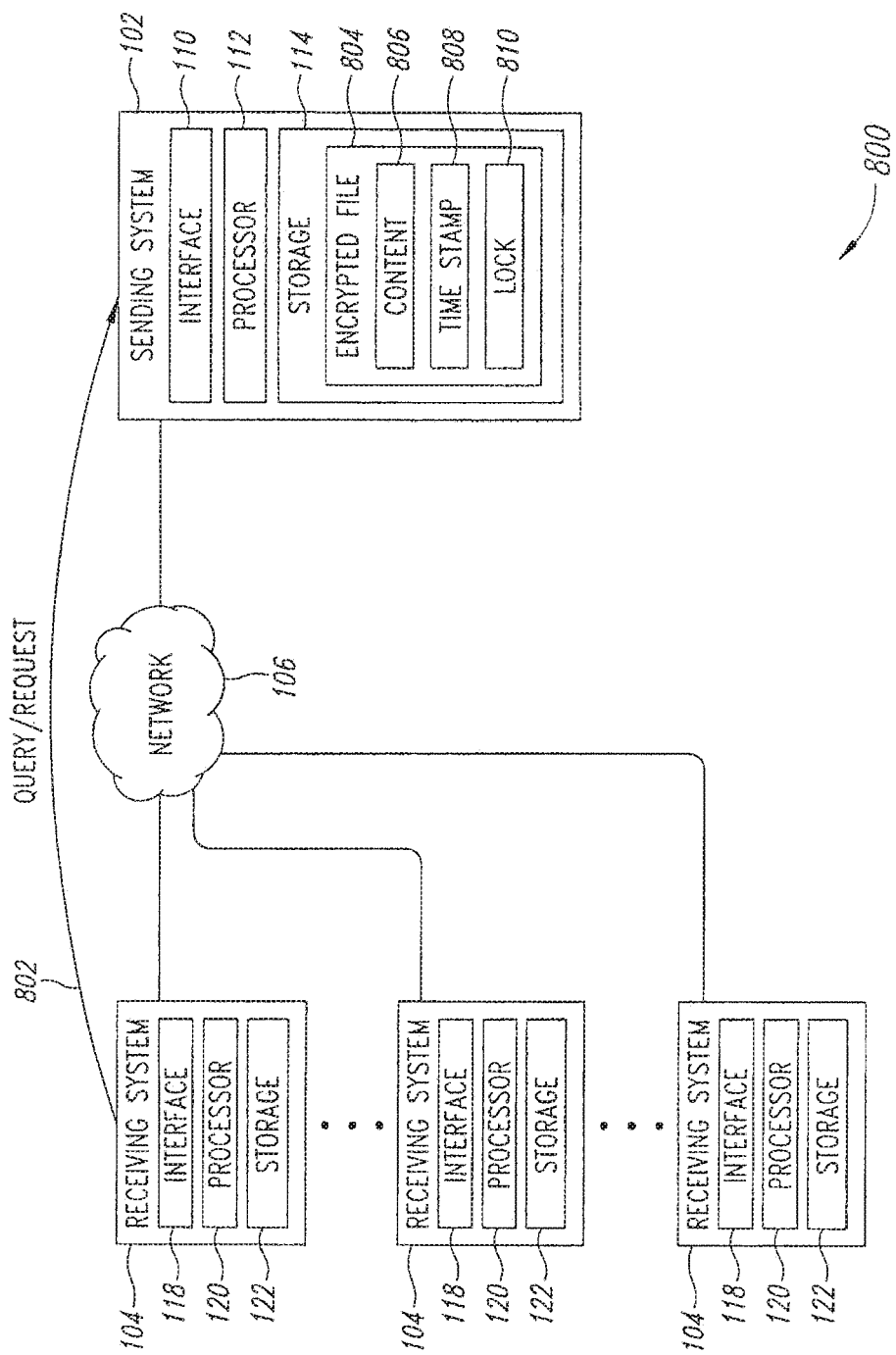
FIG. 15 is a schematic diagram of an implementation of the adaptive file delivery system with encrypted files and showing a query stage.

As depicted in FIG. 15, a plurality of the receiving systems 104 query (step 802) the sending server 102 for new content files that may have become available. The query (step 802) could alternatively be done through use on the input device 604 as described above. These queries can be automatically performed by the receiving systems 104 and/or the input devices 602 or could be manually performed by users of the receiving systems and the input devices. The sending system 102 is shown to have an encrypted file 804 with content 806, a time stamp 808, and a lock 810 representing encryption of the file content.

Figure 16:
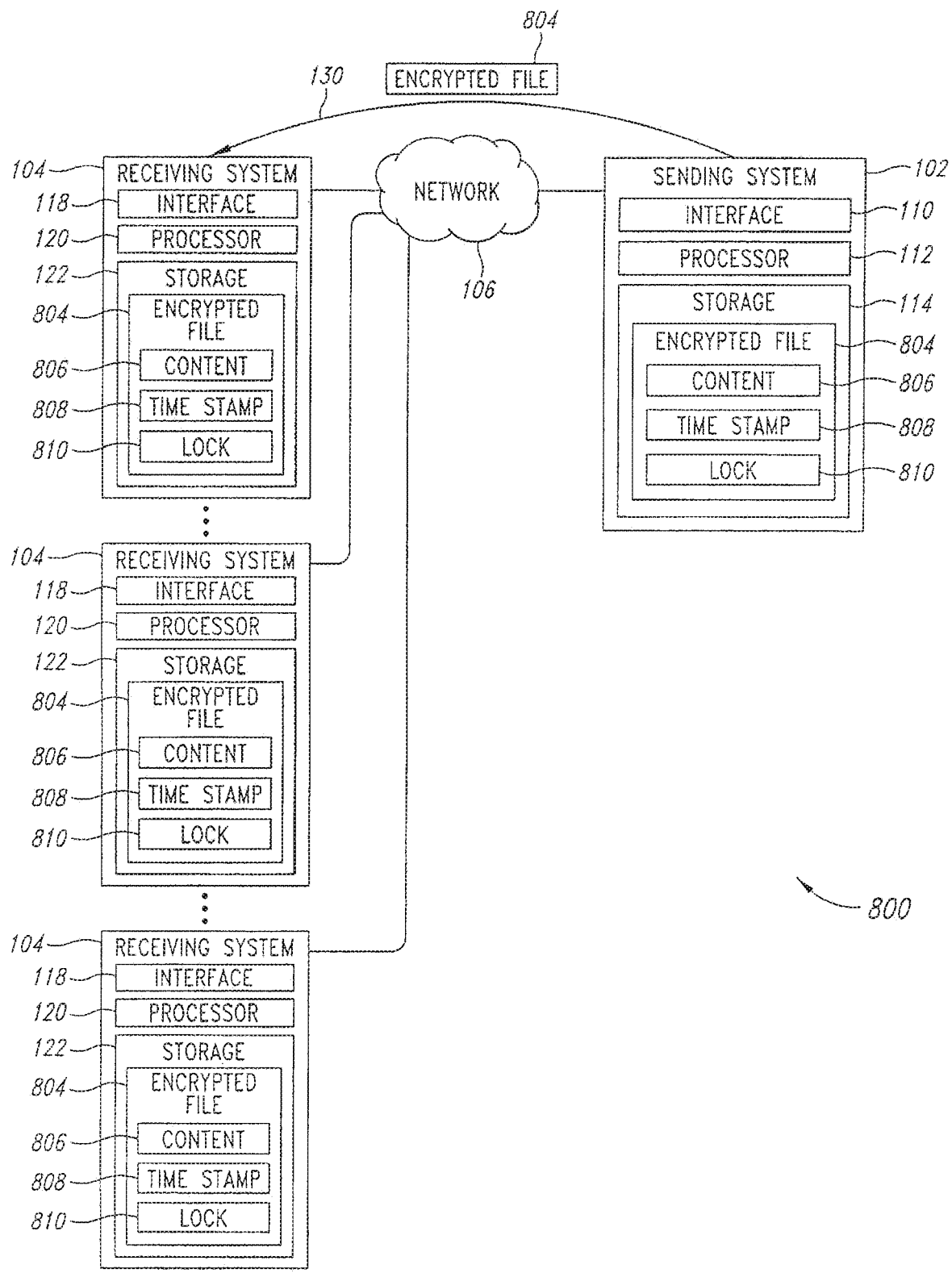
FIG. 16 is a schematic diagram of the implementation of the adaptive file delivery system of FIG. 15 showing delivery of an encrypted file.

As depicted in FIG. 16, the sending system 102 delivers the encrypted file 804 through adaptive file delivery to the receiving systems 104 based upon any number of ordering schemes such as delivering any files becoming available on the sending system or delivering only those files selected according to a list stored on the sending system and/or stored on the receiving systems or delivering only those files according to manual selection by users of the receiving systems, etc. For instance, the collection of eligible ones of the receiving systems 104 for a given content file may be determined through use of preconfigured subscription lists which might include some or all of a group of the receiving systems linked to a certain portion of the network 106.

In this example, the content 806 of the encrypted file 804 is protected against early release via ordinary digital encryption methods that require a decryption key in order to be decrypted and played. The encrypted file 804 has associated unencrypted meta-data including but not limited to the timestamp 808 that indicates the future release date for the content 806 of the encrypted file. Once delivered, the receiving system 104 can access this meta-data to provide graphical or textual browser type interfaces to a consumer indicating that the content is not yet available, and indicating when the release date will occur.

Figure 17:
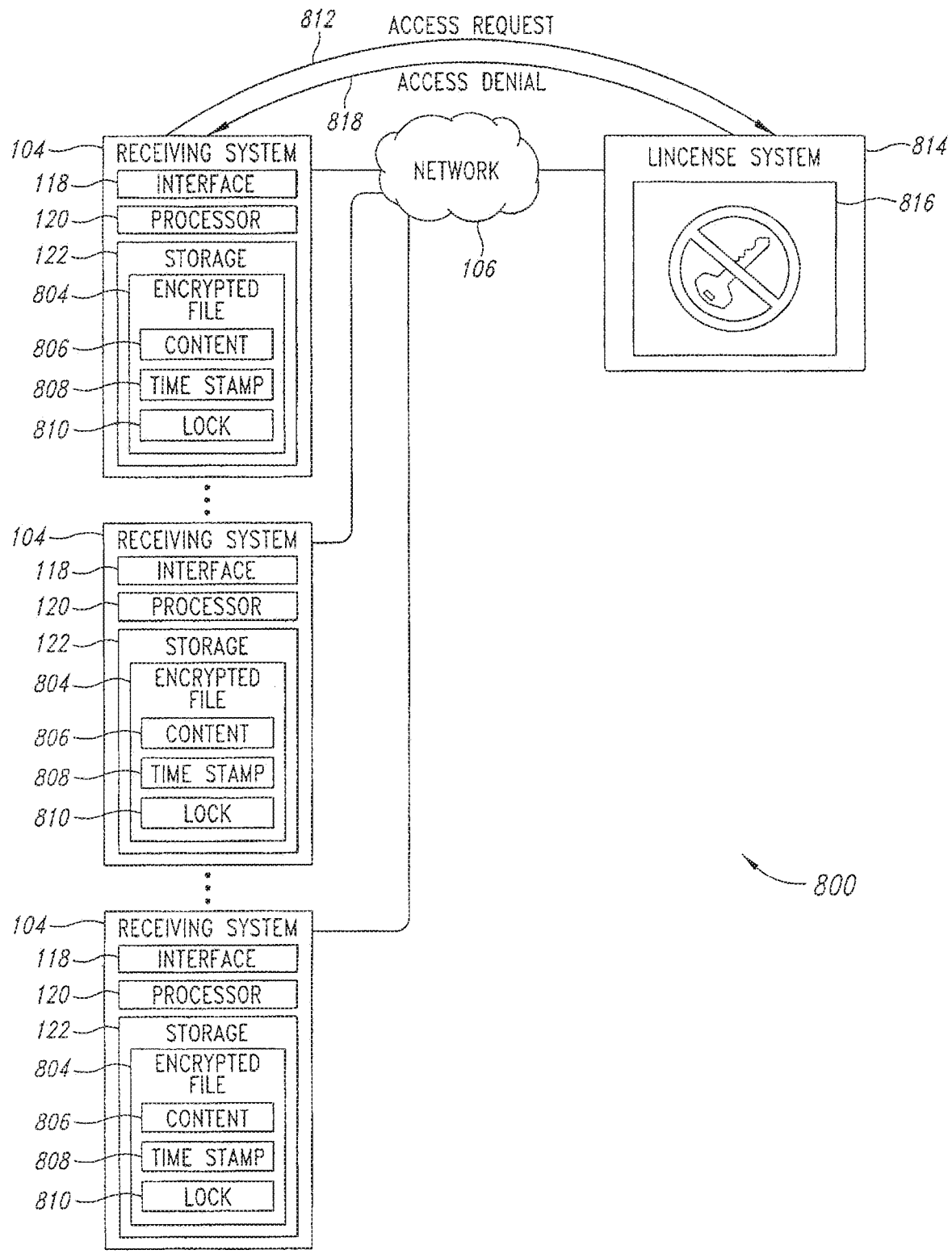
FIG. 17 is a schematic diagram of the implementation of the adaptive file delivery system of FIG. 15 showing an access request and an access denial.

As depicted in FIG. 17, after the encrypted file 804 has been sent to the receiving system 104 via adaptive file delivery, the receiving system attempts to play the encrypted file 804 by performing an access request (step 812) to a license system 814 to request an appropriated decryption key. An indicated in FIG. 17, the appropriate decryption key has been currently stored on the license system 814 as unavailable decryption key 816. In some versions of the implementation 800, the license system 814 may be the sending system 102 or another system.

The license system 814 replies with an access denial (step 818). In some versions of the implementation 800, the receiving system 104 first verifies before sending an access request by comparing its own internal clock with the timestamp 808 of the encrypted file 804 already stored on the receiving system. In some versions of the implementation 800, since the receiving system's internal clock may be vulnerable to hacking or errors, as a secondary protection against unintended access, the receiving system 104 may be required to transact with the license system 814 as a system separate from the sending system 102 to obtain the decryption key for the encrypted file 804. In these versions, the license system 814 would maintain its own time reference that would aid in rejecting invalid requests by the receiving system 104.

Figure 18:
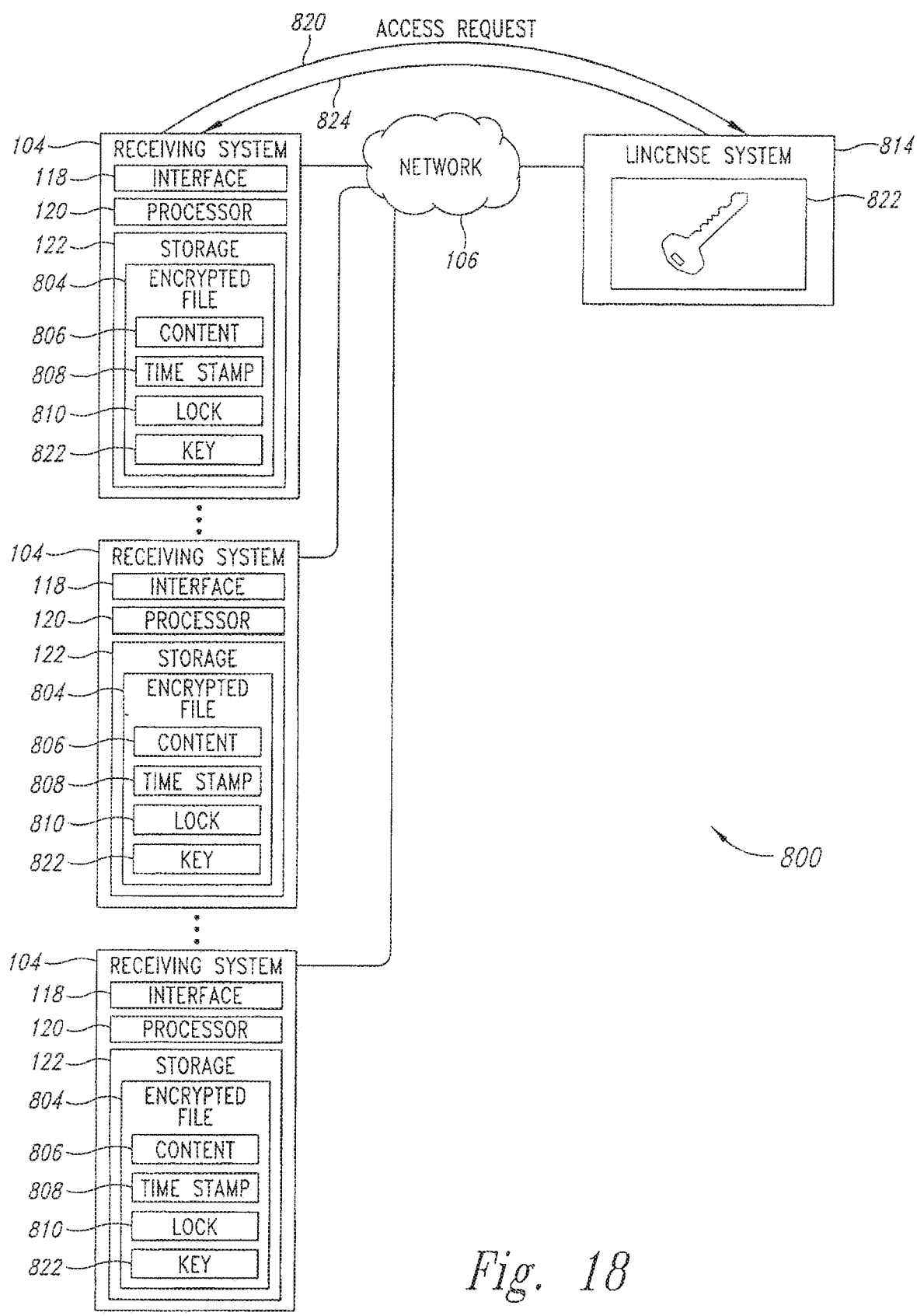
FIG. 18 is a schematic diagram of the implementation of the adaptive file delivery system of FIG. 15 showing an access request and an access allowance.

As depicted in FIG. 18, the receiving system 104 sends a valid access request (step 820) at or after the release date to the license system 814, which has stored the associated decryption key as an available decryption key 822. The license system 814 responds by transmitting the available decryption key 822 to the receiving system 104 for subsequent decryption and playback of the encrypted file 804.

Figure 19:
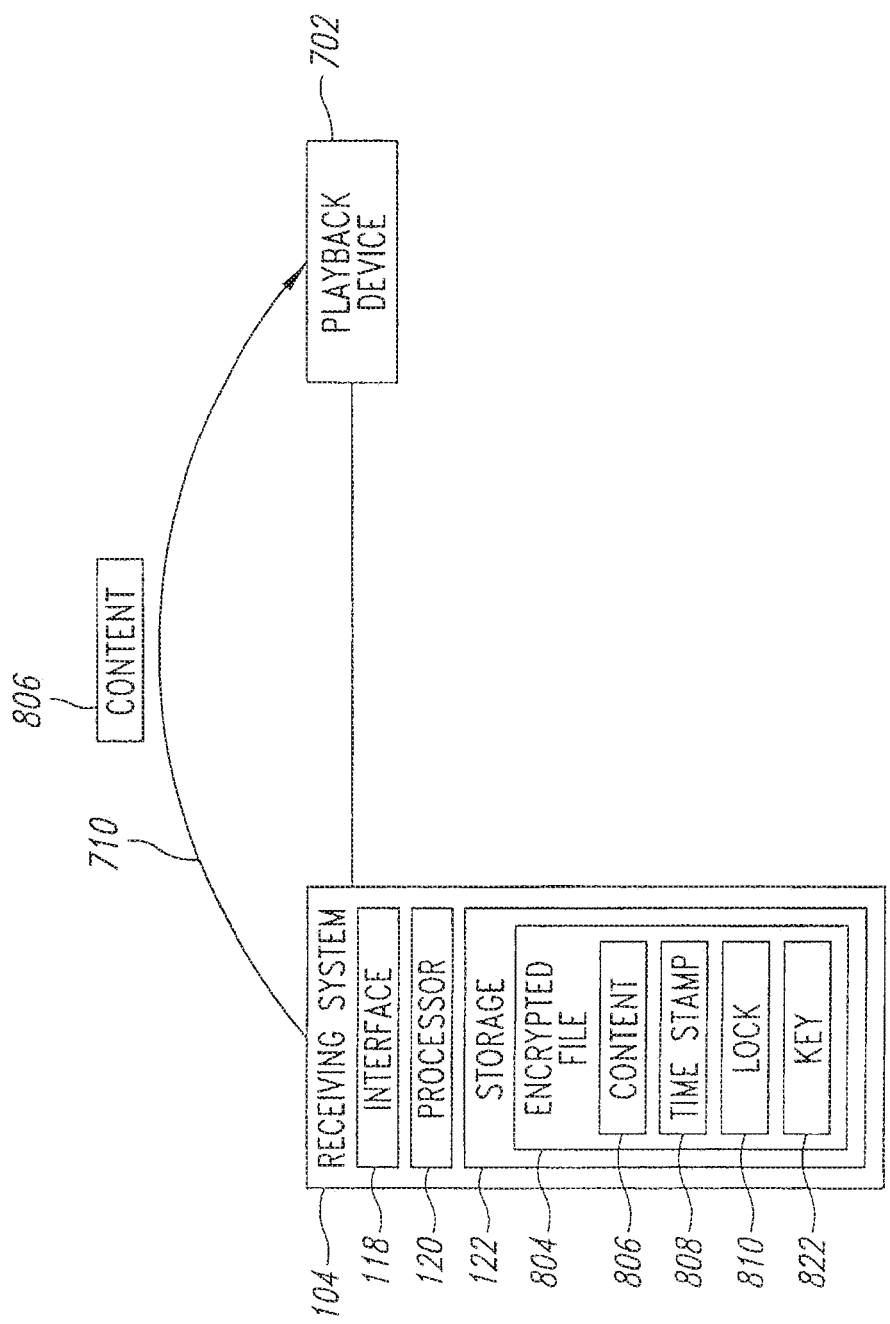
FIG. 19 is a schematic diagram of the implementation of the adaptive file delivery system of FIG. 15 showing detail of file playback.

As depicted in FIG. 19, the receiving system 104 has obtained and stored the available license key 822. Subsequent to obtaining the available license key 822, whenever the receiving system 104 begins to play the encrypted file 804 stored on the receiving system, the receiving system references this license key to allow authorized playback of the content. In some versions of the implementation 800, the license key 822 is stored on the receiving system in a manner to hinder subsequent unauthorized transmission of the license key to another receiving system.

Figure 20:
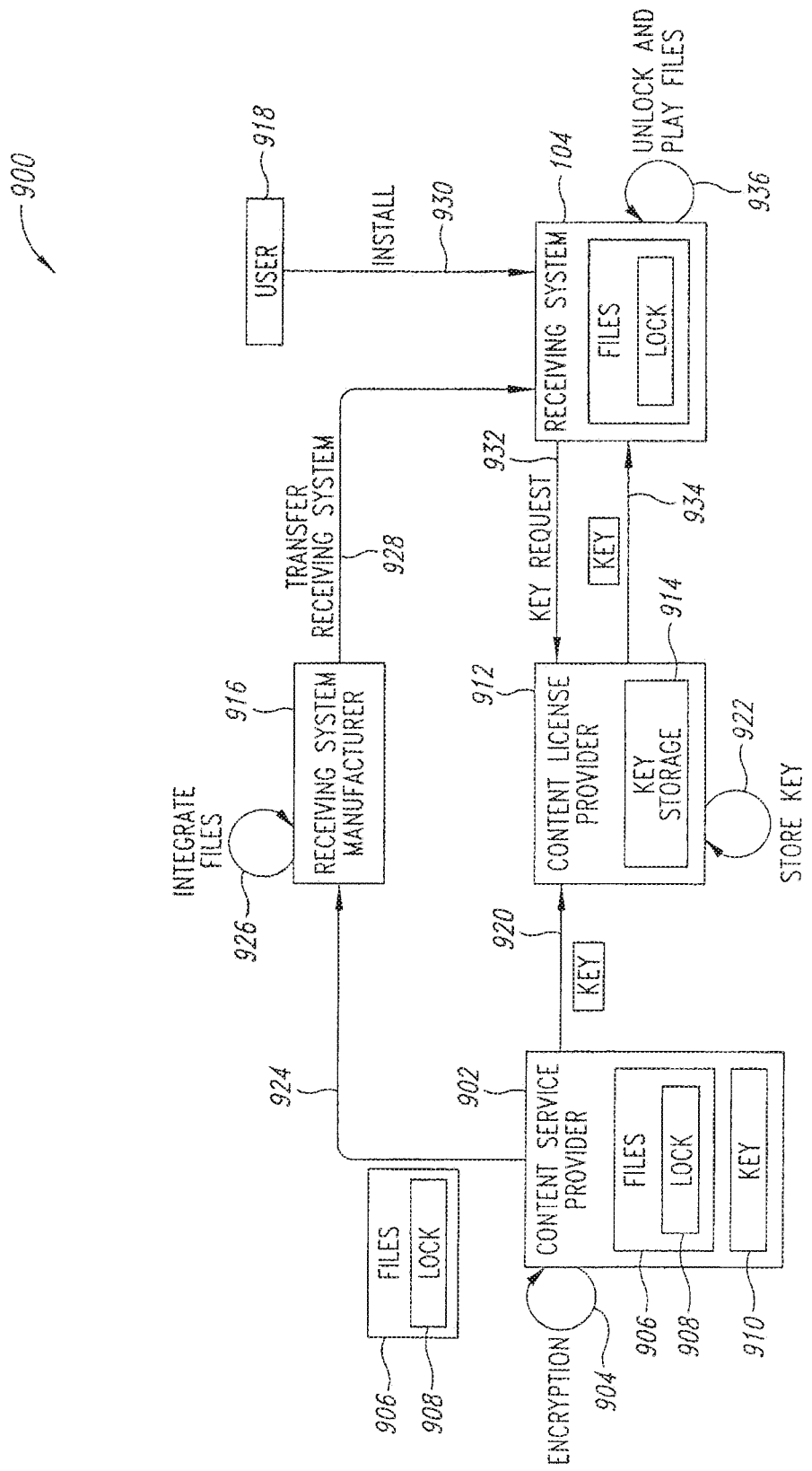
FIG. 20 is a schematic diagram of an implementation of the adaptive file delivery system showing pre-loading of files.

An implementation 900 of the adaptive file delivery system 100 directed to preloading content files into the receiving system 104 at time of manufacture of the receiving system is depicted in FIG. 20. Through the implementation 900 a preloaded content library is loaded into the receiving system 104 at the time of manufacture of the receiving system.

Since use of the adaptive file delivery system 100 to initially populate one of the personalized content libraries 706 may take an undesirable amount of time in certain circumstances, the implementation 900 allows for an initial collection of files for a personalized content library to be preloaded as a jumpstart to the adaptive file delivery with subsequent use of the adaptive file delivery to update and further expand the preloaded personalized content library. File selection for the personalized content library could be based upon various models such as indicated desires of an individual purchasing user, typical user types, or typical collection types, etc.

The implementation 900 includes a content service provider 902 that encrypts (step 904) files 906 being encrypted as represented by lock 908 and generates an associated key 910. The implementation 900 further includes the content license provider 912 having a key storage 914 for holding a copy of the key 910, a receiving system manufacturer 916, and a user 918. Although, as depicted, encryption may occur at the content service provider 902, in alternative versions, encryption occurs with the content license provider 912. Generally, the key 910 is stored with content license provider 912.

After encryption (step 904), the content service provider sends (step 920) a copy of the key 910 to the content license provider 912 for storage (step 922) in the key storage 914. If the content license provider 912 has performed encryption (step 904) then the license provider can proceed to storing the key 910. The content service provider 902 sends (step 924) a copy of the encrypted files 906 to the receiving system manufacturer 916 to integrate (step 926) the encrypted files 906 into copies of the receiving system 104 being manufactured.

A copy of the receiving system 104 is transferred (step 928) from the receiving system manufacturer 916 to the user 918 typically through a series of commercial exchanges. Once the user 918 has obtained the receiving system 104, the user typically performs an installation procedure with the receiving system (step 930) whereby a request is made (step 932) for a copy of the key 910 from the content license provider 912. In some versions, enabling a preloaded content library may be an option, which the user 918 may decline to pursue. In some versions of the implementation 900, the key request (step 932) is accomplished via an online browser session with an online store (not shown) associated with the content service provider 902.

During the browser session, the user 918 can indicate the hardware identification of the receiving system 104 that can be used by the license provider 912 to furnish a proper version of the key 910. The copy of the key 910 is sent (step 934) from the content license provider 912 to the receiving system 104. The copy of the key 910 is then used to decrypt and play (step 936) one or more of the encrypted files 906. In some versions of the implementation 900, an initial attempt of the receiving system 104 to play one of the encrypted files 908 triggers the key request 932. If the license provider 912 does not have the hardware identification provided in the key request 932 in a service enabled list of devices maintained by the license provider, the license provider will decline the key request. Once the decryption key 910 has been obtained by the receiving system 104, typically, no further key requests (step 932) are required.

Figure 21:
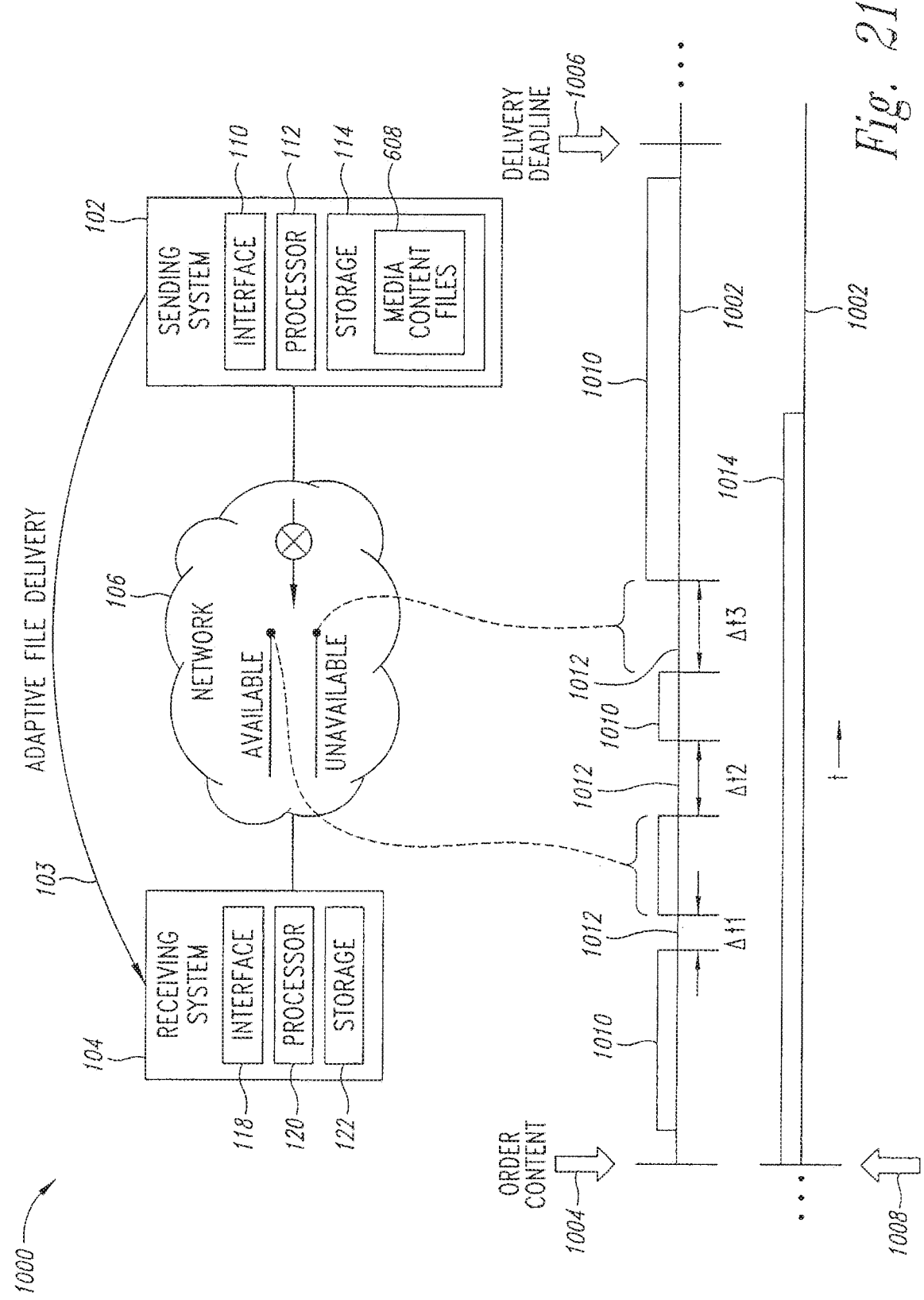
FIG. 21 is a schematic diagram of an implementation of the adaptive file delivery system showing delivery aspects.

An implementation 1000 of the adaptive file delivery system 100 is depicted in FIG. 21 broadly depicting components of the adaptive file delivery system 100 and associated method to further indicate that the adaptive file delivery system and method discussed herein includes more than the particular procedures discussed herein for sending file segments and so on. In general, the adaptive file delivery system 100 and method seek to electronically deliver files in a piecewise fashion by a certain delivery deadline. In some versions, other aspects can include initiating the adaptive file delivery by requesting or by ordering. Further aspects can include playing the received files. Depicted versions of the implementation 1000 operate by time separation along a timeline 1002 including three events in a delivery session: ordering content (step 1004), delivering content by a delivery deadline (step 1006), and playing back the content (step 1008). By separating these events, the sending system 102 can deliver content during network availability 1010 that may be otherwise periodically, and unpredictably, unavailable 1012 for unspecified periods.

The implementation 1000 can include a service provider operating the sending system 104 as a server associated with a library of stored media content files. The sending system 1000 delivers the content files to a collection of the receiving systems 104 representing the service provider's customers. The delivered content files are stored locally at the receiving systems 104 as they are delivered. Ordering of content (step 1004) initiates the delivery phase and can be done by a consumer directly, or by proxy by another person or machine acting on the consumer's behalf. The sending system 102 then calculates an anticipated delivery rate needed to deliver the content file to the client assuming predicted times of network availability 1010 and/or unavailability 1012. The predicted times of network delivery may be based on manually configured profiles, historical measurements of previous periods, trends in network activity, etc.

Sometime during the delivery there may be an unpredicted period where the network is unavailable 1012. When these outages are unanticipated, at the conclusion of the outage, the sending system 102 automatically recalculates the new required delivery rate to achieve the delivery deadline and resumes the delivery of the remaining portion of the media content file. The delivery finishes when the entire file is delivered to the receiving system 104 (step 1006). At an unspecified period after delivery, the receiving system 104 operated by the ordering consumer or other user can play back on the receiving system 104 (step 1014) the locally stored media file in its entirety free from any adverse performance of the delivery network between the receiving system 104 and the sending system 102.

Figure 22:
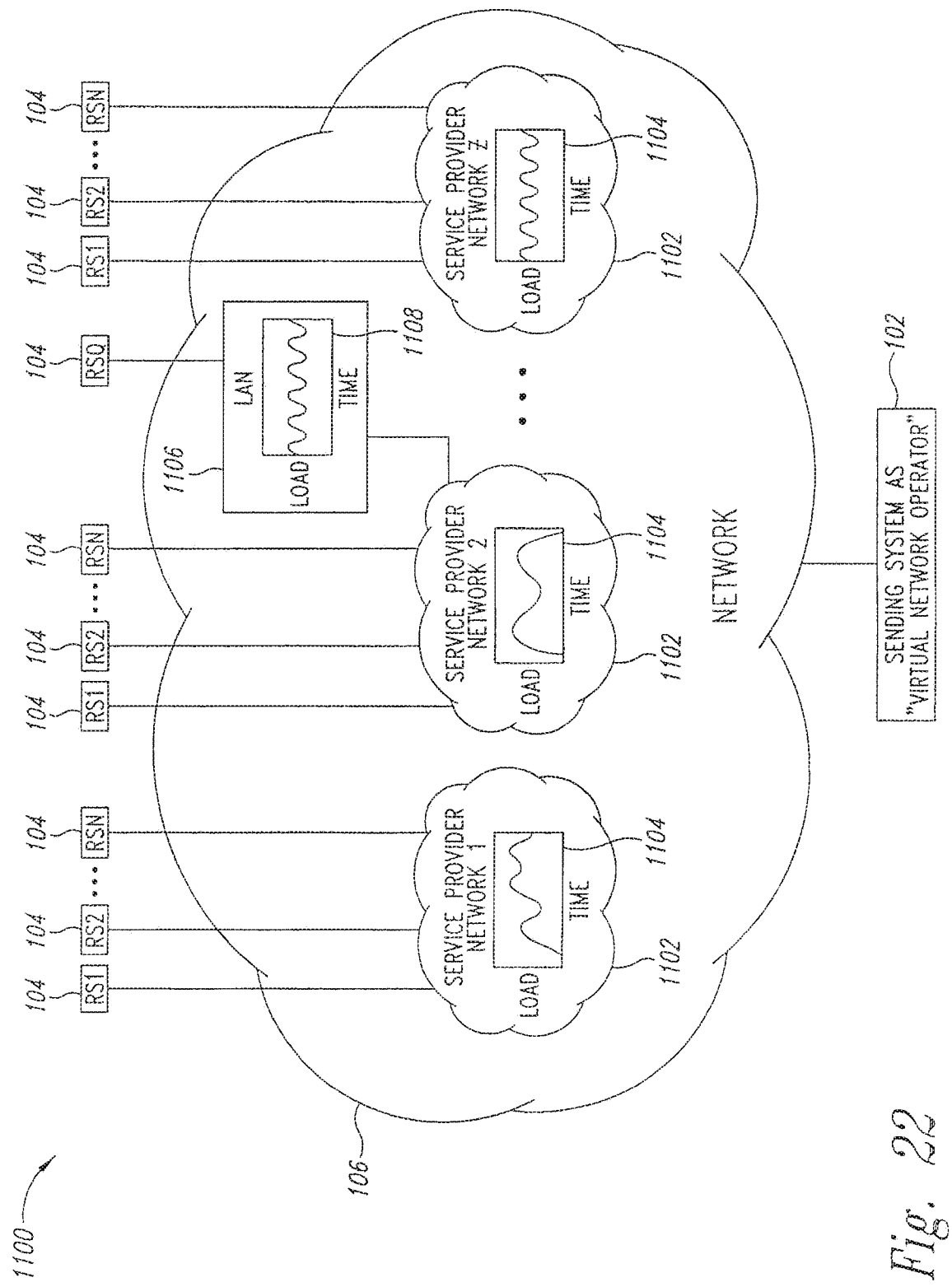
FIG. 22 is a schematic diagram of an implementation of the adaptive file delivery system showing network aspects.

An implementation 1100 is depicted in FIG. 22 wherein the sending system 102 is used as a virtual network operator. Through use of the adaptive file delivery approach, the sending system 102 is able to use the network 106 as containing one or more delivery or service provider networks 1102 each having various different types of network loading profiles 1104 to send large files to large numbers of the receiving system 104.

Further network loading complications can include having LANs 1106 with other loading profiles 1108 linked to one or more of the service provider networks 1102. Despite various network loading complexities, the sending system 102 is able to successfully transmit the large files to meet established delivery deadlines without impacting the service provider networks 1102 to a degree that would disrupt service or motivate expansion of bandwidth on these service provider networks.

In the implementation 1100, the sending system 102 can be used through a virtual network operator arrangement to allow business entities, that may not be related in any contractual manner to network access providers, to establish and operate large media content distribution services over the service provider networks 1102 that have surplus capacity during certain time periods, but not during other periods. In general, the implementation 1100 uses adaptive file delivery to use off-peak network capacity of networks such as the network 106 depicted in FIG. 22, or other networks, between the sending system 102 as virtual network operator and customers, in order to remain within the existing capacity of the networks, without requiring build-out of additional capacity to support the virtual network operator service.

As the virtual network operator, the sending system 102 maintains one or more content servers or other storage devices that store a library of content files that can be accessed by customers. The virtual network operator service can be broadly defined as delivery of media content files to designated users for storage on the user's content storage units (DVR's, PMC's, network-attached storage units, pes, etc.). Thus, the virtual network operator service is akin to a delivery agent service for businesses that want their content delivered to the businesses' customers.

Implementations of the adaptive file delivery system 100 can include one or more of the receiving systems 104 with mobile capability (e.g. laptop) to be moved between two or more of the service provider networks 1102, the LANs 1106, other networks, and/or IP or network-layer addresses. For instance, a user could connect the user's receiving system 104 to a home access point, which connects to a DSL modem that is communicatively linked through one of the service provider networks 1102. In this case, the network address associated with the receiving system 104 will most likely be the wide area network address of the DSL modem. Continuing with the example, the user then connects the receiving system 104 to one of the LAN s 1106, such as a corporate LAN at the user's place of work consequently changing the network 50 address for the receiving system.

Furthermore, suppose the user then connects the receiving system 104 to another one of the service provider networks 1102 or the LANs 1106 via a 3G modem at an airport again changing the type of access network. Through these various changes in network connections provided in the example, the sending system 102 retains in the storage 114 a history of the network loading profile 1104 for the various links established with the receiving system 104 to be used to track the performance for each of these links. Performance tracking can include how well a particular link performs in a no-load or no congestion condition. During operation, the sending system 102 can utilize collected history for a link to determine how to utilize current bandwidth.

Tracking of link performance can be done by the receiving system 104 measuring throughput each time one of the file segments is transferred to the receiving system. The receiving system 104 can then report the measured throughput to the sending system 102. Consequently, the sending system 102 can receive real-time link performance metrics from the receiving system 104.

Specific aspects of the performance tracking can vary upon the implementation. For instance, when the sending system 102 receives a download request from one of the receiving systems 104, the sending system can validate the request. Validation can be done with the electronic serial number (ESN) of the receiving system 104 client machine and customer ID (ID) assigned to the user of the receiving system, but other methods of validation can also be used.

Upon validation, the sending system 102 can then obtain incoming connection source IP address information of the receiving system 104 in a network packet header portion of a download request received by the sending system from the receiving system. The processor 112 of the sending system 102 can then determine if the storage 114 of the sending system already contains a record containing the ESN and the source address associated with the download request. If such a record exists, the processor can update performance information of the record and if such a record does not exist, can create a new record. In some implementations, the sending system 102 can use performance information from one or more existing records that each contain the same source address but an ESN other than the ESN of the download request to help create the new record.

In some implementations link performance is tracked according to a peak bandwidth value for a current file segment transfer so that a record need only be updated when the value for current peak bandwidth is greater than a threshold relative to the value for an historical peak bandwidth previously retained in the record found in the storage 114 of the sending system 102. For instance, if the value for current peak bandwidth is greater than the stored value for historical peak bandwidth, then the value for historical peak bandwidth is replaced by the value for current peak bandwidth.

If the value for current peak bandwidth is greater than an historical threshold such as some percentage of the value for historical peak bandwidth (e.g. greater than 90% of the value for historical peak bandwidth) then the current time is stored in the record to note such occurrence. This can be used on occasion to determine whether the value for an historical peak bandwidth has become irrelevant due to changes in network structure or abandoned network connections. Regardless, the time of the last active download is also recorded in order to prevent a link from expiring during download.

If the value for current peak bandwidth is less than some percentage of the value for historical peak bandwidth, then the record is updated by just replacing the last active download time with the current download time. To create a new record, the sending system 102 can store the source address and the ESN of the receiving system 104 and store the current time as the most recent time that the historical threshold was exceeded. In all cases the last active download time is also recorded in order to prevent a link from expiring during down time. Table 1 depicts a representative example of how the record in the storage 114 of the sending system 102 can be structured.

| ID | ESN | PeakRate | PeakTime | Last90PercentTime | SourceAddress | LastActive |
|---|---|---|---|---|---|---|
| 1 | 1234 | 235 | 1234567 | 1234567690 | 76.123.89.112 | 2323234 |
| 2 | 2345 | 978 | 1234567 | 1234567891 | 76.199.10.138 | 2323236 |

Given the approach described above, the sending system 102 can track all new download links and track peak performance of each. Furthermore, the sending system 102 can continue to track performance of the links having established records when the receiving system 104 switches between them. The approach allows the sending system 102 to recognize and note when a particular link has a new lower performance level. Commonly associated records may be used for comparative performance analysis for a particular source 10 address or ESN. Further, more than one of the sending systems 104 can share information of various links to improve link state recognition. Since a link is defined by the source and destination addresses (such as the IP addresses), prior stored information regarding a source address may be useful in creating a record for a new combination of source address and ESN.

As discussed above, the system 100 can be configured to detect when network congestion reaches a certain level and will slow down or temporarily halt transmission of file segments during periods of peak congestion. To accurately determine congestion, it is necessary to know the peak flow of the link between the sending system 102 and the receiving system 104. The congestion level, in one embodiment, can be set as a percentage or portion of the peak flow rate for the particular link. That is, the sending system 102 will reduce the rate at which file segments are sent to the receiving system when the flow level on the communication link coupling the sending system and the receiving system reaches, by way of example, 80% of the peak flow for that communication link.

An accurate measurement of peak data flow is important for the overall operation of the system 100 to detect congestion. It is also important for an accurate link profile for various sending systems 102 (see FIG. 1) and the receiving system 104. The accurate determination of peak flow requires that spurious peak values be discarded. Otherwise, the system 100 may incorrectly interpret normal flow rates as congestion. For example, assume that a particular link between the sending system 102 and receiving system 104 operate at a peak flow of approximately 1 megabit per second (Mbps). If the receiving system 104 receives a spurious transmission at a much higher data rate, such as 2 Mbps per second, a conventional peak flow detection system may determine that the new peak value is 2 Mbps per second. When the system returns to its normal range of 1 Mbps, the system 100 could interpret that as an indication of congestion since the 1 MB per second is significantly less than the measured peak value of 2 Mbps. Thus, a system may be tricked into thinking that there is network congestion because it accepted an anomalous peak flow as a valid measurement.

In one embodiment, the maximum through-put on the communication link between the sending system 102 and the receiving system 104 may be based on the user's broadband service level. The information related to the user's service level may be stored in a database or other data storage structure and accessible to the sending system 102. The database or data structure can be stored in association with the sending system 102, the receiving system 104, or some other data storage element coupled to the system 100. In this embodiment, peak flow detection is less critical since the user's peak rate is essentially predefined. If greater bandwidth is available, the sending system 104 may send file segments at a data rate that exceeds the user's broadband service level. However, this will not affect any calculations for peak transfer rates. That is, the system 100 will ignore any peak transfer rate that is in excess of the defined user service level.

Figure 23:
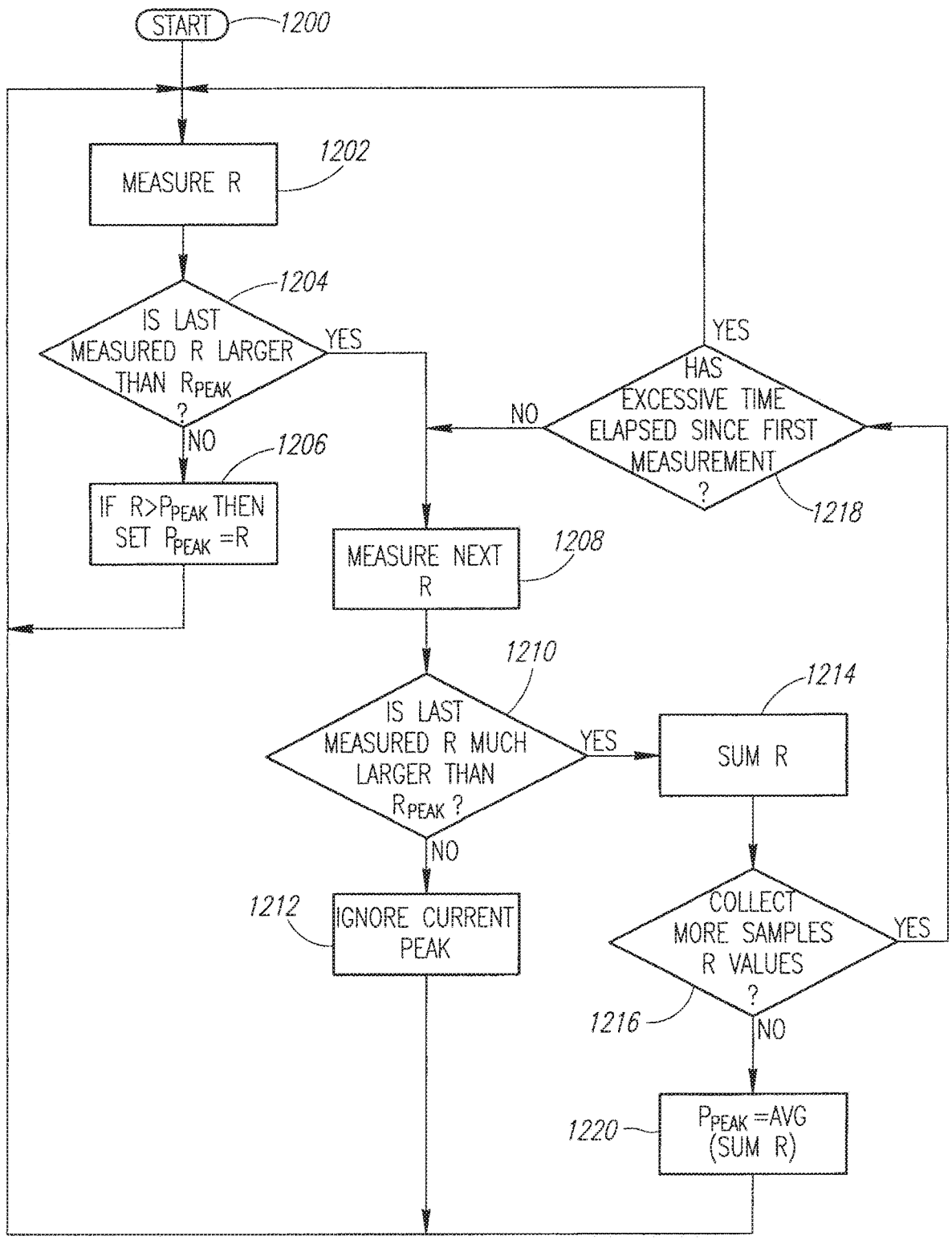
FIG. 23 is a flow chart illustrating a technique for detecting peak flow of traffic in a network.

In another aspect, the system 100 can evaluate peak flow measurements and determine whether a new peak flow measurement represents a spurious data value or accurately represents the peak flow capability of the system 100. FIG. 23 is a flow chart illustrating the operation of the system 100 to 10 measure peak flow and to discard spurious peak flow values. The process illustrated in FIG. 23 may be executed by the sending system 102, the receiving system 104, or another processor associated with the system 100, such as a network controller or the like. In one embodiment, the process illustrated in FIG. 23 may be implemented as a series of computer instructions executed by a processor, such as one of the processors discussed above. The instructions may be downloaded via a computer network, such as the Internet. Alternatively, the instructions may be embodied in a computer readable medium, such as a disk, flash drive, or the like.

At a start 1200, the system 100 establishes a communication link between the sending system 102 (see FIG. 1) and the receiving system 104. In step 1202, the system measures the transfer rate R for a particular file segment in the manner described above. In decision 1204, the system 100 determines whether the last measured value for R (measured in step 1202) is much larger than the peak value $R_{peak}$. The threshold value used in decision 1204 will be discussed in greater detail below. If the flow rate R for the last measured segment is not much larger than $R_{peak}$, the result of decision 1204 is NO. In that case, the system 100 moves to step 1206 where, if the flow rate R has a value greater than the value $R_{peak}$, then a new peak value is defined as the value R from step 1202 and the system 100 returns to step 1202 to continuously perform measurements to determine the peak value.

If the measured value R is much larger than the peak value $R_{peak}$, the result of decision 1204 is YES and the system 100 moves to step 1208 to measure the flow rate R for an additional file segment transferred from the sending system 102 (see FIG. 1) to the receiving system 104. Indecision 1210, the system 100 determines whether the flow rate value R measured in step 1208 is much larger than the stored peak value $R_{peak}$. In one embodiment, the system 100 may use the same threshold for decision 1210 as used in decision 1204. Alternatively, the system 100 may use a different threshold in decision 1210 to bias the system toward or away from peak rejections.

If the flow rate R measured in step 1208 is not much larger than the peak value $R_{peak}$, the result of decision 1210 is NO. This means that the flow rate measured in step 1202 was likely a spurious peak that can be ignored. In step 1212, the system 100 ignores the flow value measured in step 1210 and retains the previous value $R_{peak}$. Following step 1212, the system 100 returns to step 1202 where continuous peak measurements are performed.

If the flow value R measured in step 208 is much larger than the stored peak value $R_{peak}$ the result of decision 1210 is YES. In that event, the system 100 will sum the flow rate values R measured in steps 1202 and 1208. In decision 1216, the system 100 determines whether or not to collect more sample flow values R. System engineers can set a value to determine how many flow values R will be included in an average to determine a new peak value. For example, the system 100 could be set to include 5 flow measurement values R in its average. The first value R comes from the measurement performed in step 1202 while subsequent flow measurement values R are determined by repeating steps 1208 a number of times.

If additional flow rate measurement values R are to be collected, the result of decision 1216 is YES, and in decision 1218, the system 100 determines whether an excessive amount of time has elapsed since the first measurement in step 1202. The time limitation applied in decision 1218 prevents stale measurements from being included in a peak value determination. For example, the user may have temporarily terminated downloading of the file segments. When a new communication link is established between the sending system 102 (see FIG. 1) and the receiving system 104, the file download will be resumed at the point it left off, as discussed above. However, the resumption of file download may occur minutes, hours or even days later. Because of the long elapsed time from the first flow rate measurement value R from step 1202, the system 100 will ignore any further peak calculations. Thus, if excessive time has elapsed since the first flow rate measurement in step 1202, the result of decision 1218 is YES. In that event, the system 100 simply retains the prior peak value $R_{peak}$ and returns to step 1202 in a continuous loop to measure peak flow. If an excessive amount of time has not lapsed since the first measurement, the result of decision 1218 is YES and the systems 100 returns to step 1208 to measure an additional flow value R.

After each successive flow measurement is performed in step 1208, the system 100 evaluates the new flow rate measurement R to determine, in decision 1210, whether the new measured flow rate is much larger than the peak flow value $R_{peak}$. If any of the additional flow rate measurements are not much larger than the peak flow $R_{peak}$, the system 100 will terminate the process by ignoring the new calculations in step 1212 and returning to step 1202 in a continuous peak measurement process. Thus, setting a value for the number of flow rate measurements R that are included in decision 1216, the system engineers may bias the system to react more quickly to changes in peak flow values versus greater rejection of spurious peaks. Increasing the number of sample R values in step 1216 will lead to greater rejection of spurious peaks, but will also react more slowly towards true changes in peak flow values. For example, setting the value to 5 samples in decision 1216 means that 5 sequential flow rate measurement values R must all be above the thresholds set in decisions 1204 and/or 1210.

When a sufficient number of flow rate samples have been collected, the system does not need to collect more sample R values and the result of decision 1216 is NO. In that case, in step 1220, the system 100 combines the flow values and defines the new peak value $R_{peak}$ based on the combination of the measured flow values R. In one embodiment, the measured flow values may be summed and averaged to generate an average value for the measured flow values R. Other well known averaging techniques, such as a running average, or a time-weighted averages may be used. Following the calculation of a new peak flow value $R_{peak}$, the system 100 returns to step 1202 to repeat the continuous process of peak flow calculation.

Thus, the system 100 can adapt to changes in data flows from the sending system 102 to the receiving system 104. The threshold value used in decision 1204 and decision 1210 can be set by the system operator to reject spurious peaks. In one embodiment, the threshold value can be determined statistically. For example, the threshold could be set at a value of 30 beyond the mean value of $R_{peak}$ to assure a statistically reliable value for the peak flow. Alternatively, the threshold may be determined more empirically. For example, the threshold value in the decision 1204 and/or 1210 may be set at 150% or 200% of the stored peak value $R_{peak}$. Those skilled in the art will appreciate that a higher threshold in decisions 1204 and 1210 will capture a new value of $R_{peak}$ more quickly, but the system 100 may experience greater fluctuations. Conversely, a lower threshold for step 1204 will approach a steady state value for $R_{peak}$ more slowly and will provide greater rejection of spurious peaks.

Those skilled in the art will appreciate that the threshold values selected in decisions 1204 and 1210 can be influenced by a variety of factors. For example, the nature of the communication link between the receiving system 104 and the network 106 may be a factor. The receiving system 104 may be connected to the network 106 with a variety of different connection options and a variety of service level types. For example, the receiving system 104 may be coupled to the network 106 via home digital subscriber lines (DSL), a wireless connection, a WiFi hot spot, cable modem, high speed Internet connection at work, or the like. The home DSL will have an associated peak flow rate and a certain service level while a high speed Internet connection at work will have a different associated peak flow rate and service level. The identification of the link type and associated broadband service level may be stored in the database or data structure, as described above. The identification may be based on the current network address of the receiving system 104 (such as the IP address), or based on domain information sent to the sending system 102 by the receiving system 104 or other conventional identification technique. If the receiving system 104 is connected to a digital subscriber line (DSL) the flow rate tends to be predictable with fewer spurious changes in peak flow values. Thus, system engineers can set a higher threshold in decision 1204 to permit the system 100 to react more quickly to changes in peak flow values on the DSL connection. In contrast, if the receiving system 104 is coupled to the network 106 via a wireless communication connection, flow rates may vary dramatically. In this case, the system engineers may choose a lower threshold value in decision 1204 to provide greater rejection of spurious peaks. In addition, wireless data rates may be governed by external factors, such as noise. Even when bandwidth may be available, the sending system 102 may reduce the rate of data flow to compensate for variations in the received signal quality. Those skilled in the art will appreciate that a base station (not shown) coupled to the mobile receiving system 104 will receive an indicator of received signal quality. Based on that data, the base station can determine the appropriate date rate in light of the received signal quality.

The thresholds in decision 1204 and 1210, as well as the number of samples collected in decision 1216, may vary depending on the delivery system, as described above. In addition, these factors may vary based on the time of day or day of the week. For example, system engineers may want to react more quickly in measuring peak flow values in heavy traffic flow so that the system 100 will recognize congestion more readily. Conversely, in periods of low traffic volume (e.g., late at night or weekends) it may be desirable to adjust the thresholds to react more slowly to changes in peak flow. Thus, the system 100 can dynamically adjust the measurement of peak flows and can be adjusted to reject false peaks that may otherwise cause the system to behave as if network traffic were congested.

From the foregoing it will be appreciated that, although specific embodiments of the invention have been described herein for purposes of illustration, various modifications may be made without deviating from the spirit and scope of the invention. Accordingly, the invention is not limited except as by the appended claims.

Pacing Data Flows

Systems and methods are described herein to select a data flow traversing through one or more data networks for management and that may have been determined to be using significant amounts of network resources. Upon detecting network congestion, the systems and methods may be designed to pace the delivery of the data flow by reducing the delivery rate (or target data rate) of the data flow to the destination. In some cases, the systems may include a transport manager system, while in other cases, the systems may include the transport manager system and a flow detector system. In some embodiments, the systems and methods may be implemented somewhere along a data flow path between a first network equipment, such as a content server, and a second network equipment, such as a user equipment. In some embodiments, and for purposes of the following description, a data flow may be defined as a flow of data packets associated with a particular data file, such as a media content file, which is transmitted from a particular network source to a particular network destination.

In some embodiments, the systems and methods may deliver packet data content across shared access networks in a manner that more evenly distributes over time aggregate user traffic, for example, by moving traffic from times of bottleneck network congestion into subsequent adjacent moments of surplus network capacity. The net effect of this redistribution of traffic may reduce intervals of peak usage and congestion (when the network is unable to supply enough throughput capacity for all users), which may result in higher allowed aggregate network utilization before network service quality degrades for end users of the shared access networks.

For purposes of the following description, the term "surplus network capacity" (e.g., idle capacity) is understood to mean shared network capacity (e.g., network bandwidth, network resources) that may be used by, for example, a transport manager system that transfers some or all of the streaming content data over a network, but that in the absence of such a usage is otherwise unused. In other words, "the surplus network capacity" may be deemed to be available network bandwidth (or network resources) that is in excess of the current aggregate network traffic load or demand. For example, if the network traffic capacity is X and the current aggregate network traffic load is Y, then the available surplus capacity is X-Y, where Y cannot be larger than X. One of the goals of using surplus network capacity is to use some or all of the surplus capacity X-Y to transfer content including streaming content, which implies that if the surplus capacity (X-Y) is zero, then the transfer slows or stops and yields the channel to other users' traffic sharing the same network. When the surplus capacity (X-Y) of a network is zero or approaches zero, the network is considered to be "congested" (i.e., network congestion).

In some cases, surplus network capacity in shared multi-user data networks is transient and can fluctuate randomly from moment to moment. Further, use of surplus capacity, as defined, is distinct from a fair-share or similarly competitive shared use of network capacity (e.g., when the aggregate traffic load exceeds the network capacity limit X, then each of N users sharing the network receives a X/N share of the network capacity).

When a data network is congested, the rate at which data packets (e.g., data flows) traversing through the network will typically degrade, resulting in less than optimal data throughput. One of the causes of network congestion is the presence or existence of "elephant flows" or other types of flows that are relatively burdensome in their use of network resources that include shared throughput capacity. Examples of elephant flows include, for example, packet data flows associated with media content (e.g., video and/or audio files) that use large fractions of network bandwidth. In some cases, an elephant flow may be defined as a data flow that consumes a portion of the total network bandwidth that is greater than some threshold level. In other cases, an elephant flow may be defined as a data flow having a data rate that exceeds some threshold amount. In still other cases, an elephant flow may be defined as a data flow that persists for longer than a threshold duration. Of course, the values of the threshold level and threshold amount may be a design choice based on a number of factors including, for example, types of data networks involved, number of end users, total network bandwidth, and so forth.

Figure 24A:
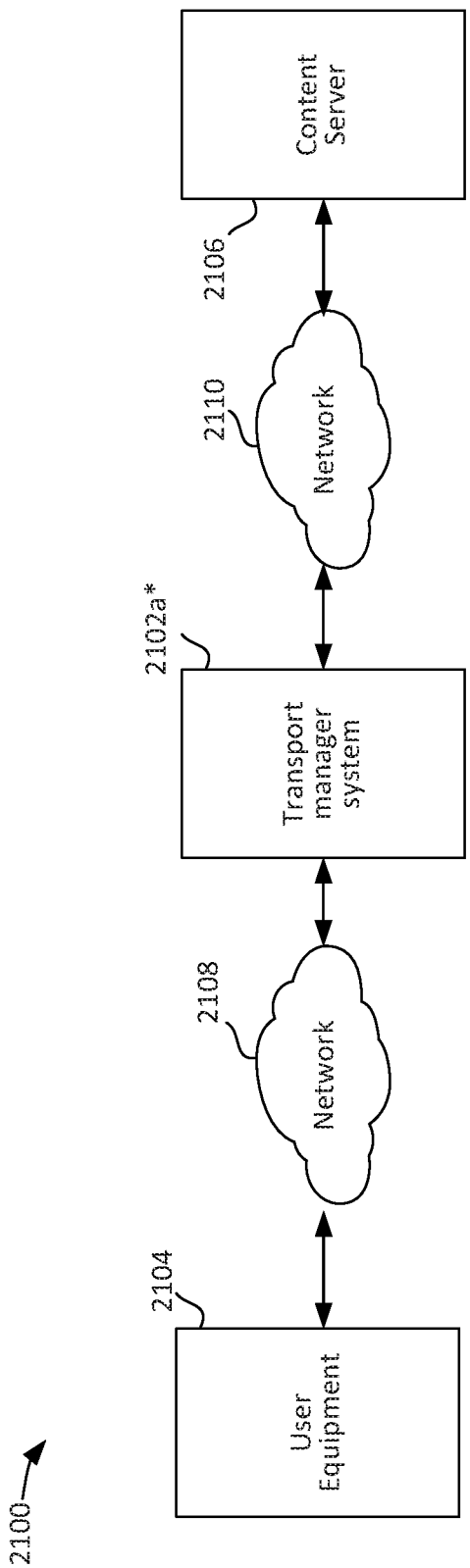
FIG. 24A illustrates an example network environment.

FIG. 24A illustrates an example network environment 2100 according to an embodiment. As illustrated, the network environment 2100 includes a transport manager system 2102a*, a user equipment 2104, a content server 2106, a data network 2108, and a data network 2110. Note that in the following, "*" represents a wildcard. Thus, the following references to the transport manager system 2102a*, for example, may refer to the transport manager system 2102a* of FIG. 24A, as well as to the transport manager system 2102a' of FIG. 25A or to the transport manager system 2102a" of FIG. 25B, which are two different implementations of the transport manager system 2102a* of FIG. 24A. Although not explicitly illustrated in FIG. 24A, one or more additional user equipment 2104 and one or more additional content servers 2106 may interface with the data network 2108 and/or the data network 2110.

In an embodiment, the user equipment 2104 may be a desktop computer, a workstation, a set-top box, a work station, a mobile computing device such as a smartphone or a tablet computer, a wearable computing device such as a smartwatch or augmented reality glasses, or the like.

In an embodiment, the content server 2106 may be, for example, a server that provides media content such as video and/or audio files and/or data files to other network nodes including, for example, the user equipment 2104.

The two data networks 2108 and 2110 may be used as paths for exchanging data, in the form of data packets, between the user equipment 2104, the transport manager system 2102a*, and the content server 2106. For example, when a media content file, such as a video or audio file, is being downloaded from the content server 2106 to the user equipment 2104, the media content file may be routed from the content server 2106 to the user equipment 2104 through the transport manager system 2103a* and via the data networks 2108 and 2110. For example, the content server 2106 may transmit a media content file to the user equipment 2104 via the data networks 2108 and 2110 by transmitting data packets with headers that includes the network address (e.g., internet protocol IP address) of the user equipment 2104 as the destination. In an embodiment, the two data networks 2108 and 2110 may be two distinct networks, or may be part of a single large functional network.

In some embodiments, the data network 2108 may be an access network (AN) that communicatively links the transport manager system 2102a* to the user equipment 2104. For example, in some cases, the data network 2108 may be one of a mobile cellular access network, such as, a second generation (2G) network, a third generation (3G) network, a long term evolution (LTE) network, a fifth generation (5G) network, and the like. In some cases, the data network 2108 may include a core collection of sub-nodes that are linked to a radio access network (RAN). In some cases, portions of the data networks 2108, 2110, 2114 may be a local area network or data center, for example, a Serving Gateway Interface-Local Area Network (SGi-LAN) or Gateway Interface-Local Area Network (Gi-LAN) located at the border of a mobile network.

In some embodiments, the data network 2110 that links the content server 2106 to the transport manager system 2102a* may be a wide-area network (WAN), which for illustrative purposes, may be considered to be the Internet.

In some embodiments, it may be assumed that at least a selected portion of packet data traffic between the content server 2106 and the user equipment 2104 passes through, or is in line with, the transport manager system 2102a*. In order to facilitate traffic through the transport manager system 2102a*, in one embodiment, the physical location for the transport manager system 2102a* may be at the border traffic aggregation point(s) connecting the data network 2108 (e.g., an access network such as a cellular or Wi-Fi network) with the data network 2110 (e.g., WAN). For example, in 3$^{rd}$ Generation Partnership Project (3GPP) standard mobile networks, the aggregate point may be part of the SGi-LAN, which connects to the data network (PDN)-Gateway core element (or alternately the Gi-LAN and Gateway GPRS support node (GGSN)-Gateway) and outwards to the Internet. However, in other embodiments, the transport manager system 2102a* may be located elsewhere. In some embodiments, the transport manager system 2102a* may be part of a Content Delivery Network (CDN) serving one or more ANs.

Figure 25A:
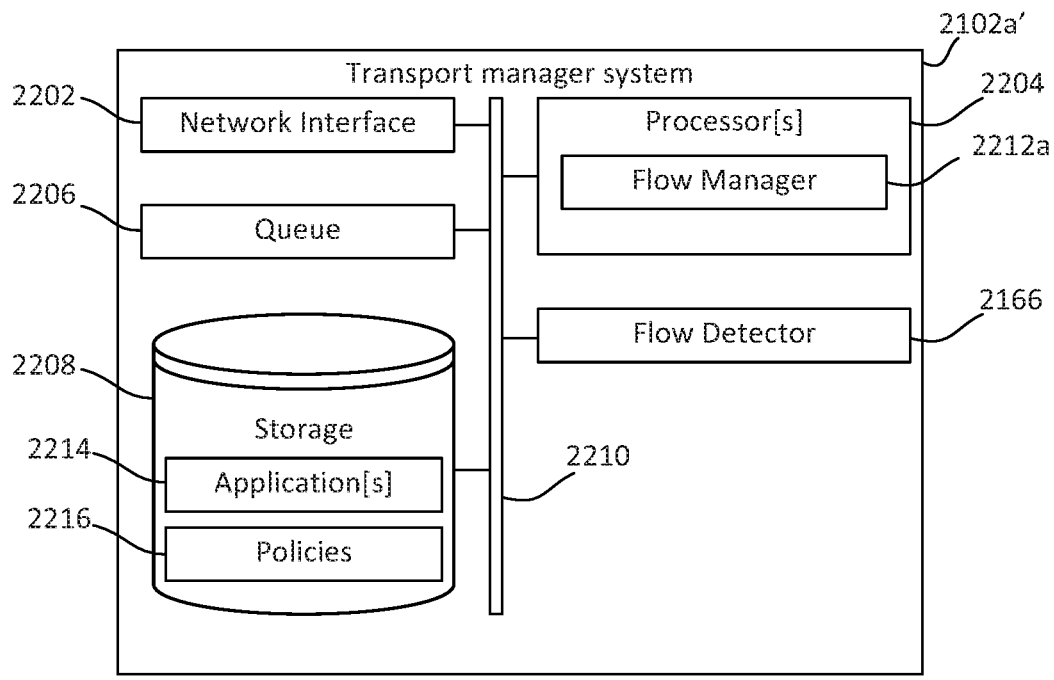
FIG. 25A is a block diagram of a transport manager system according to an embodiment.
Figure 25B:
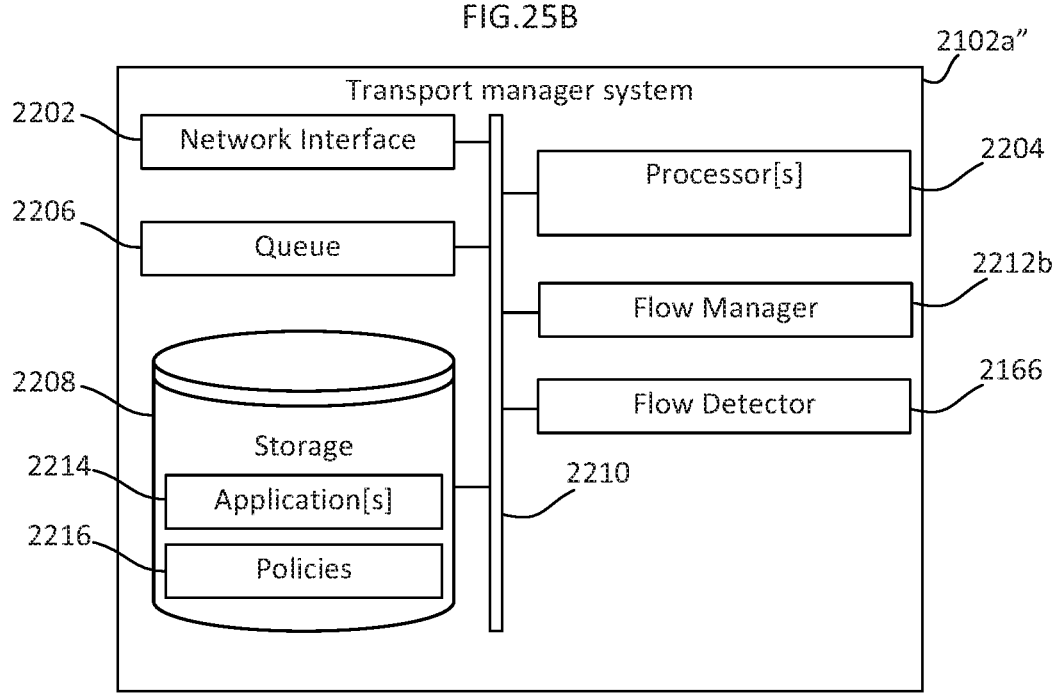
FIG. 25B is a block diagram of a transport manager system according to another embodiment.

FIGS. 25A and 25B illustrate two different implementations of the transport manager system 2102a* of FIG. 24A, which are illustrated as transport manager system 2102a' in FIG. 25A and as transport manager system 2102a" in FIG. 25B. As illustrated in FIG. 25A, the transport manager system 2102a' includes a network interface 2202 (e.g., a network interface card or "NIC"), one or more processors 2204, a queue 2206 (e.g., a buffer), a flow detector 2166, and storage 2208 (e.g., volatile and/or non-volatile memory including, for example, random access memory (RAM), read only memory (ROM), flash memory, disc memory, and so forth) that are linked together via a bus 2210. The storage 2208 may store one or more applications 2214 (e.g., computer readable instructions) and one or more policies 2216 for selecting and/or determining which packet data flows should be managed.

The flow detector 2166 may be designed to, among other features, monitor a plurality of data flows, and to select one or more of the data flows for further processing/management based on the one or more of the policies 2216 stored in the storage 2208 or from other sources. In various embodiments, the flow detector may be implemented using customized circuitry (e.g., application specific integrated circuit or ASIC), or by employing a combination of customized circuitry and software executed by programmable circuitry such as one or more processors.

As further illustrated in FIG. 25A, the transport manager system 2102a' further includes a flow manager 2212a, which may be designed to, among other functions, measure a delivery performance (e.g., delivery throughput or some of other delivery parameter) of a data flow (i.e., packet data flow). The flow manager 2212a may detect whether the network is congested based, at least in part, on the measured delivery performance of the data flow, and may pace the data flow, in response to detecting network congestion, by adjusting the delivery of the data flow to the destination (e.g., user equipment 2104) in order to reduce the delivery rate of the data flow. In the embodiment illustrated in FIG. 25A, the flow manager 2212a is implemented by the one or more processors 2204 (or other programmable circuitry) executing one or more computer readable programming instructions (e.g., application 2214). The flow manager 2212a, the flow manager 2212b of FIG. 25B, and the flow detector 2166 of FIG. 24B are logic units that are each designed to perform the various functionalities to be described herein.

FIG. 25B illustrates another implementation of the transport manager system 2102a* of FIG. 24A, illustrated in FIG. 25B as the transport manager system 2102a". The transport manager system 2102a" illustrated in FIG. 25B includes some of the same components as the transport manager system 2102a' of FIG. 25A. Unlike the flow manager 2212a of FIG. 25A, however, the flow manager 2212b illustrated in FIG. 25B may be implemented using customized circuitry rather than being implemented using one or more processors 2204 executing software (e.g., machine readable programming instructions). In still other embodiments, the flow manager 2212* of FIG. 25A or 25B may be implemented using a combination of customized circuitry and software executed by programmable circuitry (e.g., processor 2204).

Figure 24B:
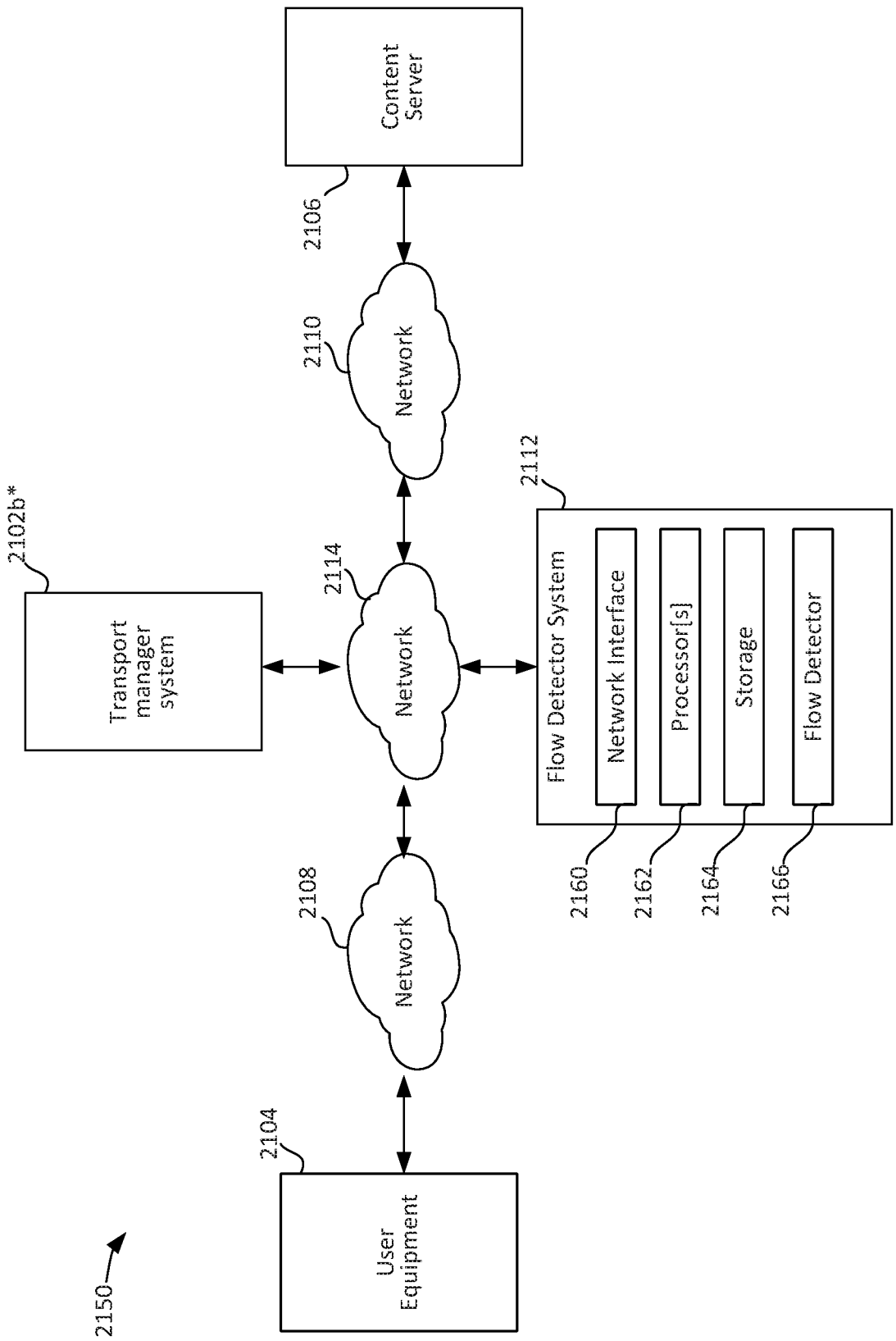
FIG. 24B illustrates another example network environment.
Figure 25C:
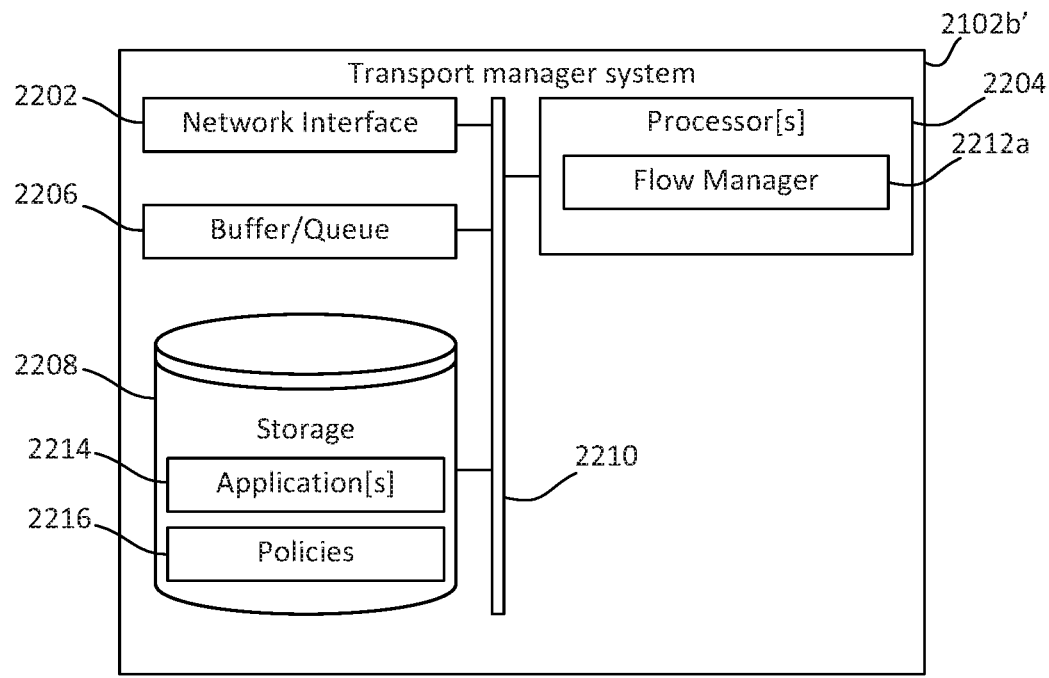
FIG. 25C is a block diagram of a transport manager system according to another embodiment.
Figure 25D:
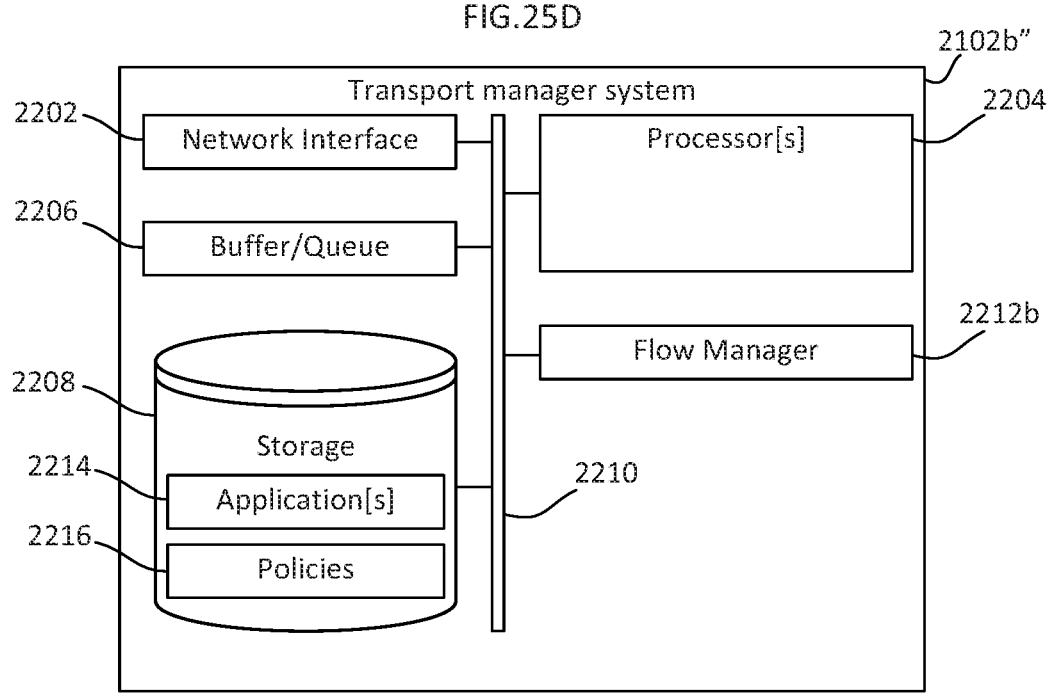
FIG. 25D is a block diagram of a transport manager system according to another embodiment.

FIG. 24B illustrates another example network environment 2150 according to an embodiment. As illustrated, the network environment 2150 includes a transport manager system 2102b* that is designed to manage data flows between two network equipment (e.g., user equipment 2104 and content server 2106 similar to the transport manager system 2102a* of FIG. 24A. FIGS. 25C and 25D illustrate two different implementations of the transport manager system 2102b* of FIG. 24B, which is illustrated in FIG. 25C as transport manager system 2102b' and in FIG. 25D as transport manager system 2102b".

The transport manager system 2102b* of FIG. 24B (i.e., the transport manager system 2102b' of FIG. 25C or the transport manager system 2102b' of FIG. 25D) includes components similar to those included in the transport manager system 2102a* of FIG. 24A (i.e., the transport manager system 2102a' of FIG. 25A or the transport manager system 2102a" of FIG. 25D). However, unlike the transport manager system 2102a* illustrated in FIGS. 24A, 25A, and 25B, the transport manager system 2102b* of FIGS. 24B, 25C, and 25D does not include a flow detector 2166. Instead, the flow detector 2166 may be part of a separate network device, herein referred to as flow detector system 2112.

The flow detector system 2112 includes a network interface 2160, one or more processors 2162 (e.g., central processing unit (CPU), graphical processing unit (GPU), and so forth), storage 2164 (e.g., volatile and/or non-volatile memory), and a flow detector 2166. The flow detector may be designed to, among other functions, monitor and/or sample data traffic between the content server 2106 and the user equipment 2104 via data networks 2108, 2110, and 2115, similar to the flow detector 2166 of FIGS. 25A and 25B. The flow detector system 2112 and the transport manager system 2102b* of FIG. 24B may be linked to a data network 2114, which in some embodiments, may be a Local Area Network or Software Defined Network such as a network or networks composed of directly interconnected hardware collections of routers, switches, gateways and the like. In some embodiments, the three data networks 2108, 2110, and 2114 may be a single functional network.

In an embodiment, selective packet data flows may be identified for further processing by the flow detector system 2112 based on configured policies or templates characterizing the data flows traversing the data networks 2108, 2110, and 2114. For example, the flow detector system 2112 may employ the flow detector 2166 to measure the average throughput, delivered data volume, duration, and other characteristics of the data flow in order to classify the flow as an elephant flow, which is a relatively burdensome type of data flow due to its relatively large, disproportionate use of network resources including shared throughput capacity.

The specific flow types (e.g., elephant flows) of packets flowing through the data networks 2108, 2110, and 2114 may be determined based on, for example, the component packet network and transport layer headers of the packets, which may include, for example, combinations of IP source and destination addresses, transport control protocol (TCP) or User Datagram Protocol (UDP) source and destination ports, protocols (e.g., IPv4), flow labels (e.g., IPv6), flags, extension header fields, and so forth. That is, different packets may be identified as belonging to the same data flow (or virtual flow) by, for example, processing the headers of the packets to determine that the packets have, for example, the same source and destination port, protocol, flow labels, extension header fields, and so forth. Once a data flow (i.e., packet data flow) has been identified, the amount of data being carried by the identified data flow may be ascertained in order to determine whether the data flow is an elephant flow.

In some embodiments, a data flow is identified as an elephant flow by sampling packets of an aggregate combination of one or more flows and selecting a flow that exceeds a threshold data rate measured within a defined sampling duration. In other embodiments, a data flow is identified as an elephant flow by sampling and selecting a flow that exceeds a continuous activity duration threshold which may be defined by measuring a number of consecutive data rates, or a sequence of data rates, each of which exceeds a threshold data rate. In still other embodiments, a data flow is identified as an elephant flow by randomly sampling only some of the packets of an aggregate combination of one or more flows and selecting a flow that exceeds a relative detection probability that indicates relatively disproportionate use of the aggregate traffic bandwidth. In still other embodiments, these methods may be used in combination or with other similar methods.

In some cases, when the network or transport layer packet data payloads are encrypted or obfuscated, the payload headers may be processed/examined in order to identify packets that belong to the same packet data flow. In other cases, where the packet data payloads are readable, the information in the network or transport packet payloads may be processed/examined to further help identify packets associated with a particular data flow or type of data flow (e.g. streaming video).

In some embodiments, once the flow detector system 2112 has identified an elephant flow or another flow that may be burdensome, the flow detector system 2112 may trigger reconfiguration of the packet forwarding logic in the data network 2114 so that packets in the identified data flow are directed to pass through the transport manager system 2102b* in the end to end path between the source (e.g., a content server 2106) and the destination (e.g., 2104). For example, the flow detector system 2112 may communicate the characteristics of the burdensome flow to one or more routers and switches including the data network 2114. Accordingly, dynamically configured forwarding or switching rules may be used to direct subsequent packets in the same data flow to pass through the transport manager system 2102b* in the end-to-end path of the packets, for example, using the principles of Software Defined Networking. In other embodiments, however, the transport manager system 2102b* may be included in the end-to-end path, according to default rules, and the flow detector system 2112 may merely inform the transport manager system 2102b* of detected flows that match one or more classification templates so that the detected flows are processed (e.g., pacing the flow rate to reduce the delivery rate of the flows) while other traffic flows may be forwarded without processing.

In some cases, a flow may be unidirectional (e.g., either an uplink or downlink flow) or may be bidirectional by being paired with a flow in the opposite direction (e.g., packets with interchanged destination and source network addresses, interchanged port addresses, common flow label, etc.) belonging to a communicating pair of connection endpoints. In some embodiments, both directions of a bidirectional flow pair may be directed to the transport manager system 2102b*.

In some embodiments, the flow detector system 2112 and the transport manager system 2102b* may be distinct functional elements as shown in FIG. 24B, or combined into a single functional unit as illustrated in FIG. 24A.

Figure 26:
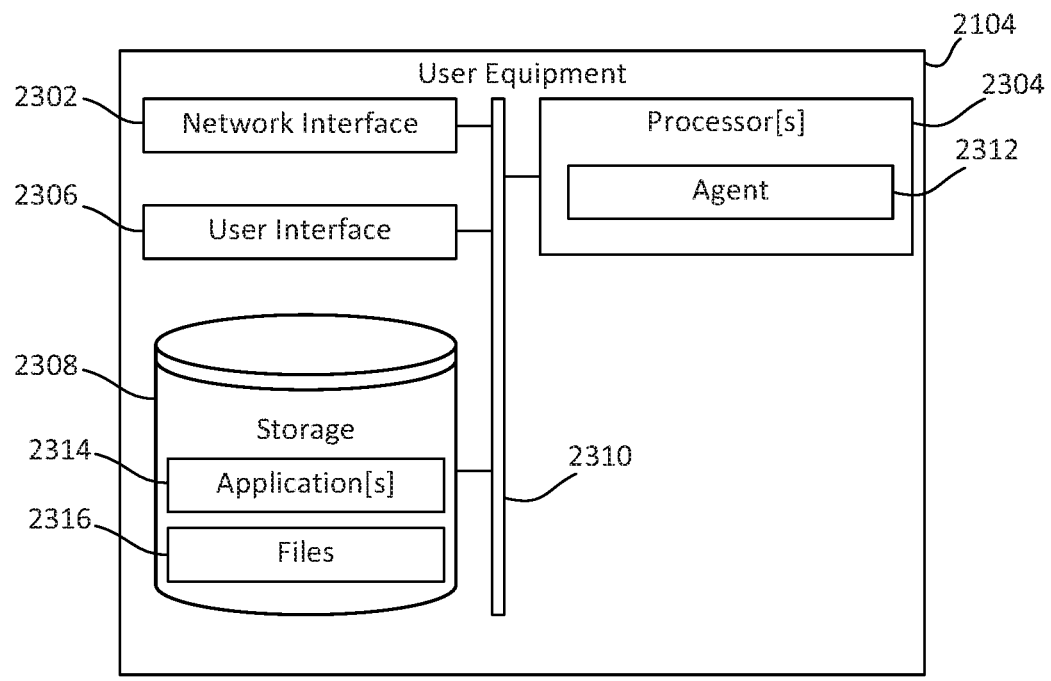
FIG. 26 is a block diagram of a user equipment according to an embodiment.

FIG. 26 is a block diagram of the user equipment 2104 according to an embodiment. The user equipment 2104, which in some cases, may be a mobile computing device or a desktop computer, may include a network interface 2302 (e.g., a NIC), one or more processor 2304, user interface 2306 (e.g., including a display, speakers, keyboard, mouse, and so forth), and storage 2308 (e.g., a volatile and/or non-volatile memory), that are coupled together via bus 2310. The storage 2308 may store one or more applications 2314 and one or more files 2316 (e.g., media content files such as audio and/or video files). In some embodiments, the one or more processors 2304 may execute one or more computer readable instructions (e.g., an application 2314) to implement an agent 2312 that may be designed to facilitate the various functionalities performed by the transport manager system 2102* of FIGS. 24A, 24B, 25A, 25B, 25C, and 25D.

FIG. 27 illustrates a process for selecting and managing a data flow according to an embodiment. In some implementations, the process 2400 may be implemented by, for example, a flow manager 2212* (see FIGS. 25A, 25B, 25C, and 25D) and a flow detector 2166 (see FIGS. 24B, 25A, and 25B). The process 2400 begins at 2402 when a data flow is selected for management by, for example, a flow detector 2166, from a plurality of data flows traversing through one or more data networks. The data flow that is selected may be transmitted from a source, such as the content server 2106, to a destination, such as the user equipment 2104. In some cases, the data flow may be selected based on a determination that that the data flow is an elephant flow (e.g., a data flow that consumes a portion of network bandwidth that is greater than a threshold level or that has a data rate that exceeds a threshold amount). In an embodiment, the data flow may additionally or alternatively be selected by determining the source for the data flow. For example, data flows that are determined to have originated form source addresses affiliated with specific content providers, such as video content providers, may be automatically selected for management.

At 2404, network congestion is detected by, for example, the flow manager 2212*. Various techniques may be employed in order to detect network congestion. For example, in some implementations, network congestion may be detected by determining the delivery performance of the selected data flow. This may be accomplished by allowing packets associated with the selected data flow to traverse through the network as fast as the network will permit in order to estimate a current delivery throughput for the selected data flow. In some embodiments, in order to accurately estimate the delivery throughput of the selected data flow, acknowledgements (e.g., ACK packets) that are transmitted by the destination (e.g., user equipment 2104) in response to successfully receiving packets may be monitored. The network may then be determined to be congested if the estimated delivery throughput is less than the "peak throughput" for the selected data flow, which in some cases, may have been previously detected for the selected data flow. In an embodiment, a delivery throughput is an estimated amount of data that is delivered to a destination per unit of time while the peak throughput may be the highest (e.g., filtered, or averaged) estimated delivery throughput based on one or more prior such delivery throughput estimates for the selected data flow. In another embodiment, the peak throughput may be the highest (e.g., or filtered, or averaged) estimated delivery throughput for one or more prior such delivery throughput estimates for other data flows. In some embodiments, the highest estimated delivery throughput may have been estimated based on peak hold, percentile-based analysis, filtered data throughput, and/or averaged data throughput. In some cases, the peak throughput may be reported by the agent 2312. In other cases, the peak throughput may be estimated by the flow manager 2212*. In still other cases, the peak throughput may be estimated by other network elements.

That is, when a data flow for a media file is traversing through a network, the throughput of the data flow will frequently fluctuate depending on available network capacity/congestion. At points in time when there is spare network capacity (e.g., no congestion), the associated packets will be delivered to the destination (e.g., user equipment 2104) at an optimal or maximum rate, which is referred to herein as the peak throughput. At a particular point in time when the data flow is detected as not being delivered to the destination at peak throughput levels, the network may be determined to be congested. In some embodiments, the detection of the network congestion may include determining the level of network congestion based, for example, on the determined delivery performance of the selected data flow.

At 2406, based on the detected network congestion, the selected data flow is paced by, for example, the flow manager 2212* in order to reduce the delivery rate of the data flow to the destination. In some embodiments, the delivery rate of the data flow may be reduced by adding latencies between the packets to be transmitted to the destination. For example, in order to slow the delivery rate, one or more latencies may be added between transmission of two or more packets of the data flow to be transmitted to the destination. The amounts of the one or more latencies to be added may be based, for example, on the determined delivery performance of the flow or the level of network congestion. In an embodiment, data associated with the data flow may be buffered in a queue (e.g., queue 2306 of the transport manager system 2102*). In an embodiment, a delivery rate may be defined as the amount of data sent by the transport system 2102* for a flow in a time interval selected to achieve an average target data rate over the time interval. As used herein, the term "pace" or "paced" refers to a network operation where a target data rate is dynamically adjusted, i.e., increased or decreased, according to network conditions. In an embodiment, the target data rate is dynamically adjusted not to exceed the allocated TCP fair share. In an embodiment, a target data rate may be defined as a rate that decreases in proportion to the numerical difference between the current estimated throughput of the flow and the peak throughput. Because this numerical difference continually varies due to fluctuating network conditions the target data rate is also dynamically (e.g., continuously or frequently) adjusted.

Figure 28A:
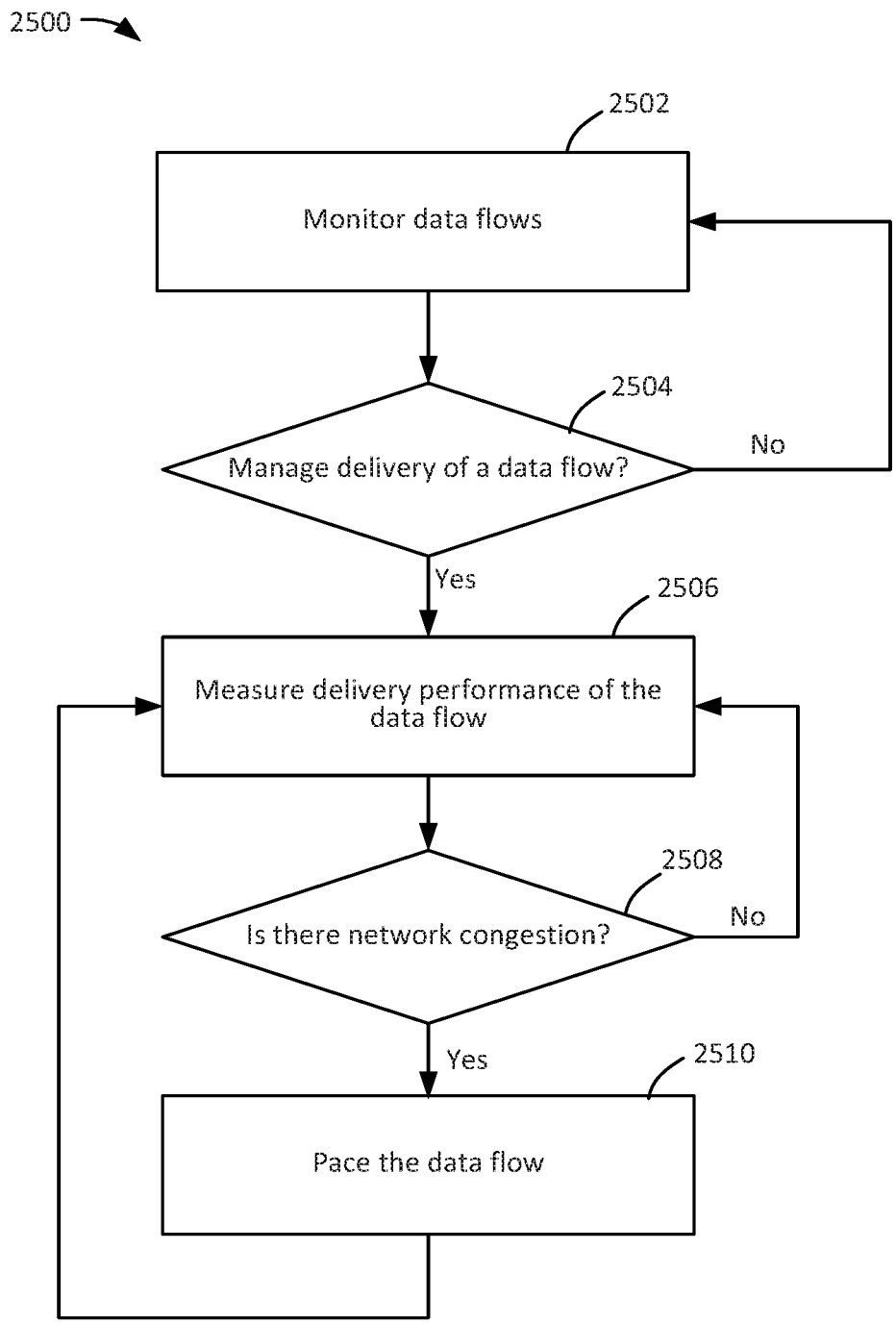
FIG. 28A is a high-level logic flow diagram of a process for selecting a data flow for management and for pacing the data flow according to an embodiment.
Figure 28B:
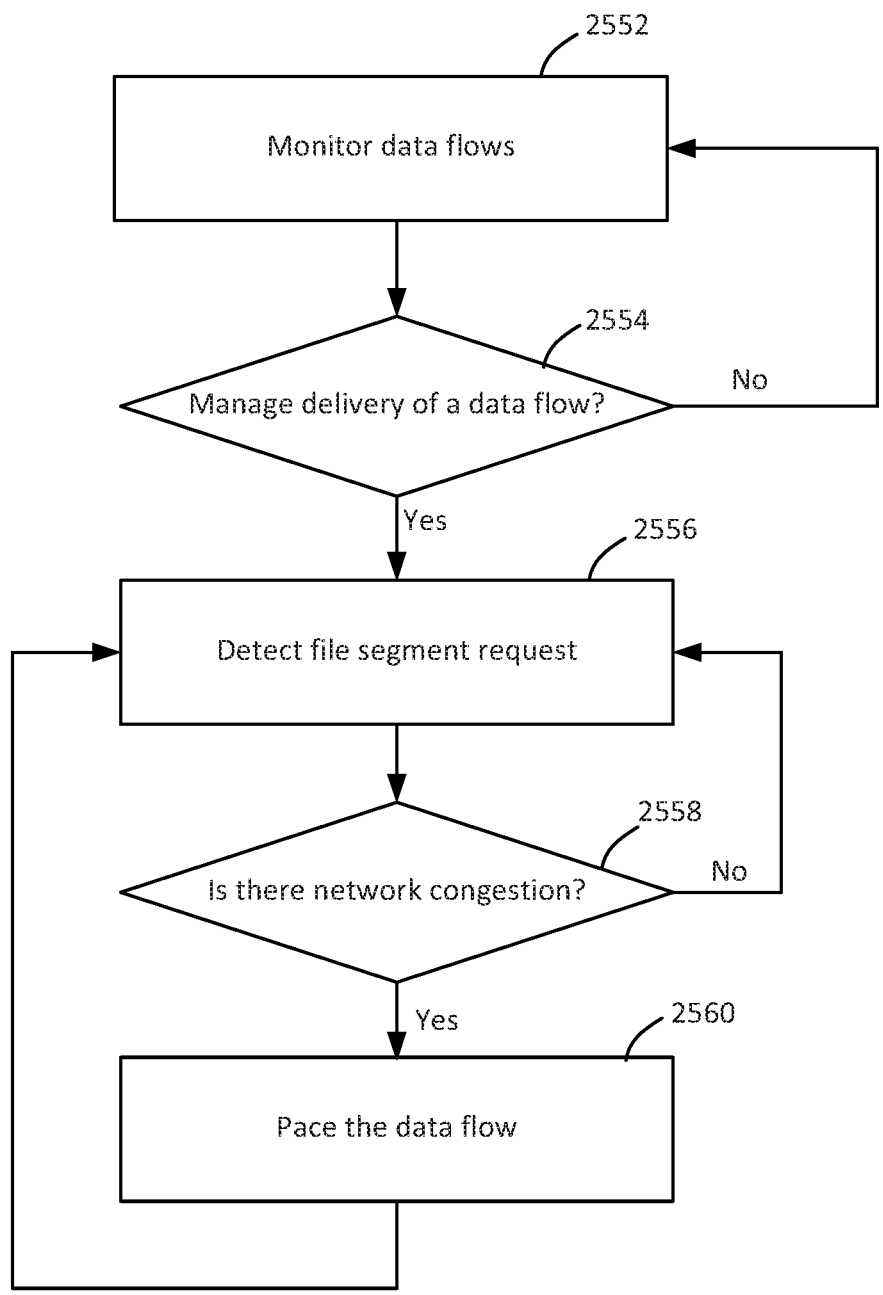
FIG. 28B is a high-level logic flow diagram of a process for selecting a data flow for management and for pacing the data flow according to an embodiment.

FIGS. 28A and 28B illustrate two processes 2500 and 2550 that are two different implementations of process 2400 of FIG. 27 according to some embodiments. The processes 2500 and 2550 may be implemented by the flow manager 2212* of FIG. 25A, 25B, 25C, or 25D and the flow detector 2166 of FIG. 24B, 25A, or 25B.

In some cases, a single logical flow may be associated with two or more transport layer flows that have the user equipment 2104 as an end point. Aggregate traffic from the single logical flow may be managed by, for example, the flow manager 2212* according to the operations illustrated in FIG. 28A or 28B. For example, an application running on the user equipment 2104 can create multiple transport control protocol/internet protocol (TCP/IP) flows that the application can use to send and receive data. By associating and managing the single logical flow that includes the traffic of the multiple TCP/IP flows, the operations illustrated in FIG. 28A or 28B can be performed on a per-user-equipment and/or per-user-app basis. In some embodiments each flow's TCP/IP 4-tuple (source address (SA), destination address (DA), source port (SP), destination port (DP)) and protocol ID, or (SA, DA, flow label) may be used to group flows sharing a common user equipment IP address, protocol ID, or combinations of these. In other embodiments, a unique ID of the user equipment 2104 known to be associated with an IP address may be used to group multiple TCP/IP flows into a single logical flow.

FIG. 28A illustrates a process 2500 for selecting a data flow for management and for pacing the data flow according to an embodiment. Process 2500 may be implemented regardless of whether the network or transport layer payloads of the packets being managed are encrypted or not encrypted. Process 2500 begins at 2502 when data flows traversing through one or more networks are monitored by, for example, a flow detector 2166. In some implementations, this may be accomplished by monitoring the network layer (e.g., IP) and the transport layer (e.g., TCP, UDP) flows (e.g., the TCP/IP portions of packets) that pass through the transport manager system 2102* of FIG. 24A or 24B (or the flow detector system 2112 of FIG. 24B). In some cases, the monitoring operation 2502 may include inspection of higher layers (e.g., HTTP or application layer).

Based on a set of flow classification policies, the flow detector 2166 may select a particular data flow for closer inspection and management at 2504. For example, the flow detector 2166 may determine that a flow satisfies the policy criteria of an elephant flow. In another example, assuming that TCP/IP is employed, the flow detector 2166 may determine that the destination IP network addresses of multiple flow packets are associated with a major commercial provider of online video streaming content based on a handshake performed when a 3-way TCP connection is established. The returning TCP/IP 4-tuple (SA, DA, SP, DP) and protocol ID of the connection may be recorded so that the flow detector 2166 can detect and inspect ingress (WAN to AN) packets that belong to the established TCP/IP flow.

In some cases, the connection network layer of interest may be tunneled within one or more encapsulating protocols of the packets being inspected, which may require the flow detector 2166 to unwrap the one or more encapsulating protocols in order to inspect one of the source and destination, protocol, and acknowledgement network information. When not precluded by encryption, in some embodiments, the monitoring operation 2502 may also include inspection of higher layers (e.g., HTTP or application layer).

At 2504, the flow detector 2166 may identify or select a data flow that is to be further processed and managed. When the flow detector 2166 is located at the flow detector system 2112 (see FIG. 24B), the flow detector 2166 may direct the flow's packets (and associated return packet flow packets) to the transport manager system 2102*. Alternatively, the flow detector 2166 may signal the transport manager system 2102* to begin managing the flow when traffic redirection is not required (e.g., the data flows already are being directed through the transport manager system 2102*). If the flow detector 2166 does not identify or select a data flow for further processing and management, the process 2500 returns to 2502.

At 2506, delivery performance of the selected data flow is measured by, for example, a flow manager 2212* of a transport manager system 2102*. In some embodiments the flow manager 2212* may measure the delivery performance by monitoring the delivery performance of the selected data flow during a measurement phase. In one embodiment of a measurement phase, a volume of data of a flow and the timing of the delivery of the volume of the data sent by the transport manager system 2102* to the user equipment 2104 may be used to determine the average delivery throughput.

In some embodiments, timing and delivery performance to the receiver (e.g., user equipment 2104) of the selected data flow (which may be the data flow for a file segment) may be inferred when the flow manager 2212* forwards one or more data packets. For example, the delivery performance (e.g., throughput) to the receiver of the data flow may be ascertained by counting the number of egress bytes sent to the receiver in a known time interval that may be sufficient to establish steady state conditions in the network (e.g., data network 2108) connecting the transport manager system 2102* and the receiver (e.g., user equipment 2104). In these embodiments, bytes in the egress data packets may not be confirmed to be delivered to the receiver, which may introduce errors in the determined delivery performance, but these errors may remain small in many cases and may, therefore, be disregarded. This method may be used, for example, using transport or other protocol layers that do not support, or complicate, the detection by the flow manager 2212* of return acknowledgement (ACK) packet information from the receiver of the flow (e.g., UDP).

In some embodiments, the phrase "steady state," as used herein, may be in reference to data flows and/or delivery rates that are achieved once an initial ramping period (e.g., the initial time interval when transmission of data packets of a flow ramps up) has passed. For example, during a measurement phase of a flow, the throughput of the flow might fluctuate (e.g. starting relatively slowly and then achieving a sustained average rate after some interval). If the measurement phase is not long enough or does not exclude, e.g., the initial ramping interval, then it may be insufficient to establish steady-state. Transmission of data packets through, for example mobile networks, will often not be able to reach steady state conditions after transmitting one or a few data packets. In fact, establishing steady state may actually take one or a few seconds, during which many data packets are sent, and lasting multiple round-trip-time (sender to receiver to sender) intervals. Thus, one way to define a steady state measurement may be defined as the flow measurement taken once a certain interval of time (e.g., ramp up time interval) has passed. Another way to define a measurement that has achieved steady state is one where the measurement time interval is increased to a sufficient level so that the measurement does not change significantly with additional measurements.

In some cases, the timing and delivery performance of the data packets in the selected data flow may be ascertained and/or confirmed by inspecting the returning ACK packets (e.g., TCP ACKs) transmitted by the receiver in response to receiving the transport layer (or other protocol layer) packets of the data flow that are received by the receiver. For example, in some embodiments, the flow manager 2212* may begin the delivery performance measurement operation 2506 by using the timing of the number of sent and acknowledged packets within a defined time interval or a fixed or threshold volume of sent and acknowledged data bytes. In some cases, received packet acknowledgment may involve inspection by the flow manager 2212* of uplink tunneled and or higher/lower layer packet payloads or headers of the file segment packets (e.g., Physical, Data Link, Network, Transport, Session, Presentation or Application layer header or payloads).

In other embodiments, the delivery performance of data flows to one or more other receivers sharing the same network connecting to the transport manager system 2102* can be used to infer the delivery performance between the transport manager system 2102* and the subject receiver (e.g., user equipment 2104). For example, the flow manager 2212* may determine the delivery performance of data flow to a first receiver (e.g., a first user equipment), and if a second receiver (e.g., a second user equipment) is known to be operating on the same shared network (e.g., same serving base station radio link), the delivery performance for a concurrent flow to the second receiver may be inferred without needing to conduct a separate measurement operation on the second receiver's data flow. The flow manager 2212* may determine that the first and second receivers share a base station, for example, based on network information linking the receiver's current IP or network address with the serving base station ID. This method may be used, for example for transport or other protocol layers that may make it difficult for the flow manager 2212* to conduct an accurate separate measurement phase of the second receiver's flows (e.g., UDP).

By maintaining a record of the peak observed throughput performances of multiple data flows of a network, the flow manager 2212* can detect flows with slower than peak throughput at 2510 and may thereby infer network congestion, e.g., from competing traffic flows sharing a bottleneck network link.

This method of determining a steady-state network delivery performance of multiple data flows may depend on a measured delivered data volume that is of sufficient length to span delivery time intervals of many round-trips in order to achieve a stable estimate of the network's throughput capacity. When this is not possible, the flow manager 2212* may, in some embodiments, use averaged or filtered values of the measured throughput to detect congestion.

For example, in some embodiments the peak observed throughput performance may be determined via statistical weighting of one or more measured values of multiple data flows such as determining percentiles, averages, weighted averages, moving averages, and the like. In other embodiments, the peak throughput may be determined based on known information regarding one or more of the network segments between the content source and destination of the traffic flows, e.g., the maximum throughput of one or more bottleneck network segments.

At 2508, a determination is made as to whether there is network congestion. The flow manager 2212* may make such a determination by comparing the current throughput of the selected data flow with the peak throughput. If the current throughput is equal to or greater than the peak throughput, the process 2400 returns to 2506 where the delivery performance of the data continues to be measured. If, on the other hand, the current throughput is less than the peak throughput, then the network is determined to be congested. After network congestion is detected at 2508 then the flow manager 2212* may, in some embodiments, enter a pacing mode of operation in which the identified data flow is dynamically paced at 2510.

In some embodiments, the dynamically pacing of the selected data flow may be achieved by, for example, continuously or incrementally decreasing or increasing the delivery rate of the data packets being transmitted to the receiver. For example, the flow manager 2212* may reduce the delivery rate of the selected data flow to the receiver by adding, for example, latencies between packets transmitted to the receiver at least until a target average throughput is achieved for the pacing interval. After the delivery rate of the data flow has been adjusted, process 2500 may return to 2506 where the delivery performance of the data flow is again measured.

In order to reduce the delivery rate of the selected data flow, in some embodiments, the incoming network-layer packets (e.g., IP) from the upstream content server 2106 are enqueued (e.g., buffered) at the transport manager system 2102* and then retransmitted through the packet network 2108 (e.g., access network) according to a target rate policy. In some cases, the target rate policy may be a reciprocal function of the detected congestion (e.g. decreasing the target rate as congestion increases and increasing the target rate as congestion decreases). Under such a policy, pacing (e.g., slowing or reducing the delivery rate) may not be required if congestion is not detected or if the detected congestion is lower than some threshold. In some embodiments, depending on the level of congestion detected, the target rate is calculated so that the target rate throughput is lower than the rate that the network (e.g., packet network 2108) was previously observed to be able to support when one or several file segments were delivered without added pacing latency.

In some embodiments, pacing may be implemented by delaying the sending of a unit of data (e.g., an IP packet) so that the average transmission rate is consistent with a target level. For instance, if the (access network) AN-facing (e.g. mobile network) egress interface of the transport manager system 2102\* physical interface throughput capacity is 100 Mbps, and each data packet size (e.g., TCP payload) is 1500 Bytes, then two enqueued packets can be sent back-to-back in 2\*1500\*8/100E6=240E-6 s. If, for example, a target pacing rate of 600000 bps is desired then a delay can be inserted between transmitting the packet pairs of 39.76E-3 s (or in some embodiments sending one 1500 B packet every 20 ms on average). In some cases, standard algorithms for controlling delay to achieve a target transmission rate and burst characteristics may be employed (e.g., token-bucket rate limiting). In some embodiments, the additional inserted delay may be ramped from zero over several transport layer round trip time (RTT) periods in order to give the sending Transport Layer Protocol (e.g., TCP) a chance to adapt to the rate pacing more gradually.

In some embodiments, pacing may be performed considering the most recently delivered data that was transmitted to the destination (e.g., user equipment 2104) without added pacing latency, so that the combined data delivered without and with pacing latency may be delivered at an average rate that achieves a transmission rate target level. It may be understood that the duration of the pacing interval, or the regulated throughput of the pacing interval, or both, may be varied in order to achieve the transmission rate target level.

In some embodiments the regulated throughput of the pacing interval may be constant, so that at least a minimum throughput for the paced flow continues to be delivered during the pacing interval, and then the variable pacing interval is calculated and set in order to achieve the transmission rate target level, taking into account the most recently delivered data that was transmitted without added pacing latency. In other embodiments, the length of the pacing interval may be constant and then the variable regulated pacing throughput is determined in order to achieve the transmission rate target level, taking into account the most recently delivered data that was transmitted without added pacing latency. In still other embodiments the regulated throughput of the pacing interval and the length of the pacing interval may both be variable and determined according to a policy. For example, setting a fixed regulated pacing throughput rate (e.g. constant throughput rate of 250 k bits/second) for the pacing interval and adjusting the time length of the pacing interval so long as the adjusted length (which may be calculated based on target average throughput rate) of the pacing interval does not exceed a threshold maximum (e.g., 5 seconds); otherwise the length of the pacing interval is set at the threshold maximum and the regulated pacing throughput is set (e.g., adjusted) to achieve the transmission rate target level.

In some embodiments, pacing of the identified data flow may be achieved by temporarily withholding and delaying at the transport manager system 2102\* content requests that are transmitted by the user equipment 2104 to the content server 2106. In this method of pacing, the flow manager 2212\* examines the content requests (e.g., HTTP GET) and may delay forwarding the requests to the content server 2106 for a wait interval according to the current measured congestion level for the requesting user equipment 2104.

In some embodiments, a packet queue discipline (e.g., first in first out—FIFO) may operate at the transport manager system 2102\* and a maximum allowed queue depth may be enforced to limit the maximum allowed queuing latency before packet loss occurs (e.g., ingress packets when queue is full may be discarded). In effect, in some embodiments of the pacing mode, the transport manager system 2102\* may operate similar to a network-layer packet router but whose egress interface throughput capacity is adjusted for a flow according to the congestion level in the downstream network bottleneck. In this manner, the transport manager system 2102\* may shift delivered traffic volumes into time intervals when congestion is not present or is reduced, and remove traffic from the data network 2108 during congestion intervals. In some embodiments, the transport manager system 2102\* may use packet marking, e.g., Explicit Congestion Notification (ECN) of Network Layer packets (e.g., IP) to signal the sender of congestion rather than, or in addition to, packet drops or inserted latency.

In some embodiments of pacing mode, the delivery throughput of file segments may not reflect how fast the data network 2108 could deliver packets if additional latency were not introduced between packet transmissions by the transport manager system 2102\*. Accordingly, to estimate the actual state of the downstream network congestion, the flow manager 2212\* may periodically allow one or more file segments to traverse the transport manager system 2102\* without adding pacing latency as will be further described herein.

FIG. 28B illustrates a process 2550 for selecting a data flow for management and for pacing the data flow according to an embodiment. As previously indicated, process 2550 may be implemented by the flow manager 2212\* of FIG. 25A, 25B, 25C, or 25D and the flow detector 2166 of FIG. 24B, 25A, or 25B. In some embodiments, process 2550 may be particularly applicable when network or transport layer payloads are not encrypted. As illustrated, process 2550 includes operations that are the same or similar to some of the operations included in process 2500 of FIG. 28A. For example, operations 2552, 2554, 2558, and 2560 of FIG. 28B substantially mirror operations 2502 (e.g., monitoring data flows), 2504 (determining whether to manage delivery of a data flow), 2508 (e.g., determining whether there is network congestion), and 2510 (e.g., pacing the data flow) of FIG. 28A.

Process 2550 begins at 2552 when the network layer (e.g., IP) and transport layer (e.g., TCP, UDP) flows (e.g., the TCP/IP portions of packets) that pass through the transport manager system 2102\* of FIG. 24A or 24B (or the flow detector system 2112 of FIG. 24B) are monitored by, for example, a flow detector 2166. In some cases, the monitoring of flows may include inspection of higher layers (e.g., HTTP or application layer) in order to determine, for example, a packet flow for a media content file being transmitted from a source (e.g., the content server 2106) to a destination (e.g., the user equipment 2104). The monitoring of flows may further involve measuring the volume of data being transmitted by a data flow, the data transmission rate of the data flow, and so forth.

At 2554, the flow detector 2166 may identify or select a data flow that is to be further processed and managed. When the flow detector 2166 is located at a flow detector system 2112 (see FIG. 24B), the flow detector 2166 may direct the flow's packets (and associated return packet flow packets) to the transport manager system 2102\*. Alternatively, when traffic redirection is not required (e.g., the data flows already are being directed through the transport manager system 2102\*), the flow detector 2166 may signal the transport manager system 2102\* to begin managing the flow. If no data flow is identified or selected for further processing and management, the process 2550 returns to 2552.

At 2556, the flow manager 2212* detects a file segment request (e.g., a request for a file download) from the destination (e.g., user equipment 2104). For example, this may be accomplished directly by inspecting the application layer payload (e.g., HTTP GET), or indirectly by comparing heuristic data packet patterns (e.g., "fingerprints") of uplink and downlink packets, for instance, to known content server network addresses and transport layer ports combinations, protocol IDs, flow labels, and so forth, within definable time intervals, for fixed or threshold volumes of data bytes, or distinguishable combinations of these. By detecting a file segment request, the transport manager system 2102* can ascertain that a file download is about to commence.

In some cases, (e.g., encrypted TCP payloads) reliable detection of a connection request can only occur sometime after download data has started flowing in response to a request (e.g., the volume or pattern of downlink data flowing confirms that a file request was made). Some embodiments may employ other methods of detecting that a file download is in progress.

At 2558, a determination is made by, for example, the flow manager 2212* as to whether there is network congestion. In an embodiment, the flow manager 2212* may employ a variety of techniques to determine the congestion state of the data network 2108 between the transport manager system 2102* and the user equipment 2104. In some cases, for example, the size of the file segment to be downloaded and the timing of the delivery of the file segment may be used to determine the average delivery throughput.

In some embodiments, timing and delivery performance to the receiver of the file segment may be inferred by the forwarding of one or more file segments by the flow manager 2212*, e.g., as quickly as the network permits. In other embodiments the timing and delivery performance of the file segment may be additionally confirmed by inspecting the returning ACK packets (e.g., TCP ACK) corresponding to the transport layer (or other protocol layer) packets of the file segment sent by the transport manager system 2102*. For example, in some embodiments the flow manager 2212* may begin the congestion state determination by using the timing of the number of sent and acknowledged packets within a defined time interval or a fixed or threshold volume of sent and acknowledged data bytes. In some cases, received packet acknowledgment may involve inspection by the flow manager 2212* of uplink tunneled and or higher/lower layer packet payloads or headers of the file segment packets (e.g., Physical, Data Link, Network, Transport, Session, Presentation, or Application layer payloads or layer headers).

By maintaining a record of the peak observed throughput performance during a particular data flow, the flow manager 2212* can detect file segment transfers during the data flow with slower than peak throughput, and can thereby infer network congestion as a result of, for example, competing traffic flows sharing a bottleneck network link.

This method of determining network congestion may require the delivered file segment size to be of a sufficient length that spans delivery time intervals of many round-trip times in order to achieve a stable estimate of the network throughput capacity. When this is not the case the flow manager 2212* may, in some embodiments, use averaged or filtered values of measured throughputs of multiple file segments to detect congestion.

For example, in some embodiments the peak observed throughput performance may be determined via statistics of one or more measured values such as percentiles, averages, weighted averages, moving averages, and the like. In some embodiments, the peak throughput may be determined based on known information regarding one or more of the network segments between the source and destination of the traffic flows, e.g., the maximum throughput of one or more bottleneck network segments. By comparing the current throughput with the peak throughput, a determination may be made to whether there is network congestion. If no network congestion is detected (e.g., the current throughput is equal to or substantially equal to the peak throughput) at 2558, the process 2550 returns to 2556 to detect another file segment request. On the other hand, if network congestion is detected in 2558, then the transport manager system 2102* may, in some embodiments, enter a pacing mode of operation in which the identified or selected data flow is dynamically paced at 2560.

As described previously, pacing of a data flow may involve continuously or incrementally adjusting downwards the delivery rate of the data flow. After the delivery rate of the data flow has been adjusted, process 2550 may return to 2556 in which another file segment request may be detected. This process (e.g., 2556, 2558, and 2560) of detecting a file segment request, determining network congestion, and pacing the data flow may be repeated until the entire file has been downloaded to the destination.

Figure 29A:
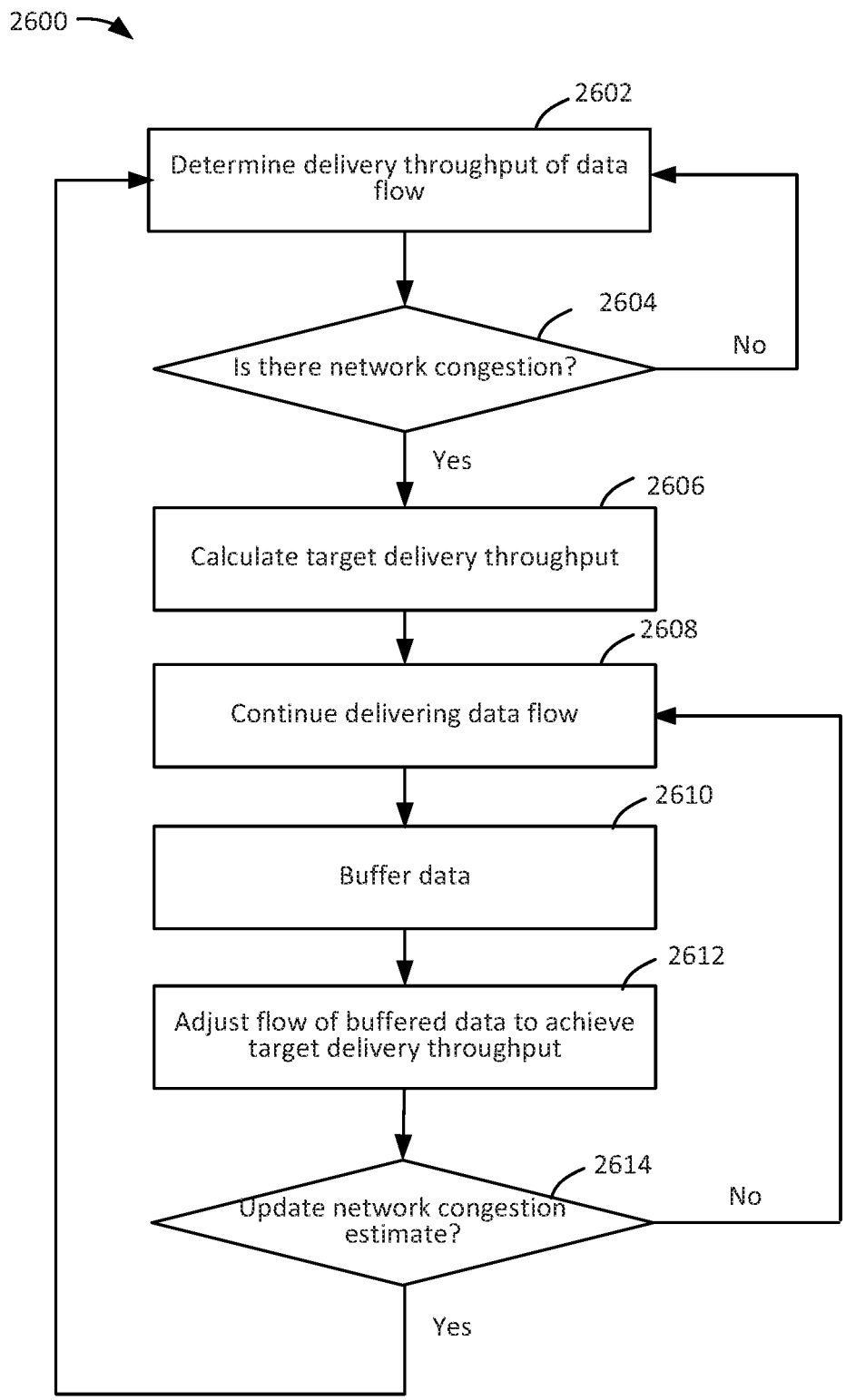
FIG. 29A is a high-level logic flow diagram of a process for managing the delivery throughput of a data flow according to an embodiment.

FIG. 29A illustrates a process for managing the delivery throughput of a data flow according to an embodiment. In some cases, process 2600 may correspond generally to 2506, 2508, and 2510 of FIG. 28A. In an embodiment, the process 2600 may be implemented by the flow manager 2212* of FIG. 25A, 25B, 25C, or 25D. Process 2600 may be implemented even if the flow manager 2212* of the transport manager system 2102* is unable to monitor and inspect file segment delivery requests and corresponding responses from, for example, content servers (e.g., unable to read information contained within the application protocol layer).

Process 2600 begins at 2602 when the delivery throughput of a selected data flow (selected, for example, via operations 2502 and 2504 of FIG. 28A) is determined. As will be further described herein, the delivery throughput of the selected data flow may be determined using one or more available techniques for determining delivery throughput, such as counting, during a time interval, the number of data packets of the selected data flow that the transport manager system 2102* is able to send to the user equipment 2104 and that the access network (e.g., data network 2108) permits. Other techniques may be employed in order to estimate the delivery throughput of the selected data flow in other embodiments.

At 2604, a determination is made as to whether there is network congestion between the transport manager system 2102* and the user equipment 2104. In an embodiment, this may involve comparing the currently determined delivery throughput to the historic peak throughput for the selected data flow associated with the file segment being downloaded to the user equipment 2104. If network congestion is not detected, the process 2600 returns to 2602, otherwise process 2600 moves to 2606. Note that specific details related to 2602 and 2604 will be provided below with reference to process 2650 of FIG. 29B.

At 2606, a target delivery throughput is calculated based on the level of network congestion determined at 2604. In an embodiment, the estimated target delivery throughput is a smaller throughput than the peak throughput for the selected data flow. And in most cases, the target delivery throughput is smaller than the throughput determined at 2602. In an embodiment, the target delivery throughput may be calculated based, at least in part, on the determined level of network congestion.

At 2608, the delivery of the selected data flow to the destination (e.g., user equipment 2104) is resumed by delivering the selected data flow to the destination using a delivery throughput rate that matches the calculated target delivery throughput rate. The delivery of the selected data flow may continue at least until the data flow is discontinued (e.g., when there is no more data to deliver), which, in some cases, may be based on a timeout after data delivery pauses or on observing a flow connection tear-down (e.g., TCP 4-way handshake), connection reset, flow activity timeout, or similar indication that the flow is no longer active.

At 2610, data from the selected data flow received by the transport manager system 2102\* is buffered (e.g., queued) in, for example, the queue 2206 of the transport manager system 2102\*.

At 2612, the delivery of the selected data flow to the destination is paced by adjusting the flow of the buffered data stored at the transport manager system 2102\* to the destination (e.g., user equipment 2104) to achieve the target delivery throughput.

At 2614, a determination is made as to whether the network congestion estimate (as estimated in 2604) needs to be updated. If no such update is needed, then the process 2600 returns to 2608. On the other hand, if the network congestion estimate needs to be updated, then process 2600 returns to 2602. By returning to 2602 a determination may be made as to a new or updated network congestion level, which may then be used in order to adjust the delivery rate of the data flow to the destination.

That is, in some embodiments, the process 2600 may periodically (e.g., every Nth delivered file segment, after a predetermined time interval or intervals, or after a threshold amount of data is delivered) trigger an update of (e.g., sampling of un-paced packets to determine) the congestion state of the data network 2108 between the transport manager system 2102\* and the destination by causing an exit from the pacing mode delivery of the selected data flow, and looping back to the beginning of the process 2600.

In some embodiments, conditions that may influence whether an update to the estimated network congestion is needed include, for example, whether other connections from other user equipment terminals in communication with the transport manager system 2102\* have recently reported on the congestion state of the same data network 2108 or a bottleneck throughput portion thereof. However, embodiments may use other conditions to influence whether an update is needed.

Referring to FIG. 29B, which illustrates a process 2650 for determining delivery throughput of a selected data flow and determining whether there is network congestion according to an embodiment. Process 2650 generally corresponds to operations 2602 and 2604 of FIG. 29A. In some embodiments, process 2650 may be implemented by the transport manager 2102\* of FIG. 25A, 25B, 25C, or 25D. Process 2650 begins when a selected data flow (as selected, for example, by operations 2502 and 2504 of FIG. 28A) is measured at 2652. In some embodiments, the measurement of the selected data flow may involve counting the packets associated with the selected data flow that are sent by the transport manager system 2102\* to the user equipment 2104.

At 2654, a timer is started. Once the timer starts, the transport manager system 2102\* (and more particularly, the flow manager 2212\*) continues to count the packets associated with the selected data flow that are being sent by the transport manager system 2102\*. The counting may continue at least until sufficient data has been sent and/or delivered to achieve a reliable steady-state estimate of the downstream network delivery throughput. This determination may be based on elapsed time, delivery rate, number of Transport Layer ACK cycles, volume of delivered data, and so forth, or any combinations thereof.

At 2658, the current delivery throughput is calculated and recorded. In an embodiment, the calculation may be based on the data flow measurements made at 2656.

At 2660, a determination is made as to whether the peak throughput for the selected data flow should be updated. Note that a peak throughput in some cases will be associated with a specific data flow. For example, when a data flow associated with a media content file is being downloaded to the user equipment 2104, the delivery throughput of the data flow may swing wildly depending on network congestion and other network conditions (e.g., signal-to-noise ratio or SNR, network node locations, signal strengths, and so forth). The throughput of the data flow will swing from a peak throughput that may correspond to the situation where there is no network congestion to a much lower throughput when, for example, the network is substantially congested. Thus, the peak throughput may need to be updated at any given point in time if a new peak is detected while the data flow is being delivered to the destination.

If a determination is made that the peak throughput for the selected data flow needs to be updated, then the peak throughput is updated at 2662. On the other hand, if no update is needed, then process 2650 moves to 2664 where a determination is made as to whether there is network congestion. In an embodiment, network congestion may be identified when the calculated throughput falls below the peak throughput (which, again, may be continuously or periodically reset to avoid stale estimates of the network delivery capability in non-congested operation).

If no network congestion is detected, then process 2650 returns to 2654 at least until the data flow is discontinued (e.g., no more data to deliver). On the other hand, if network congestion is detected, then a determination is made by the transport manager system 2102\* (and more particularly, the flow manager 2212\*) that the data network 2108 between the transport manager system 2102\* and the user equipment 2104 is, in fact, congested.

During the measurement phase of process 2650 (e.g., operations 2652, 2654, and 2656), the monitored or sampled data flow may or may not be continuous. There may be situations in which the content server 2106 and/or user equipment 2104 have caused an interruption in the selected data flow. For example, a media player application might fill its runtime playback buffer and temporarily pause its requests for data from a video streaming server. In such a scenario, the measurement phase could determine an artificially low estimate of the network delivery performance for the data flow. Accordingly, a measurement phase may be preceded by a ramp-up phase (e.g., as part of 2602) to ensure the data flow is active before proceeding with the measurement. The ramp-up phase in some embodiments may persist until a threshold volume of data, threshold activity time, or a combination of these or similar criteria for the flow are reached. The ramp-up phase may be re-entered whenever inactivity for the data flow is detected.

FIG. 30A illustrates a process for managing the delivery throughput of a data flow according to an embodiment. In some cases, process 2700 may generally correspond to 2556, 2558, and 2560 of FIG. 28B. In an embodiment, the process 2600 may be implemented by the flow manager 2212* of FIG. 25A, 25B, 25C, or 25D. In some cases, process 2700 may be particularly useful when the flow manager 2212* of the transport manager system 2102* is able to detect and inspect file segment delivery requests and corresponding responses from, for example, content servers (e.g., able to read unencrypted information contained within the application protocol layer).

Process 2700 begins at 2702 when the delivery throughput for a file segment that is being delivered to the destination (e.g., user equipment 2104) and that is associated with a selected data flow (as selected, for example, via operations 2552 and 2554 of FIG. 28B) is determined. In some embodiments, the file segment is being relayed to the user equipment 2104 via the transport manager system 2102* in response to a file segment request (e.g., an HTTP Byte-Range Request) that is sent from the user equipment 2104 to the content server 2106. The file segment request may be detected by the transport manager system 2102*. The ensuing delivery of the file segment (without pacing intervention) can be used to probe the downstream network throughput as it passes through the transport manager system 2102* using a process as illustrated, for example, in FIG. 30B.

At 2704, a determination is made as to whether there is network congestion between the transport manager system 2102* and the user equipment 2104. In an embodiment, this may involve comparing the currently determined delivery throughput to the historic peak throughput for the selected data flow associated with the file segment being downloaded to the user equipment 2104. If no network congestion is detected, the process 2700 returns to 2702, otherwise process 2700 moves to 2706. Note that specific details related to 2702 and 2704 will be provided below with reference to process 2750 of FIG. 30B.

At 2706, a target delivery throughput is calculated based on the level of network congestion determined at 2704. In an embodiment, the estimated target delivery throughput will be a smaller throughput than the peak throughput for the selected data flow. And in most cases, the target delivery throughput will be smaller than the throughput determined at 2702. In an embodiment, the target delivery throughput may be calculated based, at least in part, on the determined level of network congestion.

At 2708, a file segment request associated with the selected data flow and that is sent by the user equipment 2104 is detected.

At 2710, data associated with the requested file segment and that is received by the transport manager system 2102* is buffered (e.g., queued) in, for example, the queue 2206 of the transport manager system 2102*.

At 2712, the delivery to the destination (e.g., user equipment 2104) of the data associated with the requested file segment is paced by adjusting the flow of the buffered data stored at the transport manager system 2102* to achieve the target delivery throughput.

At 2714, a determination is made as to whether the network congestion estimate needs to be updated. If no such update is needed, then the process 2700 returns to 2708. In some cases, the file segment request that may have originally been detected in 2708 may be for the entire file, in which case, process 2700 loops back to 2710 to continue delivery of the file when a congestion update is not required (e.g., operations 2702 and 2704 are not needed). On the other hand, if the network congestion estimate needs to be updated, then process 2700 returns to 2702. By returning to 2702 a determination may be made as to a new or updated network congestion level, which may then be used in order to adjust the delivery rate of the data flow to the destination.

As described with respect to 2714 of FIG. 30A, various factors may be considered when determining when to update the network congestion estimate. For example, the network congestion estimate may be updated, in some cases, periodically (e.g., every Nth delivered file segment, after a predetermined time interval or intervals, or after a threshold amount of data is delivered).

In some embodiments, conditions that may influence whether an update to the estimated network congestion is needed include, for example, whether other connections from other user equipment terminals in communication with the transport manager system 2102* have recently reported on the congestion state of the same data network 2108 or a bottleneck throughput portion thereof. However, embodiments may use other conditions to influence whether an update is needed.

Figure 30B:
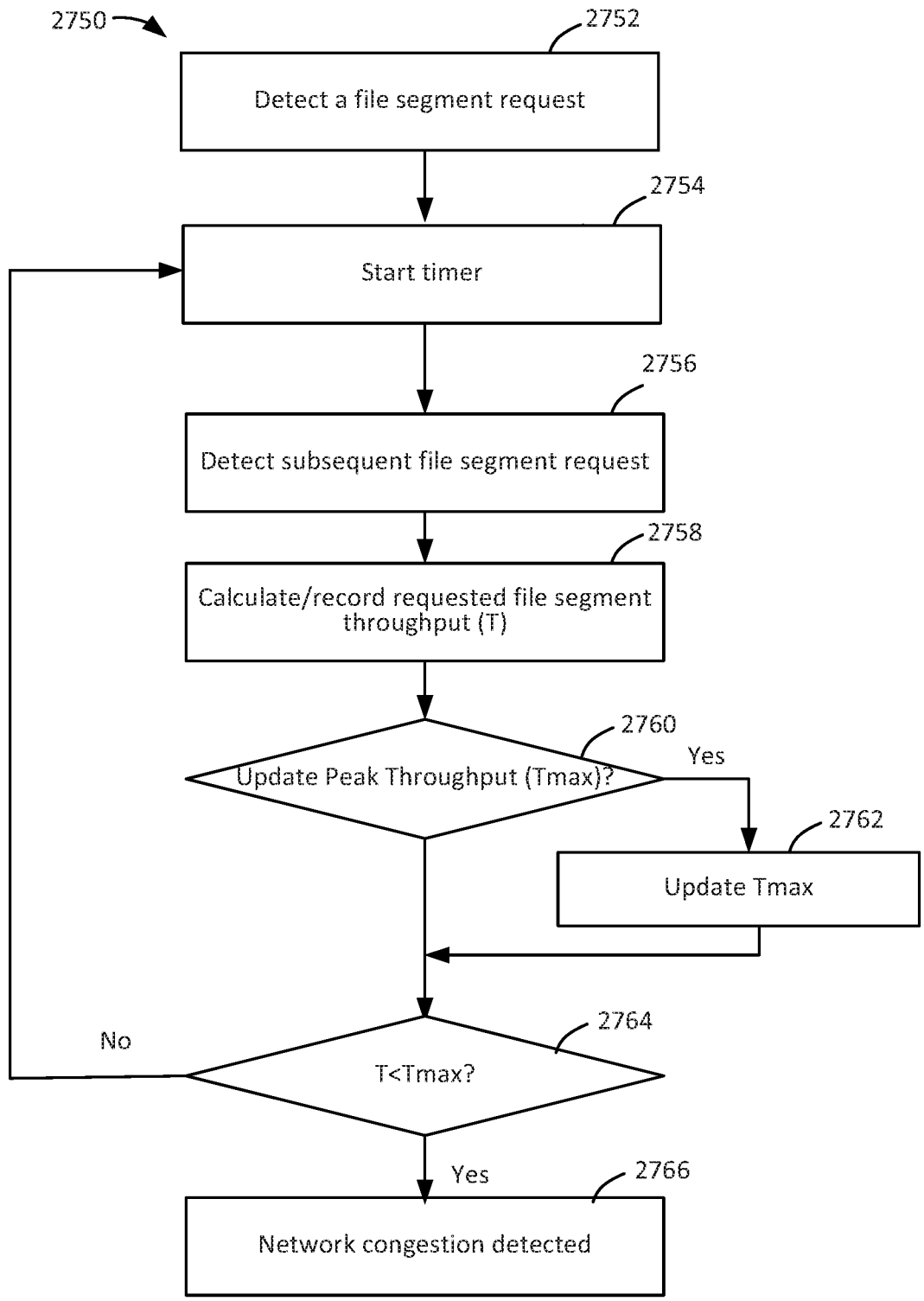
FIG. 30B is a high-level logic flow diagram of a process for determining delivery throughput of a file segment associated with a selected data flow and determining whether there is network congestion according to an embodiment.

FIG. 30B illustrates a process 2750 for determining delivery throughput of a file segment associated with a selected data flow and for determining whether there is network congestion according to an embodiment. Process 2750 generally corresponds to operations 2702 and 2704 of FIG. 30A. In some embodiments, process 2750 may be implemented by the transport manager 2102* of FIG. 25A, 25B, 25C, or 25D. Process 2750 begins when a file segment request (e.g., an HTTP Byte-Range Request) associated with a selected data flow (a data flow as selected, for example, by operations 2552 and 2554 of FIG. 28B) is detected at 2752.

At 2754, a timer is started. Once the timer starts, the transport manager system 2102* (and in particular, the flow manager 2212*) may monitor the selected data flow until the transport manager system 2102* detects at 2756 a subsequent file segment request transmitted by the destination (e.g., user equipment 2104). In some embodiments, the monitoring of the selected data flow may involve, for example, monitoring for returning ACK packets transmitted by the destination (e.g., user equipment 2104) upon successful delivery/reception of file segment packets from the transport manager system 2102*

At 2758, the throughput for the requested file segment is calculated and recorded. In some cases, the throughput may be calculated by ascertaining the amount of data associated with the requested file segment that was delivered to the user equipment 2104 during a time interval between the start of the timer and when the subsequent file segment request was detected at 2756. By dividing the delivered amount of data with the time interval, a throughput may be calculated.

In some embodiments, if the transport manager system 2102* can identify the start packet and end packet of the file segment response, then by determining the amount of time that elapses between reception of the start packet and end packet can alternatively be used (e.g., file_segment_size/time_interval) to directly measure the downstream throughput of the file segment, without needing to reference the timing of the file segment request commands. Similar methods to partition the delivery into file segments may be used in scenarios where only a single file request for the entire file may occur.

At 2760, a determination is made as to whether the peak throughput for the selected data flow should be updated. Note that a peak throughput in some cases will be associated with a specific data flow. For example, when a data flow associated with a media content file is being downloaded to the user equipment 2104, the delivery throughput of the data flow may swing wildly depending on network congestion and other network conditions (e.g., signal-to-noise ratio or SNR, network node locations, signal strengths, and so forth). The throughput of the data flow will swing from a peak throughput that may correspond to the situation where there is no network congestion to a much lower throughput when, for example, the network is substantially congested. Thus, the peak throughput may need to be updated at any given point in time if a new peak is detected while the data flow is being delivered to the destination.

If a determination is made that the peak throughput for the selected data flow needs to be updated, then the peak throughput is updated at 2762. On the other hand, if no update is needed, then process 2750 moves to 2764 where a determination is made as to whether there is network congestion. In an embodiment, network congestion may be identified when the calculated throughput falls below the peak throughput (which, again, may be continuously or periodically reset to avoid stale estimates of the network delivery capability in non-congested operation).

If network congestion is not detected, then process 2750 returns to 2754 at least until the data flow is discontinued (e.g., no more data to deliver). On the other hand, if network congestion is detected, then a determination is made by the transport manager system 2102* (and more particularly, the flow manager 2212*) that the data network 2108 between the transport manager system 2102* and the user equipment 2104 is, in fact, congested.

In some embodiments the congestion determination may be impacted by network type, network attachment information (e.g., base station ID, cell ID) if such information is available to the transport manager system 2102*.

In some embodiments, the transport manager system 2102* may use alternative methods of detecting congestion such as calculating the downstream round trip time (RTT) of Transport Layer segments/ACKs and observing rates of change of the RTT (e.g., increasing when congestion increases). The RTT and ACK processing may be implemented using protocol layers other than the Transport Layer (e.g., TCP or UDP).

In some cases, the requested file segment that is to be delivered to the user equipment 2104 has a sufficiently large data size that enables a stable steady-state estimate of the downstream network delivery throughput at 2758. This determination may be based on total elapsed time, number of sequential sender/receiver Transport-Layer ACK cycles, volume of delivered data, or similar criteria. However, this requirement may not be necessary in other cases.

In some instances, steady-state may only be achieved after the transport layer protocol congestion-control state machine has sent many data packets. In general, a single Transport-Layer segment or few segments may not be sufficient. Depending on the delivery session protocol, a single file segment response may be sufficient or multiple sequential request/response cycles may be needed, in which the response delivery throughput measurements may be averaged or filtered. For example, in modern streaming media protocols, a file request is often made for an encoded video "chunk" of data (e.g., 2128 kBytes) which is often, but not always, large enough to allow a stable estimate of the network steady state throughput capacity.

Once steady state is established, the measured throughput may be calculated at 758 and the peak throughput estimate may be updated, if needed, at 2762.

If downstream network congestion is detected at 2764 and 2766, then the transport manager system 2102* may operate with respect to the selected data flow in pace mode (e.g., operations 2710 and 2712 illustrated in FIG. 30A).

As briefly described above, in some embodiments, the user equipment 2104 may employ an agent 2312. The agent 2312 may be a software agent that is implemented by one or more processors 2304 (or other types of programmable circuitry) executing one or more machine readable instructions. In another embodiment, the agent 2312 may reside at other network elements (e.g., base station, base station controller, and so forth) that may be associated with the access network (e.g., the data network 2108) interfacing the user equipment 2104.

In some embodiments, the agent 2312 may assist the transport manager system 2102* with certain operations and tasks such as terminal identification (e.g., user equipment identification) and network state reporting. Additionally, the agent 2312 may assist the transport manager system 2102* with other operations and tasks.

FIG. 31 illustrates a process for interacting with an agent according to an embodiment. In some embodiments, the process 2800 may be implemented by a transport manager system 2102*.

Process 2800 begins when the transport manager system 2102* registers an agent 2312. Registration of the agent 2312 may be based on an agent unique identifier (UI) (e.g., an international mobile station equipment identity (IMEI) of the agent) and a current network data address (e.g., IP) of the corresponding user equipment associated with the agent, in order to assist with discovery of data flows (that may exist, e.g., between the user equipment 2104 and remote content servers). Registration may also allow setup of a control data connection between the user equipment 2104 and the transport manager system 2102*, thereby facilitating "push" message capability. Registration may be repeated whenever the user equipment 2104 comes online, changes its network data address, changes serving network type, and so forth.

At 2804, the transport manager system 2102* (or the flow detector system 2112) may detect the start of an unknown file delivery session. During registration, the agent and the transport manager system 2102* may exchange certain information such as the IP address of the user equipment 2104 associated with the agent 2312.

At 2806, the identity of the agent 2312 associated with the unknown file delivery session is determined by inspecting the packets of the file delivery session. For example, the user equipment 2104 (which may be further associated with a particular agent 2312) associated with the delivery of the unknown file may be detected, in some cases, by inspecting application payloads of TCP/IP packets (e.g., that are identified with the IP address of the user equipment 2104 as reported by the agent 2312 during registration).

At 2808, the transport manager system 2102* may signal the user equipment 2104 to prompt the agent 2312 to begin reporting information that may be useful to the transport manager system 2102* in managing data flows to the user equipment 2104. In some embodiments, the information that may be reported includes one or more of the current radio link quality (e.g., in terms of maximum throughput capacity) that may be periodically determined and reported, current network type (e.g., Third Generation (3G), High Speed Packet Access (HSPA), Long Term Evolution (LTE), Wireless Fidelity (Wi-Fi), and so forth), current attachment location (e.g., Bay Station Identification (BSID), Cell_ID, latitude/longitude, Global Positioning System (GPS), Service Set Identification (SSID), and so forth), current serving operator (e.g., "XYZ Wireless"), user device resource status (e.g., low-battery, mobility status, processor status), user device application status (e.g., "Media Player Application XYZ active"), and so forth.

At 2810, the transport manager system 2102* may detect the end of the file delivery session. At 2812, the transport manager system 2102*, after detecting the end of the file delivery session, may signal the user equipment 2104 to discontinue reporting. In some embodiments, the agent 2312 may independently cease reporting (based on, e.g., changes to network type, low-battery, no active data sessions, entering airplane mode, and so forth).

In some embodiments the agent 2312 may additionally or alternatively conduct its own assessment of the throughput capacity of the network (e.g., between the associated user equipment 2104 and a remote data delivery source, or for a base station serving a collection of user equipment terminals) which could also be reported to the transport manager system 2102*. In such scenarios, the transport manager system 2102* may use the reports from the agent 2312 to determine congestion in place of, or in addition to, its own assessment of network congestion.

In some embodiments, it may be possible to split the transport layer connection path between the sender (e.g., the content server 2106) and receiver (e.g., user equipment 2104) into two paths at the transport manager system 2102*. In the default single-path version, pacing by the transport manager system 2102* may alter the timing of the transport layer segments (RTT variation) as a control mechanism intended to modulate the rate of the affected traffic. Some transport congestion control algorithms (e.g., TCP congestion avoidance) may respond inefficiently to large step changes in the end-to-end RTT. Splitting the path into two separate paths with independent transport layer state machines may be one way to perform pacing without interfering with the TCP congestion control algorithm, while still allowing a transport manager system 2102* to modulate the end-to-end throughput rate of separate transport layer connections.

In some situations, the transport manager system 2102* may not be able to reliably detect packet reception ACKs (e.g., unacknowledged UDP with encrypted payloads) coming from the receiver of the flow. This may complicate the determination of network congestion and delivery performance of traffic flows by the transport manager system 2102*. In these situations, the transport manager system 2102* may be designed to operate so as to cause the destination (e.g., user equipment 2104) to transmit ACK packets in a flow in one of several ways.

For instance, the transport manager system 2102* may, in some embodiments, inject additional transport layer (e.g., TCP) packets, after each one or more UDP packets sent in a transport layer flow, in order that the agent 2312 that receives such packets would acknowledge the inserted TCP packets. The injected TCP packets may be directed to the agent 2312 rather than the UDP packet destination application on the same user equipment 2104. The successful reception of the one or more UDP packets by the user equipment 2104 may then be inferred by the transport manager system 2102* upon receiving the corresponding TCP ACKs. In other embodiments, the transport manager system 2102* may set flags or insert extension fields in the headers or payloads of the unacknowledged transport flow packets (e.g., UDP), or another protocol layer, which cause the receiving user equipment 2104 or application 2314 to acknowledge receiving the transport flow packet or which indicate that the transport flow packet has been received.

In other situations (e.g., UDP or TCP), the transport manager system 2102* may operate in a mode that does not require detecting packet reception ACKs from the receiver of the flow, or require agents 2312.

Although the methods and examples described above are generally related to content data flowing in the direction from a remote server (e.g., the content server 2106) to the user equipment 2104, the above described methods and systems could equally be applied in the reverse direction, delivering content data from terminal user equipment 2104 to a remote server, without altering the primary details of the methods and systems described above.

Although aspects of the present technology have been described with respect to specific examples, embodiments of the present technology are not limited by these examples. For example, persons of skill in the art will recognize that downloading of data by conditionally using idle network capacity may be performed according to various other algorithms and processes without departing from the scope or spirit of the present technology.

What is claimed is:

1. A method, comprising:
   determining, using a time interval, a delivery performance of a data flow being transmitted from a first network equipment to a second network equipment over a network;
   determining whether the network is congested based on the determined delivery performance of the data flow being transmitted to the second network equipment; and
   pacing delivery of the data flow to the second network equipment by reducing a rate at which the data flow is delivered to the second network equipment when the network is determined to be congested,
   wherein the time interval is greater than or equal to two times a round trip time between the first network equipment and the second network equipment.

2. The method of claim 1, further comprising:
   determining whether the data flow is an elephant flow by determining whether the data flow consumes a greater portion of network bandwidth than a threshold level, has a data rate that exceeds a threshold amount, persists for longer than a threshold amount of time, or a combination thereof,
   wherein pacing delivery of the data flow to the second network equipment by reducing a rate at which the data flow is delivered to the second network equipment when the network is determined to be congested includes pacing delivery of the data flow when the data flow is determined to be an elephant flow.

3. The method of claim 1, wherein determining the delivery performance of the data flow being transmitted from the first network equipment to the second network equipment comprises:
   detecting a number of packets transmitted to and acknowledged by the second network equipment via the data flow during the time interval.

4. The method of claim 1, wherein determining the delivery performance of the data flow being transmitted from the first network equipment to the second network equipment comprises:
   detecting, during the time interval, one or more acknowledgment (ACK) packets that are transmitted, by the second network equipment, in response to the second network equipment receiving one or more data packets via the data flow.

5. The method of claim 4, wherein detecting the one or more ACK packets comprises:
prompting, by inserting one or more additional packets into the data flow, the second network equipment to transmit the one or more ACK packets.

6. The method of claim 1, wherein the delivery performance of the data flow being transmitted from the first network equipment to the second network equipment is determined by determining a delivery throughput of the data flow during the time interval.

7. The method of claim 6, wherein detecting whether the network is congested based on the determined delivery performance of the data flow being transmitted from the first network equipment to the second network equipment comprises:
determining whether the delivery throughput is less than a peak throughput by comparing the delivery throughput to the peak throughput for the data flow, the peak throughput being a highest estimated data throughput for the data flow.

8. The method of claim 6, wherein detecting whether the network is congested based on the determined delivery performance of the data flow being transmitted from the first network equipment to the second network equipment comprises:
determining whether the delivery throughput is less than a percentage of a peak throughput of the data flow; and
determining that the network is congested when the delivery throughput is less than the percentage of the peak throughput of the data flow.

9. The method of claim 6, wherein detecting whether the network is congested based on the determined delivery performance of the data flow being transmitted to the second network equipment comprises:
determining whether the delivery throughput is less than a peak throughput by comparing the delivery throughput to the peak throughput, the peak throughput being a highest detected data throughput for one or more other data flows being transmitted over the network.

10. The method of claim 1, wherein pacing the delivery of the data flow to the second network equipment by reducing a rate at which the data flow is being delivered to the second network equipment comprises:
pausing delivery of the data flow when the network is congested; and
causing the data flow to be transmitted to the second network equipment when the network is uncongested.

11. The method of claim 1, wherein pacing the delivery of the data flow to the second network equipment by reducing a rate at which the data flow is being delivered to the second network equipment comprises:
buffering data associated with the data flow in a queue.

12. The method of claim 1, wherein pacing the delivery of the data flow to the second network equipment includes adding one or more latencies between two or more packets of the data flow before the two or more packets are transmitted to the second network equipment.

13. A transport manager system, comprising:
one or more processors, a network interface, a queue, and a storage communicatively coupled with each other, the storage storing computer executable instructions that, when executed by the one or more processors, cause the transport manager system to:
determine, using a time interval, a delivery performance of a data flow being transmitted from a first network equipment to a second network equipment over a network;
detect whether the network is congested based on the determined delivery performance of the data flow; and
pace delivery of the data flow being transmitted to the second network equipment by reducing a rate at which the data flow is delivered to the second network equipment when the network is detected to be congested,
wherein the time interval is greater than or equal to two times a round trip time between the first network equipment and the second network equipment.

14. The transport manager system of claim 13, the network being a first data network, wherein the first network equipment and the second network equipment are communicatively linked together via a plurality of second data networks including the first data network, and wherein the transport manager system is located at an interface between the plurality of second data networks.

15. The transport manager of claim 13, wherein the computer executable instructions, when executed by the one or more processors, cause the transport manager system to determine the delivery performance of the data flow by determining a delivery throughput of the data flow during the time interval.

16. The transport manager of claim 15, wherein the computer executable instructions, when executed by the one or more processors, cause the transport manager system to detect whether the network is congested by comparing the delivery throughput to a peak throughput of the data flow and determining whether the delivery throughput is less than the peak throughput, the peak throughput being a highest data throughput for the data flow.

17. The transport manager of claim 13, wherein the computer executable instructions, when executed by the one or more processors, cause the transport manager system to pace the delivery of the data flow being transmitted to the second network equipment by adding one or more latencies between transmission of two or more packets of the data flow before the two or more packets are transmitted to the second network equipment, the amounts of the one or more latencies being based on the determined delivery performance of the data flow.

18. The transport manager of claim 13, wherein the transport manager is an inline device connected between the first network equipment and the second network equipment.

19. A system, comprising:
one or more processors;
a network interface;
a queue;
a flow detector configured to select a data flow for management, the data flow being transmitted from a first network equipment to a second network equipment; and
a transport manager configured to:
determine, using a time interval, a delivery performance of the data flow being transmitted to the second network equipment over a network;
determine whether the data flow is an elephant flow;
detect whether the network is congested based on the determined delivery performance of the data flow being transmitted to the second network equipment; and
pace delivery of the data flow to the second network equipment by reducing a rate at which the data flow is delivered to the second network equipment when the data flow is an elephant flow and the network is detected to be congested, wherein the time interval is greater than or equal to two times a round trip time between the first network equipment and the second network equipment.

* * * * *